United States Patent
Lo et al.

(10) Patent No.: US 11,483,981 B1
(45) Date of Patent: Nov. 1, 2022

(54) SYSTEMS AND METHODS FOR PROVIDING A LOW ENERGY USE FARM

(71) Applicant: Crop One Holdings, Inc., Millis, MA (US)

(72) Inventors: Sonia Lo, Danville, CA (US); Deane L. Falcone, Medway, MA (US)

(73) Assignee: CROP ONE HOLDINGS, INC., Millis, MA (US)

( * ) Notice: Subject to any disclaimer, the term of this patent is extended or adjusted under 35 U.S.C. 154(b) by 459 days.

(21) Appl. No.: 15/979,031

(22) Filed: May 14, 2018

(51) Int. Cl.
  *A01G 31/06* (2006.01)
  *A01G 7/04* (2006.01)
  *A01G 22/00* (2018.01)
  *A01G 24/60* (2018.01)
  *G06V 20/10* (2022.01)

(52) U.S. Cl.
  CPC ............ *A01G 7/045* (2013.01); *A01G 22/00* (2018.02); *A01G 24/60* (2018.02); *A01G 31/06* (2013.01); *G06V 20/188* (2022.01)

(58) Field of Classification Search
  CPC ........ A01G 7/045; A01G 22/00; A01G 24/60; A01G 31/06; A01G 9/16; A01G 31/02
  See application file for complete search history.

(56) References Cited

U.S. PATENT DOCUMENTS 3,931,695 A * 1/1976 Widmayer ............. A01G 7/045
  47/59 R
4,091,566 A * 5/1978 Horvath .................. A01G 7/00
  47/17

(Continued)

FOREIGN PATENT DOCUMENTS

CN  105578870 A  5/2016
EP  2966978      1/2016

(Continued)

OTHER PUBLICATIONS

Extended European Search Report for European Application Serial No. 14775123.4, dated Sep. 19, 2016.

(Continued)

*Primary Examiner* — Peter M Poon
*Assistant Examiner* — Morgan T Jordan
(74) *Attorney, Agent, or Firm* — Kenealy Vaidya LLP

(57) ABSTRACT

Growing devices, systems and methods for promoting growth of seedlings may include at least one energy output device; at least one growing environment that includes a first growing environment; a nutrient solution container within the first growing environment, the nutrient solution container for supporting seedlings during growth; at least one growth assist device (GAD) associated with the first growing environment; and a controller. The controller may generate consumption data regarding operation of the at least one GAD and generation data regarding operation of the at least one energy output device. The controller may determine, based on at least one predetermined constraint, as well as consumption data and generation data, a consumption-generation plan and may control energy output to at least one GAD based on the determined consumption-generation plan. The controller may control energy generation, by at least one energy output device, based on the determined consumption-generation plan.

20 Claims, 46 Drawing Sheets

(56) References Cited

U.S. PATENT DOCUMENTS

| | | | | |
|---|---|---|---|---|
| 4,163,342 A * | 8/1979 | Fogg | A01G 7/045 | 47/58.1 R |
| 4,255,897 A * | 3/1981 | Ruthner | A01G 9/249 | 47/65 |
| 4,291,674 A * | 9/1981 | Comte | A01G 9/243 | 126/592 |
| RE31,023 E | 9/1982 | Hall, III | | |
| 4,387,533 A * | 6/1983 | Green | A01G 9/22 | 47/17 |
| 4,462,390 A * | 7/1984 | Holdridge | A01G 9/243 | 126/587 |
| 4,486,977 A | 12/1984 | Edgecombe et al. | | |
| 4,545,396 A * | 10/1985 | Miller | A01G 25/16 | 137/78.3 |
| 5,009,029 A * | 4/1991 | Wittlin | A01G 31/02 | 47/18 |
| 5,038,517 A * | 8/1991 | Talbott | A01G 9/242 | 47/17 |
| 5,524,381 A * | 6/1996 | Chahroudi | A01G 9/243 | 47/17 |
| 5,621,669 A * | 4/1997 | Bjornsson | A01G 25/167 | 239/63 |
| 5,873,197 A | 2/1999 | Rowse et al. | | |
| 6,065,245 A | 5/2000 | Seawright et al. | | |
| 6,399,367 B1 * | 6/2002 | Pollock | A01G 9/24 | 435/292.1 |
| 7,565,768 B2 | 7/2009 | Bula et al. | | |
| 8,156,685 B2 * | 4/2012 | Kleinwaechter | A01G 9/243 | 47/17 |
| 8,847,514 B1 * | 9/2014 | Reynoso | H05B 47/19 | 315/307 |
| 8,910,419 B1 * | 12/2014 | Oberst | A01G 31/06 | 47/60 |
| 9,241,447 B2 * | 1/2016 | Looney | A01G 9/242 | |
| 9,565,812 B2 | 2/2017 | Wilson | | |
| 10,201,132 B2 * | 2/2019 | Wilson | G06K 9/00657 | |
| 10,438,063 B1 * | 10/2019 | You | A23L 3/3409 | |
| 10,455,777 B1 * | 10/2019 | Dennison | A01G 13/10 | |
| 10,660,282 B1 * | 5/2020 | Parrish | A01G 9/085 | |
| 10,709,076 B2 * | 7/2020 | Pham | A01G 9/023 | |
| 2003/0073578 A1 | 4/2003 | Buehre | | |
| 2003/0201349 A1 * | 10/2003 | Murcia | A01G 3/08 | 241/24.2 |
| 2004/0231240 A1 | 11/2004 | Kuiper | | |
| 2005/0076563 A1 * | 4/2005 | Faris | A01G 7/04 | 47/58.1 LS |
| 2005/0152143 A1 * | 7/2005 | Lee | A01G 7/045 | 362/249.01 |
| 2005/0252078 A1 | 11/2005 | Albright et al. | | |
| 2005/0274075 A1 * | 12/2005 | Freund | A01G 24/60 | 47/65.7 |
| 2006/0027676 A1 * | 2/2006 | Buck | A01G 25/16 | 239/63 |
| 2006/0053691 A1 | 3/2006 | Harwood et al. | | |
| 2007/0039241 A1 | 2/2007 | Battke et al. | | |
| 2007/0289207 A1 | 12/2007 | May et al. | | |
| 2008/0035275 A1 * | 2/2008 | Konstantin | A01G 9/22 | 160/5 |
| 2008/0142614 A1 * | 6/2008 | Elezaby | A01G 25/16 | 239/69 |
| 2008/0148630 A1 * | 6/2008 | Ryan | H05B 45/20 | 47/17 |
| 2008/0271367 A1 * | 11/2008 | Huhta-Koivisto | A01G 9/246 | 47/17 |
| 2008/0276534 A1 | 11/2008 | Bissonnette et al. | | |
| 2008/0277492 A1 * | 11/2008 | Cannon | A01G 15/00 | 239/14.1 |
| 2009/0070897 A1 | 3/2009 | Goldman | | |
| 2009/0229177 A1 | 9/2009 | Hyde et al. | | |
| 2009/0260281 A1 | 10/2009 | Conrad et al. | | |
| 2009/0272029 A1 | 11/2009 | Aiking et al. | | |
| 2010/0115830 A1 | 5/2010 | Dube | | |
| 2010/0289411 A1 * | 11/2010 | Smits | H05B 45/20 | 315/113 |
| 2011/0000807 A1 * | 1/2011 | Snelten | A01K 1/0236 | 206/423 |
| 2011/0086419 A1 * | 4/2011 | Hagen | C12P 7/06 | 435/292.1 |
| 2011/0147617 A1 * | 6/2011 | Shur | A01G 7/045 | 250/461.1 |
| 2011/0023218 A1 | 9/2011 | Lewis et al. | | |
| 2011/0232186 A1 * | 9/2011 | Lewis | A01G 9/1423 | 47/66.6 |
| 2012/0013881 A1 * | 1/2012 | Den Boef | A01H 1/06 | 355/67 |
| 2012/0054061 A1 * | 3/2012 | Fok | A01G 13/0268 | 705/26.5 |
| 2012/0075848 A1 * | 3/2012 | Yamada | A01G 7/045 | 362/231 |
| 2012/0170264 A1 * | 7/2012 | McKenzie | A01G 7/045 | 362/231 |
| 2012/0210644 A1 * | 8/2012 | Johnson | G06N 5/02 | 47/1.01 R |
| 2012/0252103 A1 * | 10/2012 | Deane | C12M 21/02 | 435/257.1 |
| 2012/0279127 A1 | 11/2012 | Yusibov | | |
| 2013/0000185 A1 * | 1/2013 | Tanase | F21V 29/60 | 47/17 |
| 2013/0042523 A1 | 2/2013 | Lee et al. | | |
| 2013/0042527 A1 * | 2/2013 | Aikala | H01L 33/06 | 47/58.1 LS |
| 2013/0044474 A1 * | 2/2013 | Aikala | H01L 33/06 | 362/231 |
| 2013/0198693 A1 | 8/2013 | Jost et al. | | |
| 2013/0255150 A1 * | 10/2013 | Karpinski | F21V 9/20 | 47/58.1 LS |
| 2014/0000162 A1 * | 1/2014 | Blank | A01G 31/06 | 47/62 A |
| 2014/0069002 A1 * | 3/2014 | Morgan | A01G 7/045 | 47/58.1 LS |
| 2014/0094952 A1 * | 4/2014 | Goldman | D05B 19/08 | 700/138 |
| 2014/0115958 A1 | 5/2014 | Helene et al. | | |
| 2014/0154769 A1 * | 6/2014 | del Ninno | A01G 33/00 | 435/170 |
| 2014/0157662 A1 * | 6/2014 | Wallace | A01G 9/241 | 47/17 |
| 2014/0173769 A1 | 6/2014 | Leyns et al. | | |
| 2014/0200690 A1 * | 7/2014 | Kumar | A01G 22/00 | 700/90 |
| 2014/0222223 A1 * | 8/2014 | Horton | A01G 25/16 | 700/284 |
| 2014/0250778 A1 * | 9/2014 | Suntych | A01G 33/00 | 47/1.4 |
| 2014/0259920 A1 | 9/2014 | Wilson | | |
| 2014/0325910 A1 * | 11/2014 | Faris | A01G 31/06 | 47/62 R |
| 2014/0344100 A1 | 11/2014 | Stutzman et al. | | |
| 2014/0352211 A1 * | 12/2014 | Liotta | A01G 31/02 | 47/58.1 LS |
| 2014/0352762 A1 * | 12/2014 | Carter | A01G 7/045 | 136/247 |
| 2015/0005964 A1 * | 1/2015 | Liotta | A01G 31/02 | 700/284 |
| 2015/0061510 A1 * | 3/2015 | Maxik | H05B 45/20 | 315/153 |
| 2015/0089867 A1 * | 4/2015 | Abbott | H05B 47/16 | 47/58.1 LS |
| 2015/0216130 A1 * | 8/2015 | Grajcar | A01G 7/045 | 47/58.1 LS |
| 2015/0223402 A1 | 8/2015 | Krijn | | |
| 2015/0230409 A1 | 8/2015 | Nicole et al. | | |
| 2015/0305258 A1 * | 10/2015 | Broutin Farah | A01G 7/06 | 700/90 |
| 2015/0342125 A1 * | 12/2015 | Krijn | A01G 7/045 | 315/152 |
| 2016/0014974 A1 * | 1/2016 | Grajcar | H05B 45/46 | 47/58.1 LS |

(56) References Cited

U.S. PATENT DOCUMENTS

| | | | | |
|---|---|---|---|---|
| 2016/0057949 | A1* | 3/2016 | Williams | A01G 22/00 700/284 |
| 2016/0088802 | A1* | 3/2016 | Nicole | H05B 47/11 47/58.1 LS |
| 2016/0178179 | A1* | 6/2016 | Hanson | A01G 2/00 362/249.02 |
| 2016/0180060 | A1* | 6/2016 | Nelson | G06Q 50/02 702/19 |
| 2016/0198639 | A1* | 7/2016 | Millar | H05B 47/105 315/152 |
| 2016/0212945 | A1* | 7/2016 | Colless | A01G 9/14 |
| 2016/0219794 | A1* | 8/2016 | Greenberg | H05B 47/19 |
| 2016/0235014 | A1* | 8/2016 | Donham | A01G 9/26 |
| 2016/0262318 | A1* | 9/2016 | Lloyd | A01G 9/227 |
| 2016/0273755 | A1* | 9/2016 | Lin | A01G 7/045 |
| 2016/0278300 | A1* | 9/2016 | Glendinning | A01G 9/20 |
| 2016/0366833 | A1* | 12/2016 | Pohjanvouri | A01G 22/00 |
| 2017/0034895 | A1* | 2/2017 | Vogel | A01G 7/045 |
| 2017/0035002 | A1* | 2/2017 | Ellins | A01G 9/247 |
| 2017/0064912 | A1* | 3/2017 | Tabakman | A01G 31/06 |
| 2017/0086281 | A1* | 3/2017 | Avrahamy | A01G 7/045 |
| 2017/0105358 | A1 | 4/2017 | Wilson | |
| 2017/0105368 | A1* | 4/2017 | Mehrman | A01G 27/005 |
| 2017/0127622 | A1* | 5/2017 | Hong | A01G 22/00 |
| 2017/0135289 | A1* | 5/2017 | Whittingham | H05B 45/10 |
| 2017/0142910 | A1* | 5/2017 | Johnson | F21V 29/56 |
| 2017/0172083 | A1* | 6/2017 | Villamar | A01K 63/047 |
| 2017/0181389 | A1* | 6/2017 | Jain | A01C 14/00 |
| 2017/0188521 | A1* | 7/2017 | Jagyasi | A01G 22/00 |
| 2017/0196171 | A1* | 7/2017 | Xu | A01G 22/00 |
| 2017/0202162 | A1* | 7/2017 | Dufresne | A01G 31/042 |
| 2017/0231174 | A1* | 8/2017 | Jones | A01G 31/00 47/62 R |
| 2017/0251589 | A1* | 9/2017 | Tippery | A01B 51/02 |
| 2017/0265408 | A1* | 9/2017 | McGowan | A01G 31/047 |
| 2017/0269016 | A1* | 9/2017 | Anjum | G01W 1/02 |
| 2017/0311414 | A1* | 10/2017 | Kido | H05B 47/105 |
| 2018/0007838 | A1* | 1/2018 | McCord | H05B 45/20 |
| 2018/0014486 | A1* | 1/2018 | Creechley | A01G 7/045 |
| 2018/0020611 | A1* | 1/2018 | La | A01M 25/006 701/2 |
| 2018/0020622 | A1* | 1/2018 | Richt | G06F 16/00 703/6 |
| 2018/0028700 | A1* | 2/2018 | Dobrinsky | A61L 2/24 |
| 2018/0035619 | A1* | 2/2018 | Ueno | A01G 7/045 |
| 2018/0042192 | A1* | 2/2018 | Volpe | A01G 31/042 |
| 2018/0054975 | A1* | 3/2018 | Shur | G01N 21/55 |
| 2018/0081522 | A1* | 3/2018 | Greenberg | G06T 11/206 |
| 2018/0116025 | A1* | 4/2018 | Adams | H05B 47/19 |
| 2018/0116127 | A1* | 5/2018 | Krijn | H05B 45/20 |
| 2018/0132423 | A1* | 5/2018 | Rowan | G06Q 50/02 |
| 2018/0132434 | A1* | 5/2018 | Fu | A01G 31/02 |
| 2018/0132435 | A1* | 5/2018 | Yano | A01G 31/02 |
| 2018/0146626 | A1* | 5/2018 | Xu | A01G 7/02 |
| 2018/0184602 | A1* | 7/2018 | Ofir | A01G 7/045 |
| 2018/0192596 | A1* | 7/2018 | Howis | A01G 9/16 |
| 2018/0213734 | A1* | 8/2018 | Smith | A01G 31/06 |
| 2018/0242539 | A1* | 8/2018 | Bhattacharya | A01G 9/24 |
| 2018/0249649 | A1* | 9/2018 | Villamar | A01G 18/60 |
| 2018/0255709 | A1* | 9/2018 | Topps | H05B 47/16 |
| 2018/0288950 | A1* | 10/2018 | Ogata | A01G 9/24 |
| 2018/0317400 | A1* | 11/2018 | Lossl | A01G 7/045 |
| 2018/0317409 | A1* | 11/2018 | Staffeldt | A01G 31/02 |
| 2018/0317411 | A1* | 11/2018 | Spiro | A01G 9/0293 |
| 2019/0008096 | A1* | 1/2019 | Lee | A01G 7/045 |
| 2019/0050741 | A1* | 2/2019 | Mewes | G01N 33/24 |
| 2019/0066234 | A1* | 2/2019 | Bedoya | A01D 41/1273 |
| 2019/0104698 | A1* | 4/2019 | Miwa | A01G 31/06 |
| 2019/0116745 | A1* | 4/2019 | Ji | A01G 31/06 |
| 2019/0128864 | A1* | 5/2019 | Pickett | G01N 33/24 |
| 2019/0133026 | A1* | 5/2019 | Seaman | H04L 29/08 |
| 2019/0147094 | A1* | 5/2019 | Zhan | G06F 16/24547 707/718 |
| 2019/0150375 | A1* | 5/2019 | Miyahara | A01G 9/02 |
| 2019/0166776 | A1* | 6/2019 | Villamar | G01N 33/1886 |
| 2019/0183076 | A1* | 6/2019 | Muramoto | A01G 31/04 |
| 2019/0191639 | A1* | 6/2019 | Hegyi | A01G 9/023 |
| 2019/0208711 | A1* | 7/2019 | Sahu | A01G 9/247 |
| 2019/0265162 | A1* | 8/2019 | Fujiyama | G06T 7/001 |
| 2019/0313584 | A1* | 10/2019 | Chen | H05B 45/00 |
| 2019/0327913 | A1* | 10/2019 | Chong | B65G 1/04 |
| 2019/0350054 | A1* | 11/2019 | Neri | H02M 3/33569 |
| 2019/0350150 | A1* | 11/2019 | Jennings | A23L 3/3409 |
| 2019/0369609 | A1* | 12/2019 | Takashima | G01J 1/42 |
| 2020/0022324 | A1* | 1/2020 | Jennings | A01G 31/06 |
| 2020/0068810 | A1* | 3/2020 | Pahlevaninezhad | A01G 7/045 |
| 2020/0107504 | A1* | 4/2020 | Bongartz | A01G 7/045 |
| 2020/0137964 | A1* | 5/2020 | Bouchard | A01G 9/246 |
| 2020/0163285 | A1* | 5/2020 | Sim | A01G 18/00 |
| 2020/0214226 | A1* | 7/2020 | Yukawa | A01G 9/249 |
| 2020/0214228 | A1* | 7/2020 | Cho | A01G 9/18 |

FOREIGN PATENT DOCUMENTS

| | | |
|---|---|---|
| JP | 2011177127 A | 9/2011 |
| JP | 2012254058 A | 12/2012 |
| KR | 20110092151 A | 8/2011 |
| WO | 2014159091 A1 | 10/2014 |

OTHER PUBLICATIONS

International Preliminary Report on Patentability for PCT Patent App. No. PCT/US2014/021917, dated Sep. 24, 2015.

International Search Report and Written Opinion for PCT Patent App. No. PCT/US2014/021917, dated Jul. 18, 2014.

* cited by examiner

Figure 2

- ⑫ SS = Seedling Stress Time => Total # of Hours
- ⑬ $A_i$ = Ratio factor of turning on and off lights
- ⑭ $AT_i = A_i * 60$ => Total number of minutes lights ON with the same number of minutes OFF
- ⑮ $T_s$ = Timing total of light cycles in Phase $A_i$
- ⑯ $T_s = 1/3\ SS$
- ⑰ $C_i$ = The total of ON and OFF cycles in a given subphase of $A_i$, whereby one cycle is turning the lights ON and OFF
- ⑱ $C_i = T_s / 2A_i$
- ⑲ R = Recommended Lighting Cycles for a given plant species in given hours/day

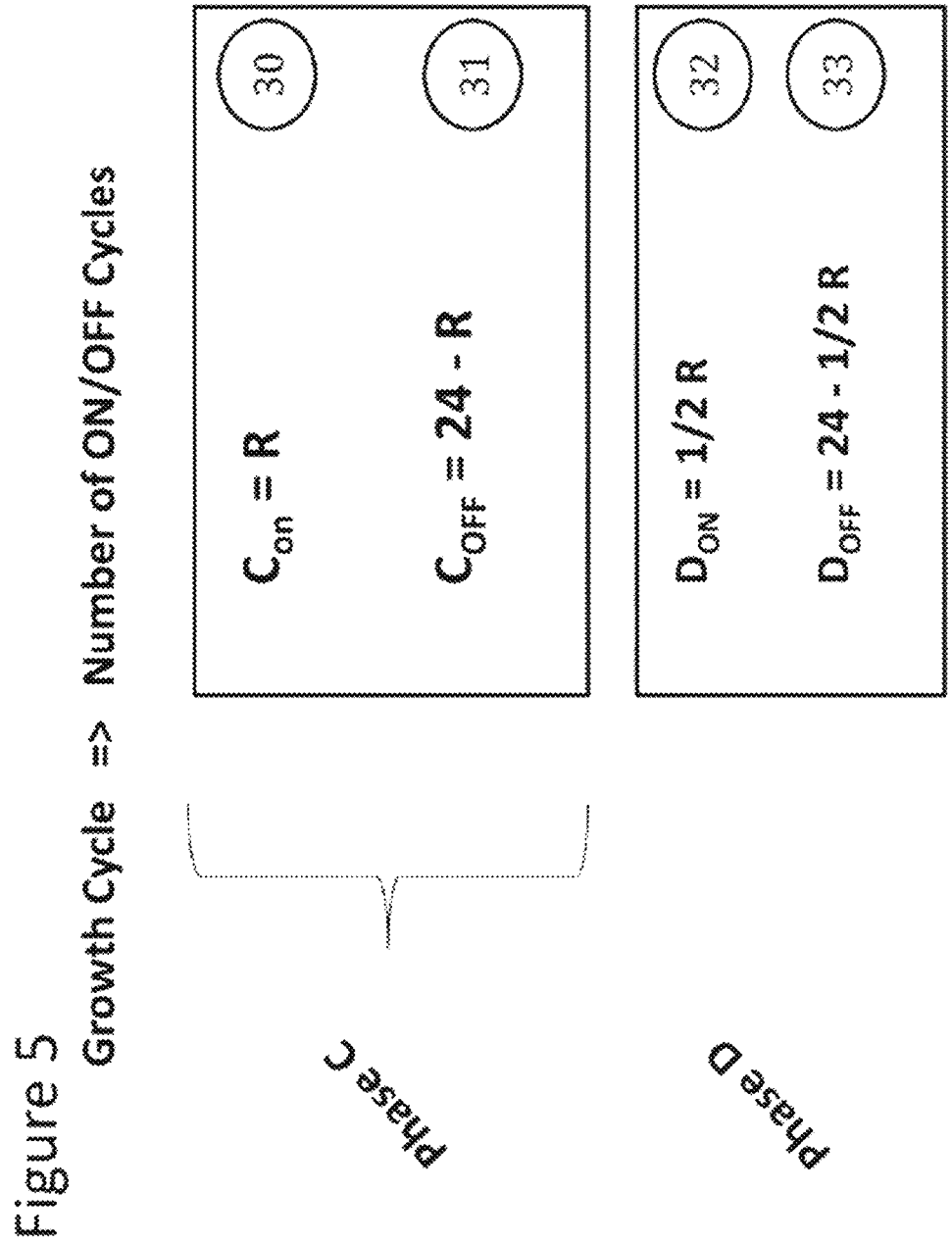

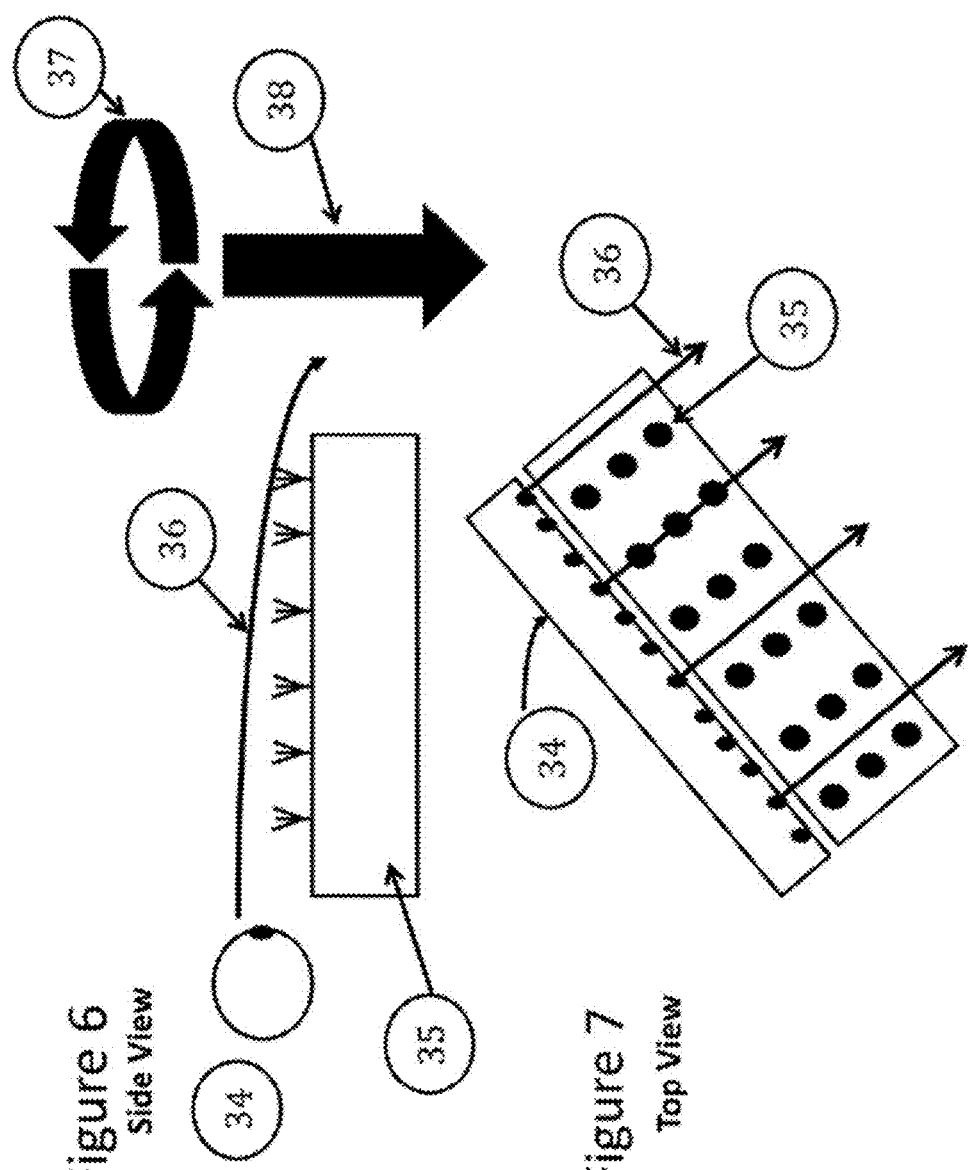

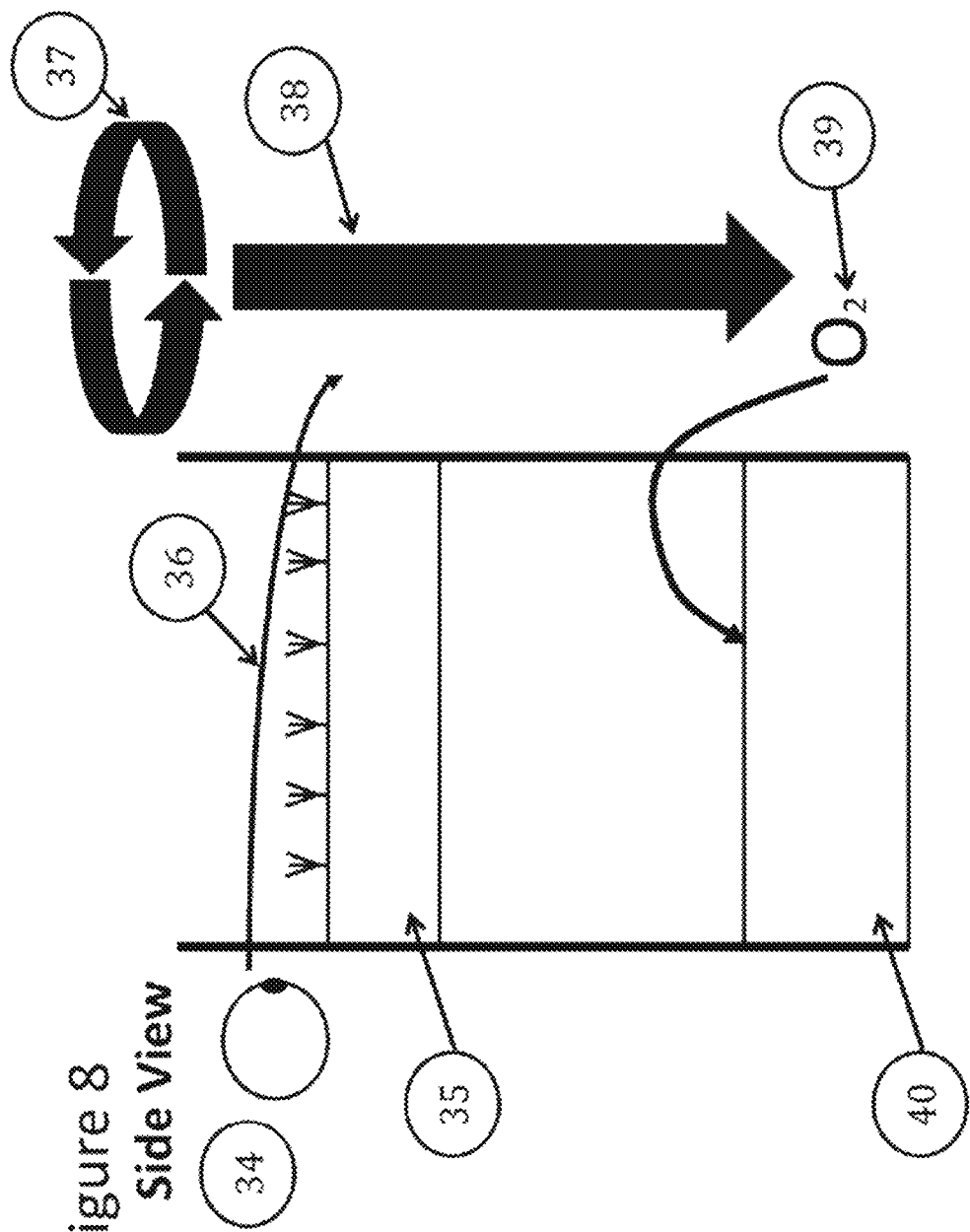

Figure 10

Heated Nutrient Equations

- (53) R = Optimal Hydroponic nutrient temperature for a specific plant species.
- (47) Phase $A_1$ => $.7 * R$
- (48) Phase $A_2$ => $.75 * R$
- (49) Phase $A_3$ => $.8 * R$
- (50) Phase B => $R$
- (51) Phase C => $R$
- (52) Phase D => $.7 * R$ Figure 15  Electrical System Fig. 20 Timing of pH in Plant Growth Cycle for Lettuce Phase $A_1$ => 1.2 * P
Phase $A_2$ => 1.1 * P
Phase $A_3$ => P
Phase B => 0.6 * P
Phase C => 1.2*P
Phase D => P
P = Average Plant pH Preference Figure 21 Water Recirculation & Dehumidification systems for reclaiming aspirated water in a (HG HD CEHS)

Figure 23  Cell Replication Control

Figure 24

Desired Cell Replication Control

| Appropriate Percentage of Reduced | |
|---|---|
| 0 – 10% | $A_1$ |
| 10% – 30% | $A_1, A_2, C_1$ |
| 30% – 45% | $A_1, B_2, C_1$ |
| 45% – 65% | $A_1, B_1, B_2, C_2$ |
| 65% – 80% | $A_1, B_1, B_2, C_2$ |

(113) (114) (115) (116) (117)

Figure 25    Cell Replication Control Variables

(118) $A_1 \Rightarrow$ Air Temp < 64°F (119) $A_2 \Rightarrow$ Air Temp < 58°F (120) $B_1 \Rightarrow$ Change out nutrient solution for water with pH of 7

(121) $B_2 \Rightarrow$ Nutrient solution Temp < 64°F (122) $C_1 \Rightarrow$ 1/3 * R (123) $C_2 \Rightarrow$ 1/5 * R (124) R = Recommend Lighting Cycle for a given plant species in given hours/day.

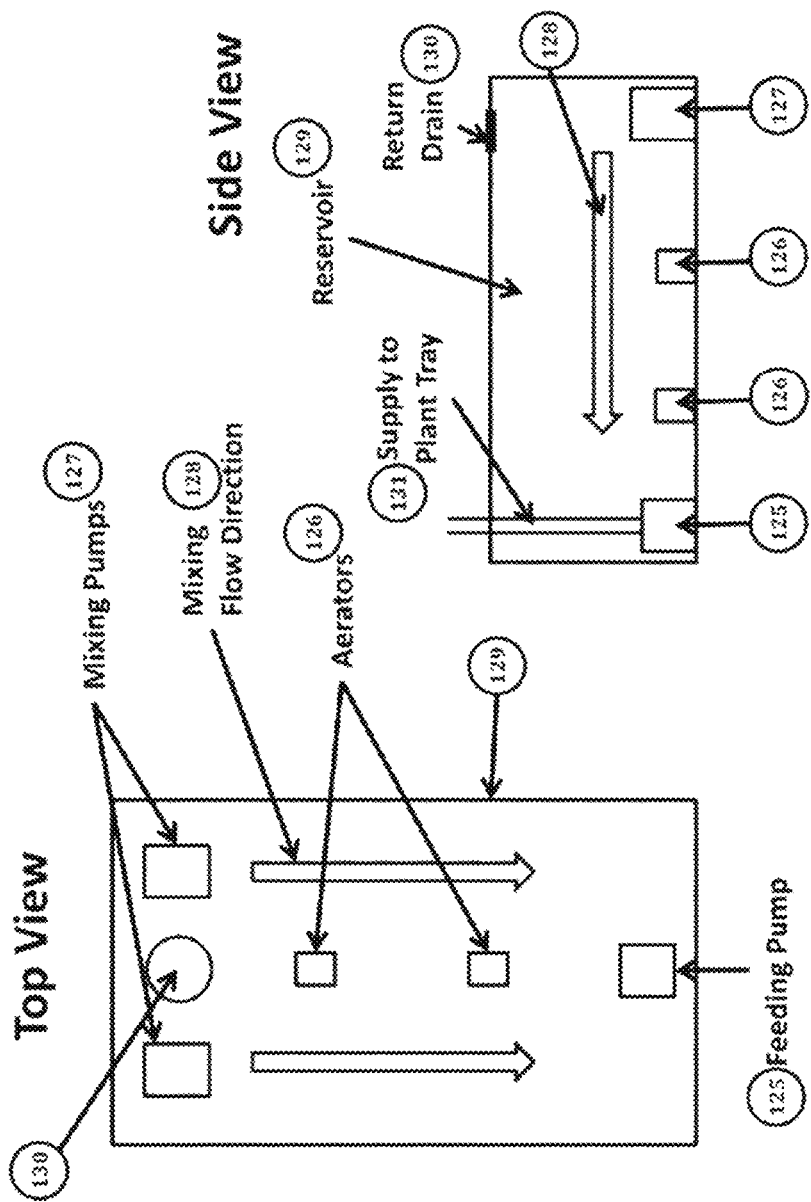
Figure 26  Nutrient Solution Mixing System

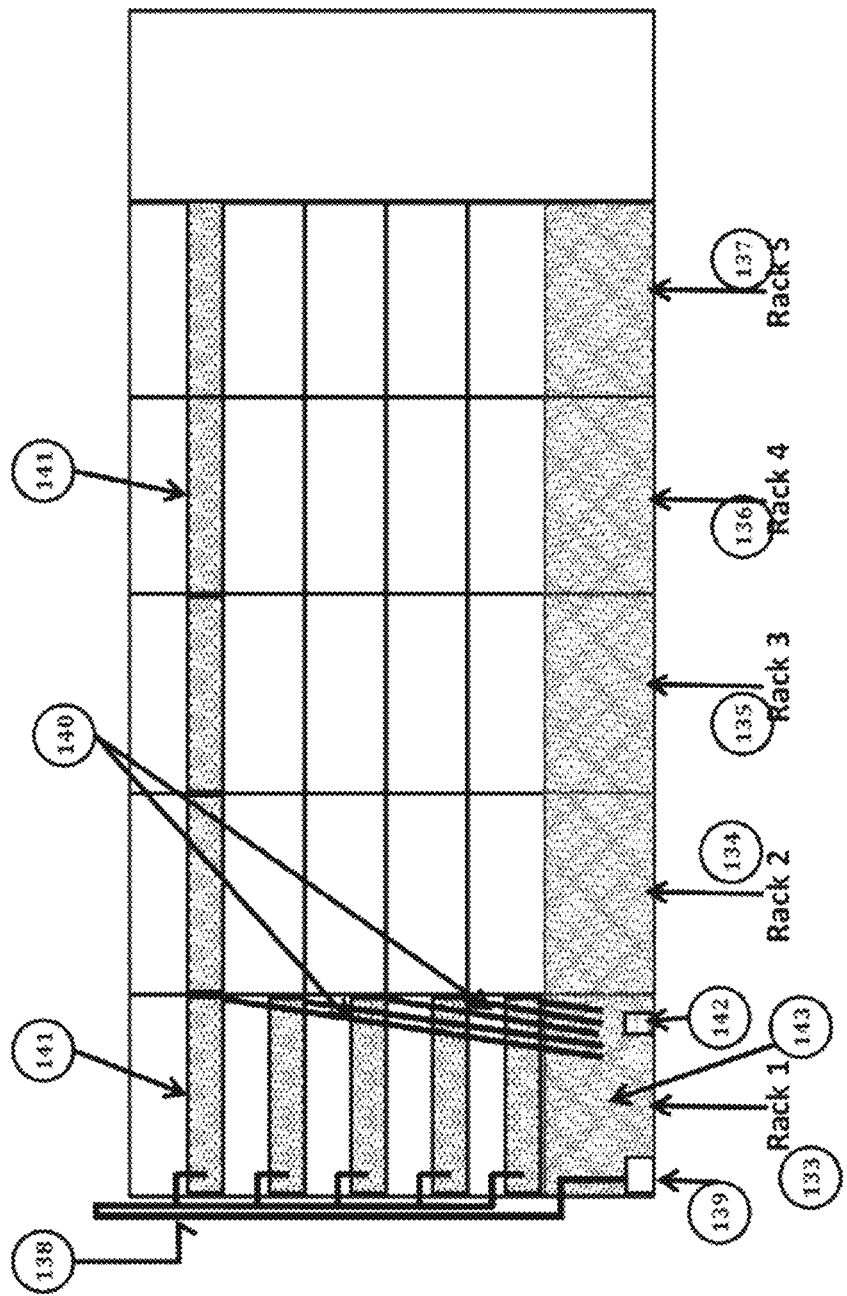
Figure 27  Distributed Hydroponic Solution Delivery System for Isolated Pathogenic Risk Mitigation

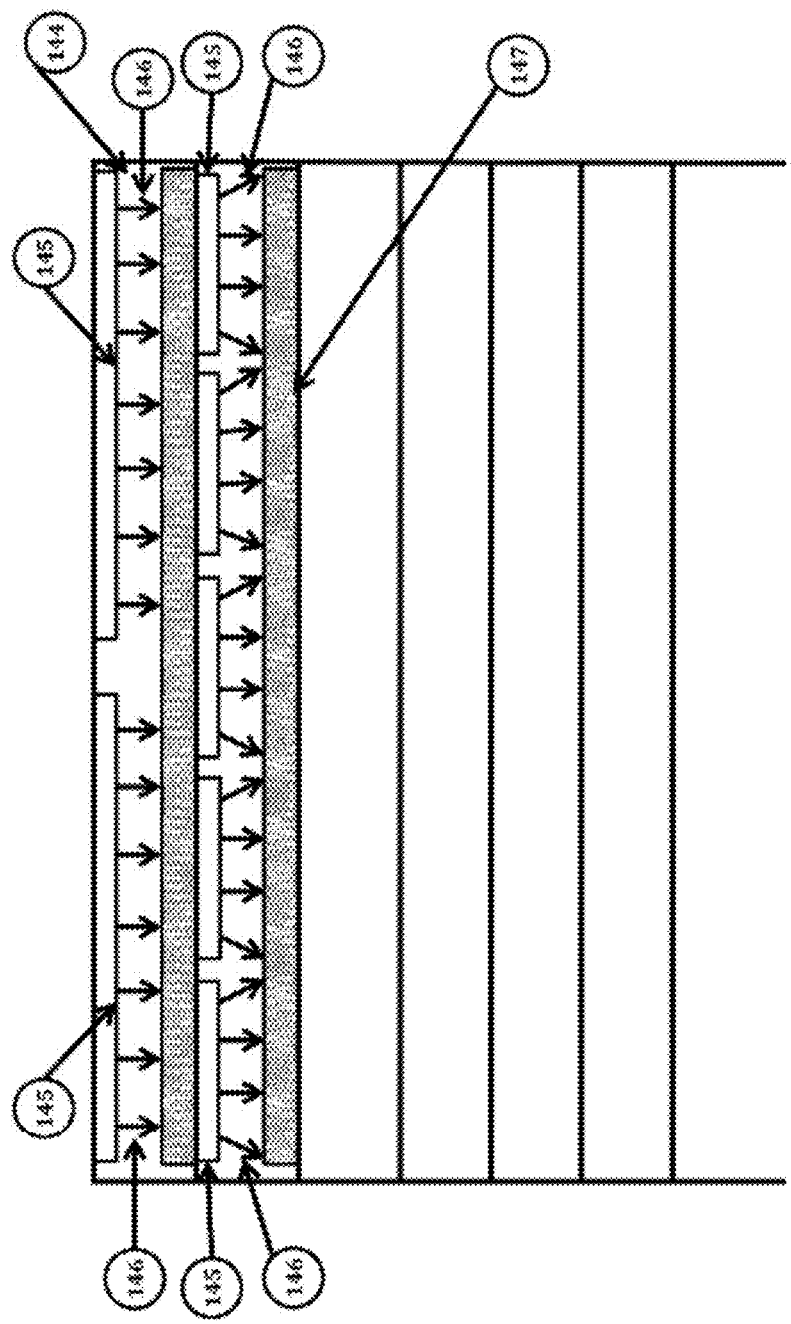

Figure 29

Light Emitting Diode (LED)
Red/Blue Lighting Configuration

Top View

| R | B | R | B | R | B | R | B |
|---|---|---|---|---|---|---|---|
| B | R | B | R | B | R | B | R |
| R | B | R | B | R | B | R | B |
| R | R | B | R | R | B | R | R |

$R_w$ = Wattage per Square Foot $R_w$ = 25 watts for Red/Blue LED
Red LED => 640Nm to 720Nm (81%)
Blue LED => 400Nm to 480Nm (19%)

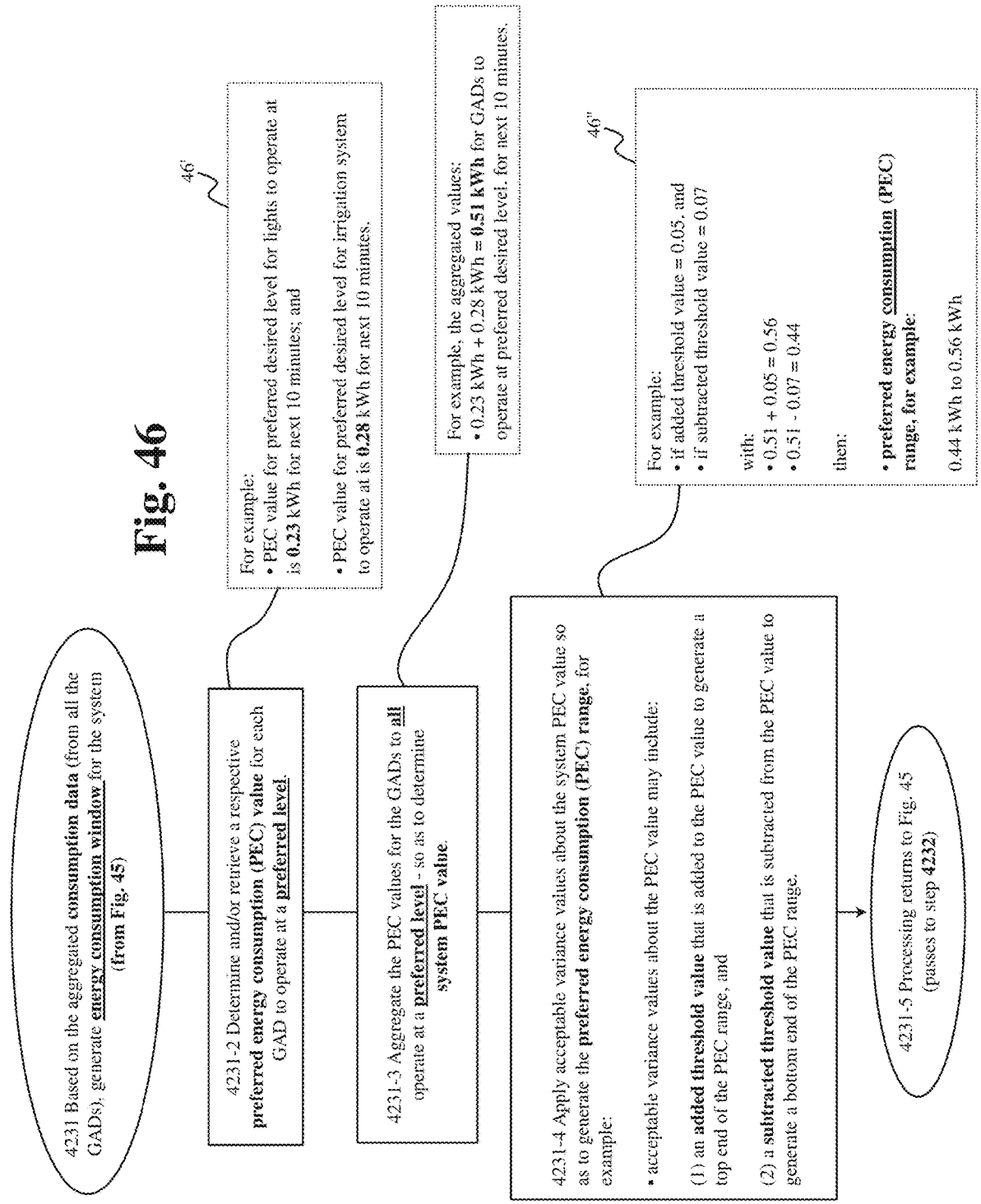

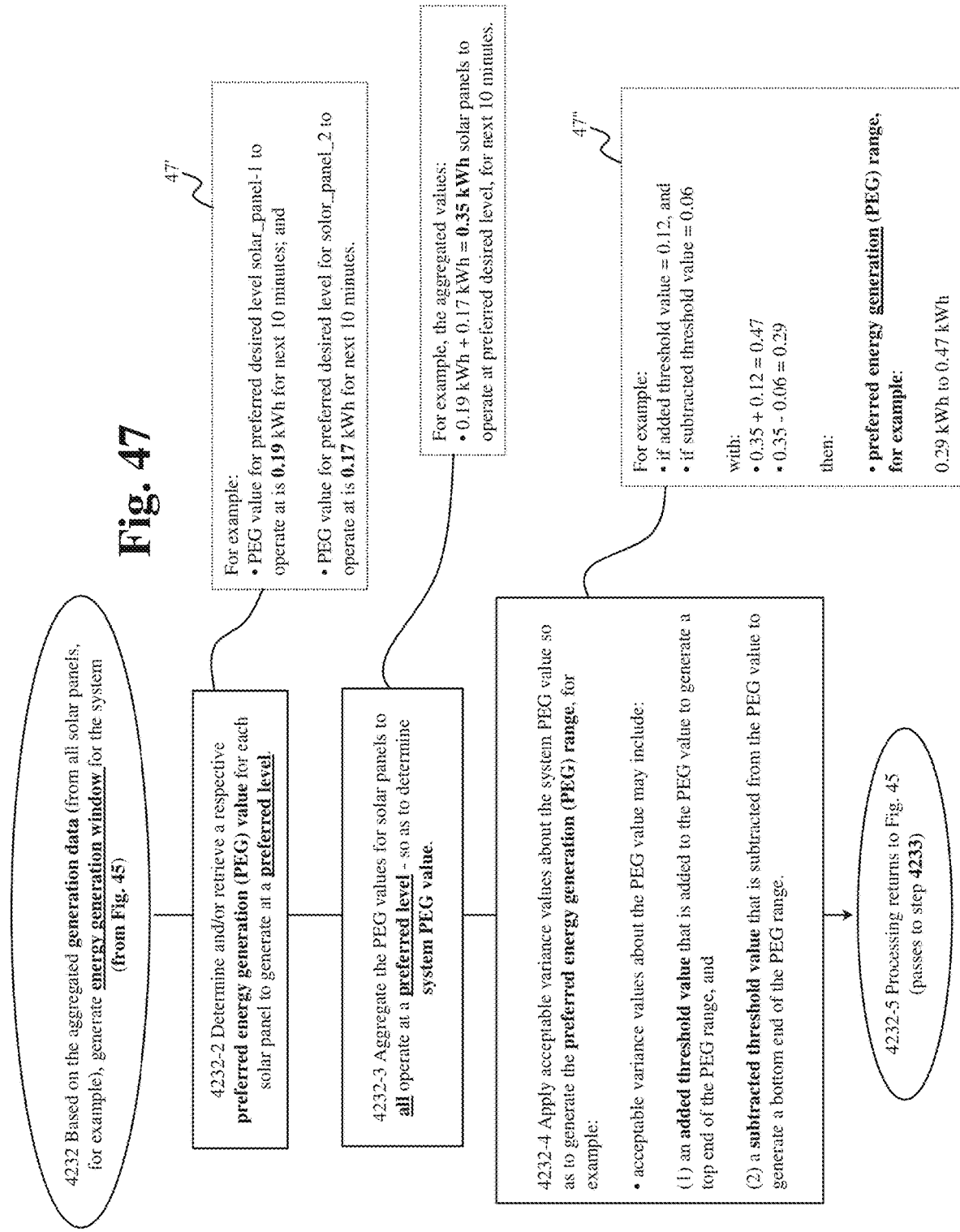

SYSTEMS AND METHODS FOR PROVIDING A LOW ENERGY USE FARM

BACKGROUND

The disclosed subject matter relates to systems and methods to provide a controlled, closed environment for plant growth.

The cost of growing and providing vegetables, fruits and other produce to the population is ever increasing. The sprawl of the human population takes more and more of the land available for conventional farming. The farms that exist are constantly being pushed further away for the population centers. The increased distance of transporting the produce, as well as the increased cost of transportation overall, causes increases in the produce costs to the consumer. The increased distance of transporting the produce also results in a decrease in freshness resulting from the increasingly longer transport distances and time involved. In general, the amount of land which supports conventional farming is shrinking. Therefore, there is a need to provide a new system for growing produce that can be implemented close to population centers and also in areas and locations that have not previously been able to be used for farming.

SUMMARY

Disclosed herein is high growth system (HG system) that, in some embodiments, includes a sealed, low energy use vertical farm. In some embodiments, there are sensors provided on each shelf so that each plant receives an optimize amount of light—whether that is filtered sunlight or artificial light—on stacked shelving in the vertical farm. In some embodiments the sensors adjust the lighting per shelf for the plants.

Disclosed herein is high growth system (HG system) that, in some embodiments provides an energy efficiency infrastructure, both through a biodigester, and using combined heat and power (co-generation) cooling solution. In some embodiments, energy is supported through a solar panel array in a nearby area, such as a parking lot. In some embodiments, the high growth system may employ an absorption chiller and geothermal cooling system to both provide needed heating and power, as well as to be energy efficient.

Disclosed herein is high growth system and features and methods thereof. In some embodiments, the HG system includes a high growth, high density growing system that is at least a partially closed environment. In some embodiments, the HG system includes a high growth, high density growing system that is a closed environment. Throughout this specification, various aspects of the invention are described in the context of an HG system being a high growth, high density, closed environment system. Such description is exemplary in that the methods, systems, features and characteristics, as well as other aspects, described herein may be used with any growing system, as may be desired.

In an aspect, the HG system includes a low energy controlling temperature throughout the growth cycle of a plant and adjusting the lighting of the plant in accordance with a growth stage of the plant. Other environmental attributes may be controlled such as the gaseous environment in which plants are grown. For example, the HG system may control the delivery of carbon dioxide to a plant and control oxygen content in the environment in which the plant is grown. The HG system may be a closed environment hydroponic system. The HG system may be a soil based system.

In an aspect, a method of the HG system may include determining light timing to optimize plant growth. The light timing may include varying the type of light and the level of light based on such variables as plant species, seedling stress time (SS time), growth maturity height, plant maturity phase, and plant growth time, for example. Growth start height may be measured for a seedling planted into the HG system from the base of the growth medium to the top of the seedling plant. Growth maturity height may be measured from the base of the growth medium to the top of the fully mature plant.

In an aspect, the HG system may include a system for optimal carbon dioxide enrichment for plant production in a growing system may include a carbon dioxide tubing hung in a secured position on one side of a grow media tray to form a distribution point. The system evenly disperses carbon dioxide across the hydroponic grow media from the distribution point. A maximum amount of released carbon dioxide will be across the hydroponic grow media, thus allowing for the full potential of carbon dioxide enrichment within hydroponic system. The system forms a negative overhead pressure that forces expired oxygen to sink and be reclaimed into the hydroponic system. The expired oxygen may be recaptured in a water reservoir tank to improve nutrient oxygenation. The growing system may be a closed environment hydroponic system.

In an aspect, the HG system may include a non-transitory computer-readable storage medium with an executable program stored thereon, wherein the program instructs a processor to perform steps including, for example, to determine or utilize a plant growth profile and control environmental attributes based on the plant growth profile, including supply carbon dioxide based on a plant growth profile.

In an aspect, a method of growing plants may include placing plants in a receptacle and providing conditions for growth of the seedlings, and growth of the mature plants, and then removing the mature plants from the receptacle. An apparatus for growing plants may include a series of stacked shelves in a rack, each capable of receiving a receptacle containing seeds or plants, each divided into a number of successive zones in which the plants may be exposed to the necessary environmental conditions for the particular stage of growth in that zone. A receptacle for receiving plants may include a flood tray having a drain hole, the drain hole being fitted with a drain control arrangement that includes a tube that returns to the reservoir.

In an aspect, the HG system may include a series of racks connected together from left to right and a further series of racks may be connected from right to left. On the racks, shelving may be mounted one above the other, so that the headroom of the lower rack is measured at approximately a distance equal to the maturity height of the plant or to some other suitable height. A plurality of series of shelves are mounted one above the other, each series of shelves being provided with lighting arrangement, water and/or nutrient feeding arrangement, and drain arrangement. The feeding arrangement to each series of inclined racks may be divided up into zones along the length of the rack so that different feeding solutions can be dispensed to each zone. Each zone may have an associated drain system which may collect the drained feed solution individually or return it all to a common sump hole for disposal or recycling.

In an aspect, the HG system may include a low voltage growing system including lighting and mechanical systems connected to a step down transformer, or other electrical arrangement, that converts high voltage a.c. power to d.c. low voltage power. In at least one embodiment, the environment of the HG system may be powered by a d.c. voltage system. The d.c. power may supply any of the system mechanicals described herein.

In an aspect, the HG system may include supplying an even nutrient solution to the roots of a plant across a hydroponic solution medium regardless of the grow medium used. The normal nutrient solution may be drained and a measured amount of more highly concentrated nutrient solution may be introduced into the nutrient supply. In some embodiments, the nutrient solution passes only once across the root system, and the solution in the collecting area is drained. The nutrient solution conveyed to the collecting area is subsequently fed to the plant. The supply of nutrient solution is static.

In an aspect, the HG system includes an apparatus for cultivating a plant hydroponically may include a tube of numerous flow holes to distribute the nutrient solution over a higher density root system. The apparatus may further include a facility to adjust the flow holes according to the plant species and the level of root growth. The plant receives the same amount of nutrient solution in the center of a hydroponic flood tray as at the edges of the system. The collecting arrangement may include a vessel floating in said supply of nutrient solution. The supply of nutrient solution is static. The method may be employed in a closed environment hydroponic system.

In an aspect, the HG system may include a dehumidifier in a closed environment of the kind having a vapor compression circuit containing an evaporator and a condenser and arranged to operate with alternating water extraction and defrost phases, the dehumidifier including a temperature sensor arranged to monitor the operating temperature of the evaporator, and a control facility for controlling the duration of the water extraction and defrost phases. The control facility may be arranged to read a reference temperature from the said sensor during a water extraction phase and starts the defrost phase when the evaporator temperature reaches a calculated temperature below the reference temperature. The control facility may be arranged to take temperature readings from the said sensor at predetermined intervals and calculate the rate of fall of the evaporator temperature, starting the defrost phase when the calculated rate of temperature fall exceeds a predetermined figure. The water extracted may be recirculated into the water reservoirs in the hydroponic container.

In an aspect, a method may include controlling certain environmental factors in a high density environment to considerably slow down the plant cell replication process thereby extending the growing cycle of a given plant species. The air, lighting, and nutrient systems are controlled to adjust the growing cycle of a given plant species.

In an aspect, the HG system may include individual shelving racks that are arranged in a closed environment and each rack has its own nutrient solution, lighting and tray assembly. The lighting, and nutrient systems for the independent racking system may be controlled such that there is no possibility of intermixing of lighting or nutrient solutions across racks and between different plant species.

In an aspect, the HG system may include a lighting unit system that include at least one LED lighting source, wherein each lighting source includes a support structure, a plurality of light emitting elements along a length of said support such as a shelving unit, and a shelving unit from which the support is to be hung. At least some of the light emitting elements emit light of a first spectral composition and at least some of the light emitting elements emit light of a second spectral composition. At least one lighting source may include at least one of a mechanical or electrical connection to another lighting strip. A lighting unit may be configured to selectively provide at least one of indirect light distribution or direct light distribution. The lighting unit may further include a computer controller configured to vary a light output of the lighting unit. The support structure may be a rigid, elongated structure similar to a rack shelving unit. The HG system may be a closed environment system.

In an aspect, a growing system for promoting the rapid growth of seedlings may include a substantially closed container, a nutrient solution within the closed container, a seedling positioned within the nutrient solution, a grow light, at least one sensor adapted to observe growth of the seedling, and a controller coupled to the grow light. The controller and the at least one sensor may be adapted to read information from the sensor to determine if growth has occurred, calculate a seedling stress duration, wherein the seedling stress duration commences with the positioning of the first seedling in the growing system and terminates when growth is observed in the first seedling, divide the seedling stress duration into a plurality of subphases, determine a subphase factor for a second seedling positioned in the growing system based on which subphase the second seedling has reached based on an elapsed time, calculate the total number of on/off light cycles and a duration for each on/off cycle, wherein one cycle is turning the lights on and off, and control the grow light to execute the total number of calculated on/off light cycles for the calculated duration of time the lights are on and time the lights are off during each cycle in the growing system. The subphase factor may be determined by multiplying the seeding stress duration by a fraction. The number of on/off light cycles may be determined by dividing the total timing of the light cycle in the subphase by two times the subphase factor. A duration the lights are on and a duration the lights are off in each on/off cycle may be calculated by multiplying the subphase factor by 60 minutes.

In one aspect, the HG system may include a grow light system including at least one of a red LED light and a blue LED light. A grow light may be of a wavelength selected in accordance with a predetermined plant species. The growth may be observed by a visual analysis of the first seedling. A sensor to monitor growth of a plant may be one or more of a video observation, a laser sensor, and a location/proximity sensor. The growth of the first seedling may be determined by measurement of a weight of the first seedling. The sensor to monitor growth of a plant may be a gas sensor such as an Oxygen sensor. The growth of the first seedling may be determined by measurement of consumption of a nutrient in a nutrient solution. The growing system may be a hydroponic growing system.

In an aspect, a method for accelerating growth of a seedling positioned in a nutrient solution in a growing system may include the steps of observing a seedling to monitor growth of the seedling over the course of a plurality of plant maturity phases, wherein a second plant maturity phase commences when growth is first observed in the seedling and terminates with the development of a full leaf or bud relative to the other leaves or buds in the seedling, a third plant maturity phase commences at the end of the second plant maturity phase and terminates when full plant maturity occurs in the plant as determined by the plant species, and a fourth plant maturity phase commences with reaching full maturity and terminates when the plant is ready to be harvested.

In an aspect, the method may include calculating a number of hours for an LED grow light to remain on during a first portion of the second plant maturity phase by multiplying a first fraction by a recommended lighting cycle in hours for a given plant species, calculating a number of hours for the LED grow light to remain off during the first portion of the second plant maturity phase by subtracting the first fraction times the recommended lighting cycle from twenty-four hours, calculating a number of hours for the LED grow light to remain on during a second portion of the second plant maturity phase by multiplying a second fraction by the recommended lighting cycle in hours, calculating a number of hours for the LED grow light to remain off during the second portion of the second plant maturity phase by subtracting the second fraction times the recommended lighting cycle from twenty-four hours, and executing the on/off light cycles for the calculated durations in the growing system by controlling a grow light in accordance with the on/off light cycles to result in accelerated growth of the seedling. The first fraction may be ⅓ and the second fraction may be ⅔.

In an aspect, the method may further include using the recommended lighting cycle for a number of hours the LED grow light is to remain on per day during the third plant maturity phase and calculating a number of hours for the LED grow light to remain off during the third plant maturity phase by subtracting the recommended lighting cycle from twenty-four hours. The method may further include calculating a number of hours for the LED grow light to remain on per day during the fourth plant maturity phase by multiplying ½ times the recommended lighting cycle and calculating a number of hours for the LED grow light to remain off during the fourth plant maturity phase by subtracting ½ times the recommended lighting cycle from twenty-four hours. At least one of a grow light wavelength, temperature, and nutrient concentration may be varied over the plant maturity phases.

The method may further include the step of withdrawing nutrient solution when the plant reaches the fourth plant maturity phase or some other phase. The method may further include the step of terminating all light cycles when the plant reaches a harvest stage. The method may further include the step of reducing the temperature in the growing system when the plant reaches the fourth plant maturity phase or some other phase. The grow light may be at least one of a red LED light and a blue LED light. The grow light may be of a wavelength selected in accordance with a specific plant species. Growth may be observed by a visual analysis of the seedling. Growth of the seedling may be determined by one or more of a video observation, a laser sensor, and a location/proximity sensor. Growth of the seedling may be determined by measurement of a weight of the seedling. Growth of the seedling may be determined by measurement of an Oxygen output in the system by an Oxygen sensor. Growth of the seedling may be determined by measurement of a concentration of a nutrient solution to determine the seedling consumption.

In an aspect, a growing system for promoting the rapid growth of seedlings may include a substantially closed container, a nutrient solution within the closed container, a seedling positioned within the nutrient solution, a grow light, and a controller coupled to the grow light adapted to receive information on a growth of the seedling, calculate a seedling stress duration, wherein the seedling stress duration commences with the positioning of the first seedling in the growing system and terminates when growth is observed in the first seedling, divide the seedling stress duration into a plurality of subphases, determine a subphase factor for a second seedling positioned in the growing system based on which subphase the second seedling has reached based on an elapsed time, calculate the total number of on/off light cycles and a duration for each on/off cycle, wherein one cycle is turning the lights on and off, and control the grow light to execute the total number of calculated on/off light cycles for the calculated duration of time the lights are on and time the lights are off during each cycle in the growing system. The growing system may be a closed environment hydroponic system.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The disclosed subject matter of the present application will now be described in more detail with reference to exemplary embodiments of the systems and methods, given by way of example, and with reference to the accompanying drawings, in which:

FIG. 2 describes the variables used to compute a timed growth curve for a specific plant species.

FIG. 5 describes the formulas used for Phases C and D in the growth cycle of the plant.

FIG. 6 is a side view of the system.

FIG. 7 is a top perspective view of the system.

FIG. 8 is a side view of the system including the recapturing of the oxygen according to the disclosure.

FIG. 10 describes the optimum temperature range for a plant which has a recommended hydroponic nutrient temperature range of "R" for a given plant species.

FIG. 24 illustrates a table of variables to control that correspond to the desired reduction in plant cell growth.

FIG. 25 illustrates environmental variables used in the hydroponic environment to control the plant cell replication.

FIG. 26 depicts a system for nutrient mixing.

FIG. 27 is a side view of a hydroponic container consisting of a number of hydroponic shelving racks.

FIG. 28 depicts a single rack with LED lights.

FIG. 29 outlines the required wattage per square foot and the placement of LED lights.

FIG. 46 is a flowchart showing further details of "consumption window" generation of FIG. 45, in accordance with the disclosed subject matter.

FIG. 47 is a flowchart showing further details of "generation window" generation of FIG. 45, in accordance with the disclosed subject matter.

DETAILED DESCRIPTION OF EXEMPLARY EMBODIMENTS

Figure 1A:
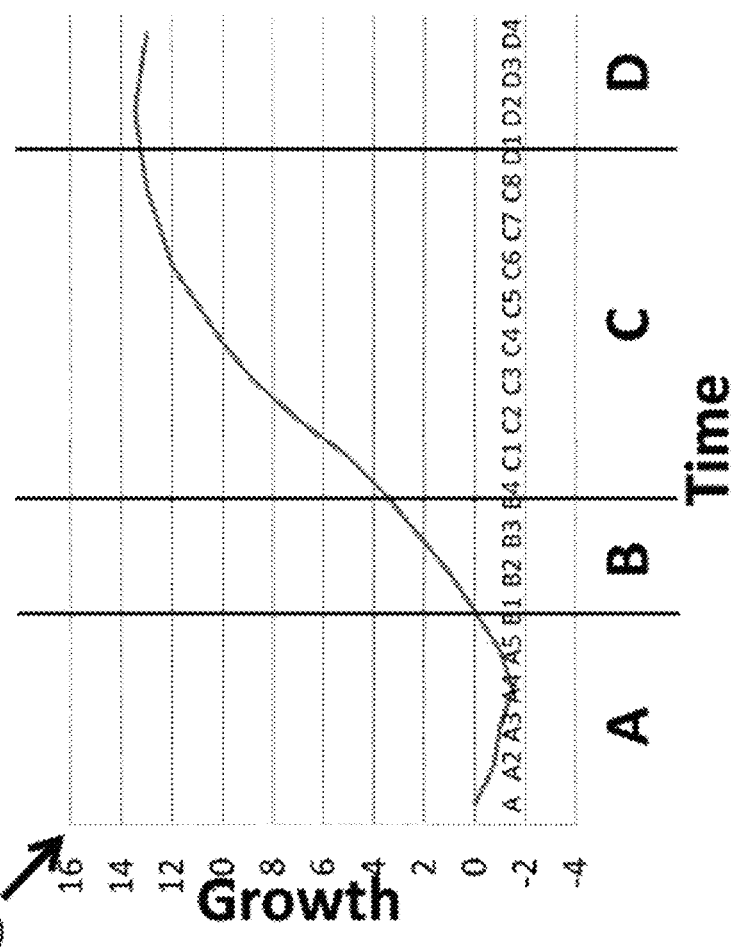
FIG. 1A describes a general plant growth curve including different phases of plant development.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In an aspect, a high growth, high density, closed environment system for growth of plants on a continuous basis is described. The system features pesticide-free, on-site production with a low carbon footprint. The system enables multiple harvests from the same seedling. The system enables the production of produce that has never been touched or sprayed and exhibits a long shelf life. In embodiments, various methods and systems disclosed herein may be used individually in a growing system. In embodiments, one or more methods and systems may be used in combination with one another in a growing system. Further, various methods and systems disclosed herein may be used in any growing system including hydroponic systems, aquaculture systems, aeroponic systems, soilless systems, terrestrial systems, and the like, for example.

In an aspect, a method for adjusting the timing of a lighting system of a growing system is provided. The growing system may be a closed environment system. The timing of the lighting system may be controlled based on various parameters. For example, the timing of the lighting system may be calculated from an equation based upon the seedling growth inside the environment along with the power and distance of the lighting. The ON and OFF timing of the LED lights may be directly correlated to the particular plant's relative progress on the standard plant growth curve. The lighting system may use LED lights. Represented by an equation, the timing of the lights may be determined by a number of variables along the plant growth curve to optimize the total time from which plants are grown from a first stage to a second stage.

Light timing is an important aspect of plant growth in a growing environment. In particular, LED lighting may be used. LED lighting, which may include lights in the red and blue spectrum, may play a role in the plant's photosynthetic reaction. Grow lighting provides the energy that drives the photosynthetic reaction in the chloroplast, thus, the timing of plant exposure to this energy source is important in order to coordinate the photosynthetic reaction with the building and replication of plant cells. Optimizing the photosynthetic reaction in a plant is important. If too little energy (i.e. too little light) is provided, not enough of the photosynthetic reaction may occur to provide the sugar needed for cell replication. If too much energy (i.e. too much light) is provided, energy that is not used in photosynthesis is transferred as heat into the plant cells, which can damage or destroy the cells. Therefore, in an aspect of the HG system lighting may be controlled based on attributes of the light, the position of the light relative to the plant, and the particular plant, for example. In one embodiment, an equation may be used to determine the optimum growing cycle for the plant regardless of the plant species. The lighting system of the present disclosure provides a method for optimizing crop production in a growing system by using a controlled lighting system. The controlled lighting system may be in the form of a timed lighting algorithm.

In aspects of the invention, the HG system controls various environmental attributes based on the maturity phase of a plant. Accordingly, various plant maturity phases and other variables are described herein. Plant maturity phase-A is determined from the time the plant is positioned in the system until the first growth occurs in the plant. Plant maturity phase-B is determined from the time the plant starts growing until new growth which could be either leaves or buds occur. Plant maturity phase-C is determined from the time of new leaves or buds until the time plant maturity occurs in the plant as determined by the plant species. Plant maturity phase-D is determined at the time the plant is ready to be harvested.

Unless stated otherwise, "SS" refers to the total seedling stress time measured in the total number of hours from the time a plant seedling is planted in a grow system until the time growth is noticed in the seedling itself. Growth may be noted by a visual analysis but may also be noted by video observation, laser sensors, or location/proximity sensors, for example. Automatic size/growth stage measurement may be made by examining the height, such as by video or laser or the like, weight of the plant, Oxygen sensor to measure Oxygen output in the air, PPM concentration of the nutrient solution to determine consumption (e.g. as plants consume more water, elementals get more concentrated), and the like.

Unless stated otherwise, "$A_i$" refers to the ratio factor, also known herein as a subphase factor, used when turning on and off the lights in the plant growing environment. Unless stated otherwise, "$AT_i$" refers to the total number of minutes the grow lights remain ON and an identical number of minutes the grow lights remain OFF. Unless stated otherwise, "$T_s$" refers to the total time in a given Phase $A_i$ measured in hours. Unless stated otherwise, "$C_s$" refers to the total number of lighting cycles in a given Phase $A_i$ (that is, a complete ON and OFF operation of equal time period $AT_i$). Unless stated otherwise, "R" refers to the daily recommended lighting time for a given plant species measured in hours.

Figure 1B:
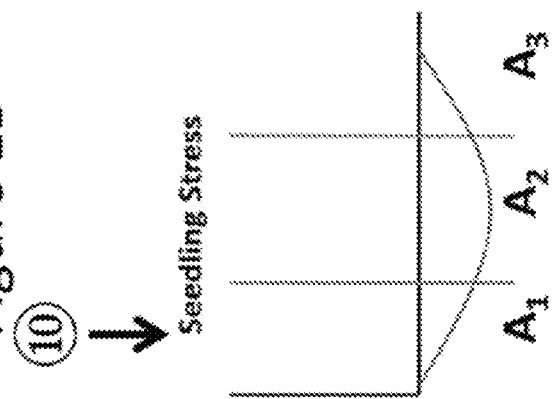
FIG. 1B depicts a graph of seedling stress.
Figure 3:
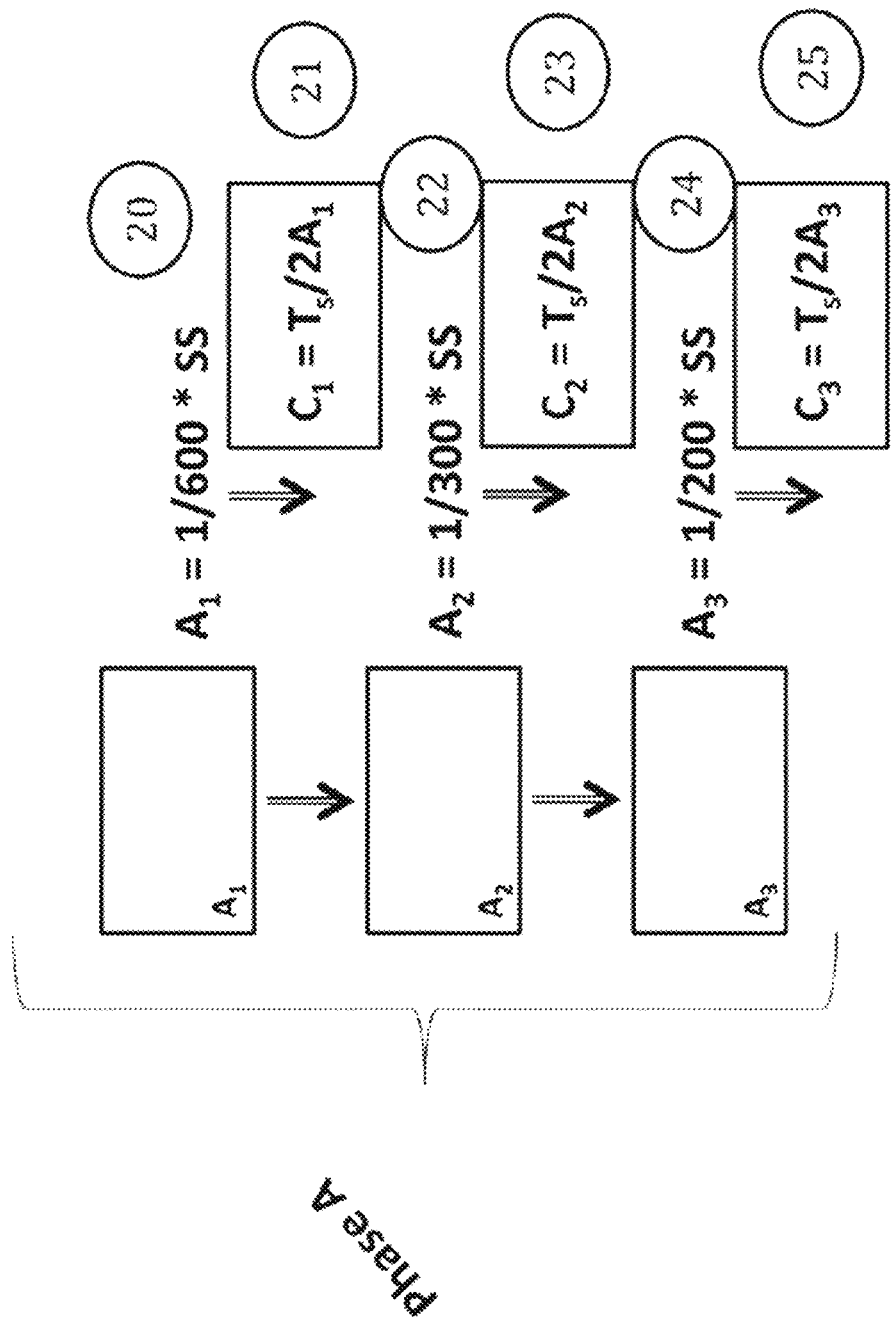
FIG. 3 describes the formulas used for Phase A in the cycle of growth of the plant.

Referring to FIGS. 1A and 3, the plant growth curve is divided among four distinct phases of growth, Phases A, B, C, and D, which have been previously described herein. Phase A is the seedling stress phase whereby seedlings are immersed in a growth medium and begin to die before the roots have the ability to take in nutrients. Data in FIG. 1B illustrates that Phase A may be further delineated into three different subphases of seedling stress growth. These three subphases of seedling stress growth may be equal in timing. In one embodiment, a seedling stress phase duration may be 72 hours.

FIG. 3 delineates the three subphases labeled Phase A1, A2, and A3.

For Phase A1, determining the ratio factor of the seedling is done by multiplying the seedling stress time by 1/600, as in equation 20 depicted in FIG. 3. To determine the total number of ON/OFF cycles in this subphase, the total timing of the light cycle in Phase A1 is divided by two times the ratio factor of turning ON/OFF the lights, as in equation 21 depicted in FIG. 3. The timing intervals of these ON/OFF cycles is computed by taking the ratio factor of the seedling and multiplying it by 60 to determine the total number of minutes in the ON/OFF cycle, as shown in equation 14 depicted in FIG. 2.

For Phase A2, determining the ratio factor of the seedling is done by multiplying the seedling stress time by 1/300, as in equation 22 depicted in FIG. 3. To determine the total number of ON/OFF cycles in this subphase, the total timing of the light cycle in Phase A2 is divided by two times the ratio factor of turning ON/OFF the lights, as in equation 23 depicted in FIG. 3. The timing intervals of these ON/OFF cycles is computed by taking the ratio factor of the seedling and multiplying it by 60 to determine the total number of minutes in the ON/OFF cycle, as shown in equation 14 depicted in FIG. 2.

For Phase A3, determining the ratio factor of the seedling is done by multiplying the seedling stress time by 1/200, as in Equation 24 depicted in FIG. 3. To determine the total number of ON/OFF cycles in this subphase, the total timing of the light cycle in Phase A3 is divided by two times the ratio factor of turning ON/OFF the lights, as shown in equation 25 depicted in FIG. 3. The timing intervals of these ON/OFF cycles is computed by taking the ratio factor of the seedling and multiplying it by 60 to determine the total number of minutes in the ON/OFF cycle, as shown in equation 14 depicted in FIG. 2.

Once new leaves or buds have grown on the plant, the plant enters Phase B of the growth cycle. This phase is defined from when new growth is started until a full leaf or bud has developed relative to the other leaves or buds in the seedling.

Figure 4:
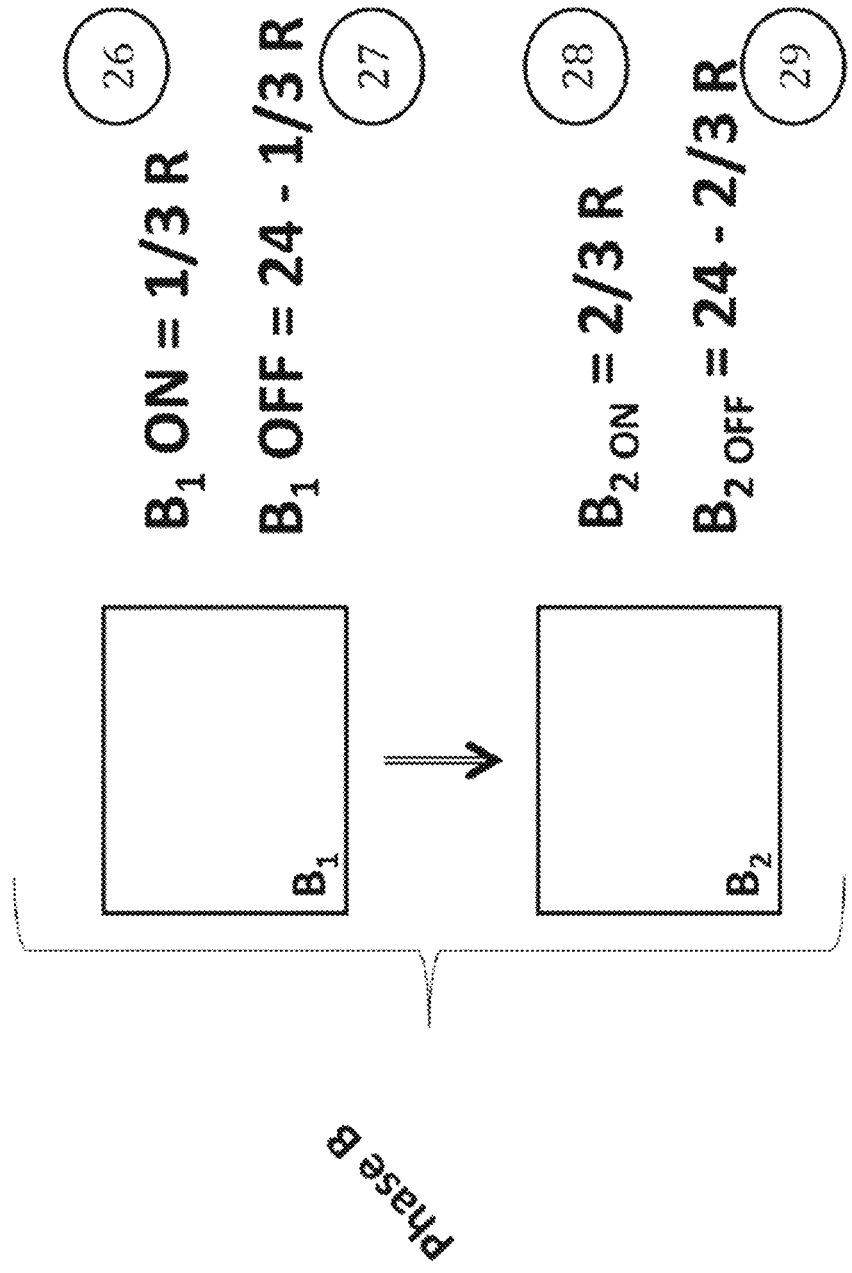
FIG. 4 describes the formulas used for Phase B in the growth cycle of the plant.

FIG. 4 illustrates the two subphases of Phase B labeled B1 and B2. In an embodiment, Phase B1 and Phase B2 may be equal in duration.

For Phase B1, the amount of hours ON for the lighting is determined by multiplying 1/3 by the recommended lighting cycle for a given plant species specified in hours, as shown in equation 26 depicted in FIG. 4. The OFF time is calculated by subtracting 1/3 times the recommended lighting cycle from twenty-four hours, as shown in equation 27 depicted in FIG. 4. In an embodiment, a recommended lighting cycle may be 18 hours.

For Phase B2, the amount of hours ON for the lighting is determined by multiplying 2/3 by the recommended lighting cycle for a given plant species specified in hours, as shown in equation 28 depicted in FIG. 4. The OFF time is calculated by subtracting 2/3 times the recommended lighting cycle from twenty-four hours, as shown in equation 29 depicted in FIG. 4.

Referring now to FIG. 5, Phase C is considered the growth of a full leaf or bud relative to the previously determined plant's maturity. To calculate the timing of the lights, it is determined that the lights are in the ON position for a period that is recommended for that given plant species, as shown in equation 30. The time that the lights are OFF in this cycle is determined by subtracting the recommended light cycle in a given day from twenty-four to determine the hours OFF, as shown in equation 31.

For Phase D, also shown in FIG. 5, when the plant has reached its final maturity status, the time that the lights are ON is determined by multiplying 1/2 by the recommended lighting cycle, as shown in equation 32. The time the lights remain off is determined by subtracting 1/2 times the recommended lighting cycle from twenty-four hours.

In practice, exposing seedlings according to formula-driven light cycles may result in minimizing over-exposure to light energy in the early, sensitive stages of growth. One result may be a lighting profile such as seedlings receiving 1 hour of light exposure then 15 minutes rest initially, then 2 hrs on and ½ hr off, until the seedling is ready for a full light cycle, such as an 18 hr light cycle or 12 hrs on/3 hrs off.

In embodiments, the lighting system in the growing system may be programmed so as to be controlled in some predetermined manner in accordance with the formulas presented herein. Such control may be performed with a lighting algorithm, in accordance with at least one embodiment of the invention. Thus, a computer may be programmed to adjust the timing and duration of lights based on the identified stage of growth of a plant in accordance with calculated light cycles. Further, lights in the red and blue visible spectrum promote photosynthesis, so a computer may be programmed to utilize a mix of red and blue lighting, such as 75/25 red to blue, 85/15 red to blue, and the like, for example. The red/blue mix may be programmed in accordance with a specific plant species. The algorithm may also be programmed to cause the LED or OLED lights to emit light of only a certain wavelength. The algorithm may be further programmed to select specific wavelengths in accordance with certain plant species. For example, basil has a photosynthetic preference for blue light and wavelengths of 430-660 nm. In an embodiment, plant-specific LED grow lights may emit light of a certain wavelength or color. Choosing plant-specific wavelengths/colors may optimize growth but may also enable minimizing power consumption by the HG system.

To prevent damaging mature plants and causing bitterness, light energy may be withdrawn when the plant approaches maturity/harvest stage and exposure to the nutrient solution should also be minimized. Concomitantly, temperature may also be reduced. Reducing lighting and heating in the pre-harvest stage may slow cell replication and may avoid excessive nutrient density.

In embodiments, one or more of the following may be varied based upon the maturity of the plant: light intensity, light spectrum applied, temperature, nutrition, carbon dioxide partial pressure/atmosphere mix, and humidity. In one embodiment, the nutrition provided is adjusted based upon root temperature. In other embodiments, the root temperature is adjusted based upon the nutrition provided. In an embodiment, the carbon dioxide pressure may be changed based upon the maturity of the plant. Other similar permutations of the interplay between variables may be envisioned.

This disclosure also provides methods and systems for optimal carbon dioxide enrichment and the use of the oxygen generated by a plant for plant production. In an aspect, the system involves suspending carbon dioxide tubing in a secured position on one side of a plant media tray. The carbon dioxide tubing may also be secured to either the wall, the shelving unit, float tray or tub to enable blowing the carbon dioxide across the plants and allowing for the carbon dioxide to be evenly dispersed relative to the plants. The systems and methods for carbon dioxide enrichment may be used in any growing system, such as a closed environment hydroponic system.

When carbon dioxide levels are between 1000 and 1500 PPM, plants consume more light energy, base nutrients, water and oxygen to create a maximum rate of photosynthetic activity. This maximum rate of photosynthetic activity results in astonishing plant yields gardeners strive for. The major hurdle in achieving this goal is the fact that the average level of carbon dioxide in the air is merely 400 PPM approximately. Plants are composed of 80-90% carbon and water, while most of the carbon in plants comes from the minimal approximate 400 PPM level of carbon dioxide in the air. While the indoor gardening industry has experienced advances in lighting, nutrients, pest control, cloning and hydroponics, a limiting factor in maximizing the potential of an indoor garden is the amount (and lack of) available carbon dioxide in a grow room's climate.

Carbon dioxide is one of the three main components needed for plant growth, but the level of carbon dioxide in the air is only 0.03%. This compares to 78% Nitrogen, 21% Oxygen and 0.97% trace gases in normal air.

At such a low level of approximately 400 PPM in the air, plants can easily consume all of the carbon dioxide in a hydroponic environment in a matter of hours. Plants are only able to produce up to the limited amount of carbon dioxide available, and once carbon dioxide levels are 200 PPM or lower, photosynthetic activity will diminish and may eventually stop altogether.

When the carbon dioxide supply in a growing environment ceases to exist, so does photosynthesis. The process of photosynthesis uses light energy to fix carbon dioxide and water to produce sugars and free release oxygen. Photosynthesis occurs only in the presence of light and is therefore useless, and even harmful to enrich plants with carbon dioxide during the dark (lights off) period of plant production.

Research has shown that increasing carbon dioxide will increase plant size, yield, vigor and speed up growth. Plants grown with increased levels of carbon dioxide are also less prone to common insect and disease issues. By increasing carbon dioxide levels to 1000-1600 PPM during the lights on period, research has shown carbon dioxide enrichment can increase yields 25-50%. However, a carbon dioxide concentration greater than 1600 PPM may cause partial or complete closure of the plant stomas (tiny openings in the plant leaf), which is a vital component for photosynthesis. Thus, careful control of ambient carbon dioxide levels is critical in maintaining an optimal grown environment.

Carbon dioxide is heavier than air. At 77 degrees Fahrenheit, carbon dioxide weighs 66 ounces per 3 cubic feet, while air weighs 42 ounces per 3 cubic feet at the same temperature. Aside from being heavier than air, carbon dioxide moves slowly downward from its distribution point and only travels a short distance through the diffusion process.

When implementing carbon dioxide enrichment methods, careful planning and positioning of equipment may ensure the dispersed carbon dioxide is directed toward the plant zone so it can be absorbed by the plants at a maximum capacity. Plants will consume all of the available carbon dioxide around their leaves within minutes. Thus, a need exists for a method and system that disperses carbon dioxide from an optimal distribution point, in a controlled manner to ensure optimal levels of carbon dioxide in the atmosphere, and in accordance with a lighting profile.

While there are different forms of carbon dioxide enrichment such as dry ice, fermentation and decomposition of organic matter, the two most commonly used forms of carbon dioxide enrichment are combustion generators and compressed carbon dioxide tanks.

Carbon dioxide generators are industrial units that burn fuel to produce carbon dioxide. As a result of the high amount of excess heat put out by these units, they are typically suggested for indoor gardens or greenhouse operations larger than 1000 cubic feet. To avoid the increased temperature issues that coincide with carbon dioxide generators, many closed loop hydroponic environments use a compressed carbon dioxide tank and regulator as their form of carbon dioxide enrichment.

Compressed carbon dioxide comes in metal containers under high pressure with pressure ranges from 1600 pounds per square inch (PSI) to 2200 PSI. This form of enrichment is referred to as a "timed release" system that releases a certain amount of compressed carbon dioxide from a tank at a timed rate of release. A "timed release" system requires a compressed carbon dioxide tank (20, 50 lb., or the like), tank regulator and a timer. The regulator controls the quantity of carbon dioxide emitted into the indoor garden atmosphere, while the timer controls precisely when and for how long the carbon dioxide is released.

Tubing, such as vinyl tubing, is attached to the tank regulator and positioned in the carbon dioxide distribution tube for dispersing the carbon dioxide. This tubing is referred to as "drilled" carbon dioxide tubing, where the carbon dioxide is vaporized through small holes in the tubing and homogenously dispersed throughout the hydroponic system.

Since oxygen is released by plants while carbon dioxide is being absorbed, this creates a dilution effect that diminishes the carbon dioxide concentration. As a result, is an improvement of the described subject matter to provide methods and systems that arrange the carbon dioxide tubing distribution point in a manner where the carbon dioxide would be absorbed while the expired oxygen is moved away from the plant. The removal of the expired oxygen from the system is important since it could migrate back into the plants and dilute the carbon dioxide concentrations. Thus, there is also a need of not only removing the oxygen from the vicinity of the plants but also capturing it, such as for utilization.

As a result, there is a need for a method and system that would evenly disperse carbon dioxide from a distribution point directly from the side of a grow area, regardless of the design and layout of the hydroponic system and capture the oxygen so that it could be utilized inside the nutrient tank of the hydroponic system.

FIG. 6 shows a side view of a hydroponic system from which the carbon dioxide is distributed from the carbon dioxide tube and blown across the plants, as shown by vector 36. Carbon dioxide distribution in accordance with vector 36 results in a negative pressure zone above the plants by creating a circular wind motion 37 above the seedlings and plants. This forces the oxygen expired from the plants to roll over the hydroponic growth, i.e. float, media 35 and/or float tray downwards 38 towards the floor.

FIG. 7 depicts a top view of the system to distribute carbon dioxide across the plants. The carbon dioxide is exchanged with oxygen which is removed via inertial displacement.

One of the features of the system and method according to the present disclosure is the fact that by blowing the carbon dioxide across the hydroponic grow media, the possibility of carbon dioxide dilution with the oxygen is greatly diminished or eliminated. This oxygen can then be recovered and blown back into the hydroponic nutrient tank to oxygenate the nutrient solution. FIG. 8 depicts a full side view of the system used to distribute the carbon dioxide system along with reclaiming the oxygen 39 and using the reclaimed oxygen in aerating the hydroponic nutrient solution. A bubbler in the nutrient tank may be used to introduce the expired oxygen into hydroponic nutrient solution.

In order to maintain optimal levels of carbon dioxide in the system, the unit may include a carbon dioxide system controller in communication with a carbon dioxide sensor. When the sensor detects that carbon dioxide levels have dropped below a threshold desired at a particular point in time, additional carbon dioxide may be released. When the sensor detects that carbon dioxide levels have exceeded a threshold, carbon dioxide dispersion may be ceased. Additionally, excess carbon dioxide may be vented. Certain plant species require specific levels of carbon dioxide to achieve optimal growth, such as certain lettuces and basil. The processor may be programmed with a carbon dioxide saturation algorithm to control carbon dioxide levels in accordance with the species being grown in the hydroponic unit, with a growth stage of the plants being grown, a combination thereof, and the like.

In embodiments, the system for carbon dioxide dispersion may be deployed on a rack so that individual racks in a particular unit may each have a local carbon dioxide flow vector that results in a local negative pressure above the rack and re-capture of expired oxygen at the bottom of the rack.

As the plant absorbs carbon dioxide, the resulting oxygen is captured and negative pressure is applied by fans to push the oxygen towards the floor. Once the oxygen is pushed into the floor area, a device picks ups the oxygen and blows it into the hydroponic reservoir tank thus oxygenating the water. Oxygen can be recovered and aspirated back into the hydroponic nutrient tank. FIG. 8 is a full side view of a system used to distribute the carbon dioxide system along with an oxygen reclamation system 39 that recaptures the oxygen and directs the oxygen into the hydroponic nutrient solution.

In embodiments, the system is in a sealed container and high pressure carbon dioxide (hyperbaric) is utilized in the environment. In embodiments, to assist with carbon dioxide absorption, it may be beneficial to spray an aqueous solution on the leaves that is saturated with carbon dioxide. In embodiments, the partial pressure of nitrogen may be lowered and the partial pressure of carbon dioxide increased in the hydroponic system.

This disclosure also concerns a method and system of optimizing plant cell growth in a hydroponic environment by utilizing low voltage electroculture. This is done by supplying a positive and negative electrical connection into the water medium of the hydroponic solution to excite the plant root structure. The amount of energy provided in the hydroponic water solution varies depending on plant species and the timeline of the growth cycle of the plant.

Electroculture represents a field of study that examines the effects of electricity on plants. As electrical charges work to regulate metabolic processes in cells and tissues, directing electricity into or onto plant structures may further stimulate these same processes. In doing so, plants may become more resistant to cold temperatures, diseases and other pathogens.

The earth has a natural frequency of approximately 8 Hz. It has been found that, by passing a small current though a plant and plant root system at a certain frequency, such as the earth's natural frequency, plant growth and yield can be increased considerably.

Figure 9:
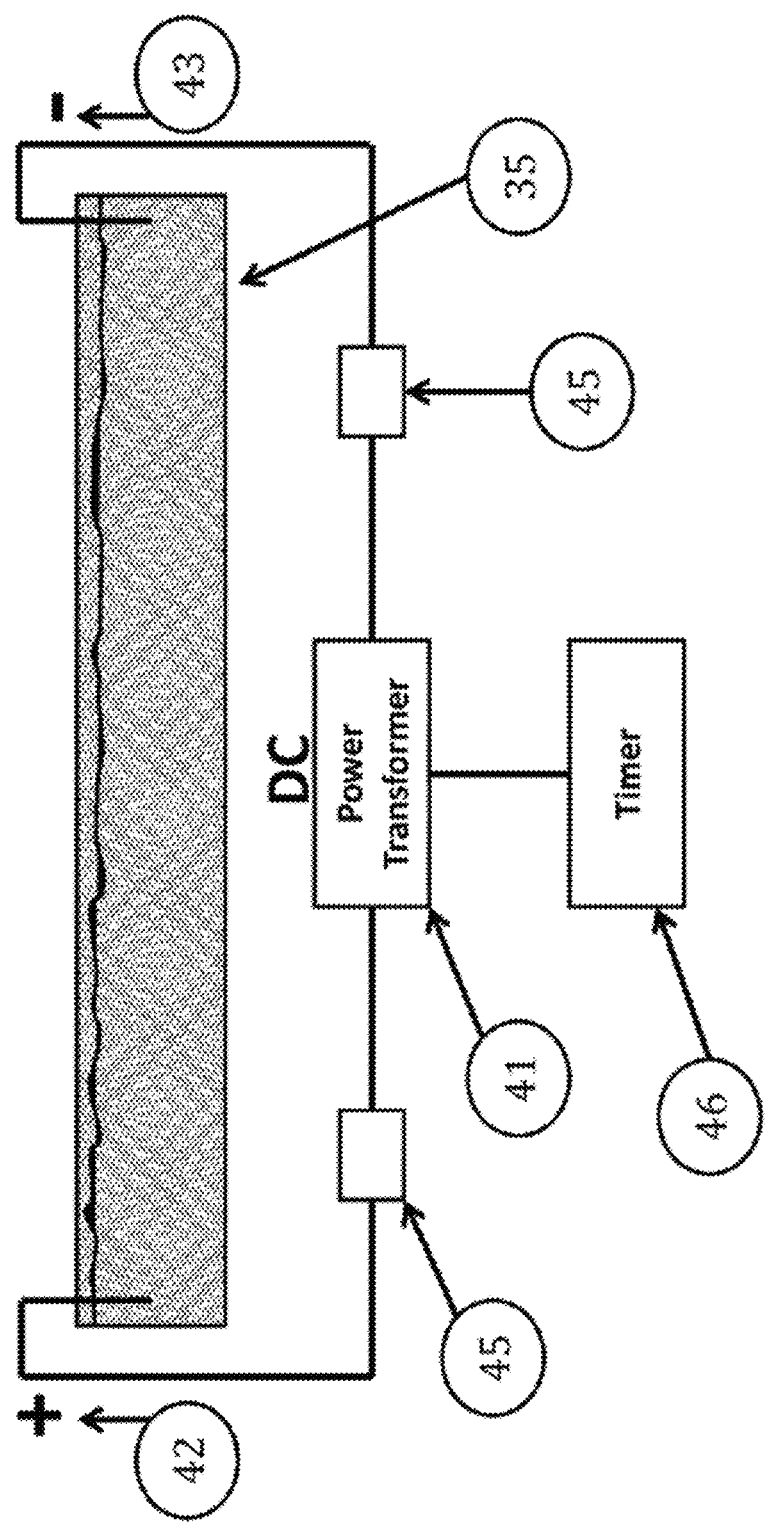
FIG. 9 is a side view of an electroculture system in a hydroponic environment. A wire is inserted at each end of the hydroponic solution and then a current is conducted through the solution to generate an electrical charge in the water.

FIG. 9 shows a system whereby a DC volt transformer 41 is used to conduct a current through a hydroponic growth medium 35 to electrify the nutrient solution at a frequency cycle ranging from 15 to 150 Hz depending upon the plant species and genus.

A frequency meter 45 may be placed on the positive 42 and negative 43 sides of the transformer 41 to measure the outflow and inflow of the electrical current to assure the right frequency cycle is used for a particular plant species.

Timing of the electrical current may correspond with one or more of a lighting profile and a growth profile of the plants in the hydroponic system to provide varied amount and timing of root stimulation. A timer 46 may be attached to the transformer 41 to regulate the timing of the root stimulation. For example, electrical current may only be passed through the liquid nutrient solution at a the time the lighting for the plants is ON. An algorithm may be used in conjunction with a root stimulation profile to apply electrical current.

A method for adjusting the temperature of the nutrient solution of a high density closed loop hydroponic plant growth system is provided. The timing of heating and cooling the nutrient solution may be determined from an equation based upon the seedling growth inside the hydroponic environment along with the power and distance of the grow lighting, for example.

The growing of plants hydroponically involves supplying an aqueous solution to the roots of the plants, for example by spraying solution onto the roots or by keeping them immersed in the liquid solution. The solution is principally water with fertilizers and other nutrients added. Optimal growth, or even survival of the plants, may require that the roots be provided with an air-enriched solution and kept within a specified temperature range. Typically, this is a lower temperature range than required for the portion of the plant above the roots. This parallels the situation in nature where the roots of the plant are in the cooler ground, whereas the upper portions of the plant are in the air that is usually warmer than the ground when the plant is growing.

The hydroponic nutrient solution is not just a mix of fertilizer salts and water, there are also a number of organisms and compounds commonly found in hydroponic systems, such as dissolved oxygen, which is vital for the health and strength of the root system as well as being necessary for nutrient uptake.

Most growers are familiar with the need to have some form of aeration in their nutrient solution-whether it is in a recirculation or a media based system. In nutrient film technique (NFT) systems, this is often accomplished with the use of an air pump or by allowing the nutrients to fall back into the reservoir, thus introducing oxygen. However, the effect of temperature of the solution on the dissolved oxygen levels and on root respiration rates also needs to be taken into account. As the temperature of the nutrient solution increases, the ability of that solution to maintain dissolved oxygen decreases. For example, the oxygen content of a fully aerated solution at 10 degree C. (50 degree F.) is about 13 ppm, but as the solution warms up to 20 degree C. (68 degree F.) the ability of the liquid to maintain oxygen drops and the oxygen content drops to 9-10 ppm. By the time the solution has reached 30 degree C. (86 degree F.), the oxygen content is only 7 ppm.

While this may not seem like a huge drop in the amount of dissolved oxygen, as the temperature of the root system warms, the rate of respiration of the root tissue also increases and more oxygen is required by the plant. For example, the respiration rate of the roots will double for each 10 degree C. rise in temperature up to 30 degree C. (86 degree F.). So a situation can develop where the solution temperature increases from 20 degree-30 degree C. (68 degree-86 degree F.) during the day, with a mature crop and a large root system, then the requirement for oxygen will double while the oxygen carrying capacity of the solution will drop by over 25%. This means that the dissolved oxygen in solution will be much more rapidly depleted and the plants can suffer from oxygen starvation for a period of time.

The hydroponic growing operation may include a cooling system to cool the aqueous solution before it is fed to the roots of the plant. This cooling system may be separate from the reservoir used to store the solution. In addition, the solution may be aerated to optimize plant growth, such as with a separate aerator. The cooling system may be a condenser placed in or adjacent to the nutrient solution reservoir or throughout the nutrient distribution system. Alternatively, the ambient temperature in the hydroponic unit may be turned down. In any event, temperature sensors may be deployed throughout the hydroponic unit, such as on racks, in the nutrient solution reservoir, in the hydroponic beds, on the floor, on the ceiling, and the like to report back to a processor the temperature of the hydroponic unit, solutions, and the like.

FIG. 10 describes the optimum temperature range for a plant which has a recommended hydroponic nutrient temperature range of "R" 53 for a given plant species.

Equations 47, 48, 49, 50, 51, and 52 describe the different nutrient solution temperatures desired for each plant growth phase based on the recommended hydroponic nutrient temperature "R".

In phase A of the plant's growth life cycle, cooler nutrient solution temperatures are desired while the plant is adjusting to its new liquid environment.

Referring to equation 47 in Phase A1, the hydroponic solution may be cooled to a temperature of 70% of the recommended hydroponic nutrient temperature R.

Referring to equation 48 in Phase A2, the hydroponic solution may be cooled to a temperature of 75% of the recommended hydroponic nutrient temperature R.

Referring to equation 49 in Phase A3, the hydroponic solution may be cooled to a temperature of 80% of the recommended hydroponic nutrient temperature R.

Referring to equation 50 in Phase B, the hydroponic solution may be cooled to a temperature of 100% of the recommended hydroponic nutrient temperature R.

Referring to equation 51 in Phase C, the hydroponic solution may be cooled to a temperature of 100% of the recommended hydroponic nutrient temperature R.

Referring to equation 52 in Phase D, the hydroponic solution may be cooled to a temperature of 70% of the recommended hydroponic nutrient temperature R. In embodiments, the plants may be further chilled before harvest, such as in order to halt or slow cell replication.

In an embodiment, a processor may be programmed with a heating timing algorithm that calculates equations 47-53 and controls a temperature, by either heating or cooling, of the nutrient solution to optimize plant growth. As described previously, determining the actual growth stage may be done by visual analysis or various automated arrangement, mechanism, or apparatus, such as a video observation, a laser sensor, a location/proximity sensor, a weight measurement, a measurement of an Oxygen output in the system by an Oxygen sensor, a measurement of a concentration of a nutrient solution, and the like. The processor may first use the determined growth stage to identify which Phase the plant is in when making optimal temperature calculations. Further, the algorithm may be able to make optimal temperature calculations based on a predicted growth curve for a plant species, given data about when it was planted, conditions that the plant is being grown under, and the like. Thus, measurement of plant growth may not be required or may be used to confirm the optimal temperature calculations.

In accordance with the changing temperature in the hydroponic unit, any excess heat may be reclaimed.

In embodiments, the heating and cooling systems of the HG system, which may be in the form of a hydroponic unit, enable high temperature growth of sun-sensitive species. For example, lettuce can handle high temperature, but not in sunlight. In the hydroponic unit, lettuce can be grown at high temperature conditions using red and blue light instead of sunlight.

Hydroponics may be described as a method of growing plants or other vegetation without the use of soil and is well-known as such. However, current apparatus operates essentially on a batch system whereas there is a need, particularly in the production, for example of fodder for animals, of a continuous system which will operate independently of the external environment where necessary, to produce a regular and continuous supply of herbage. The present disclosure provides a method and apparatus for such a continuous system.

Figure 11:
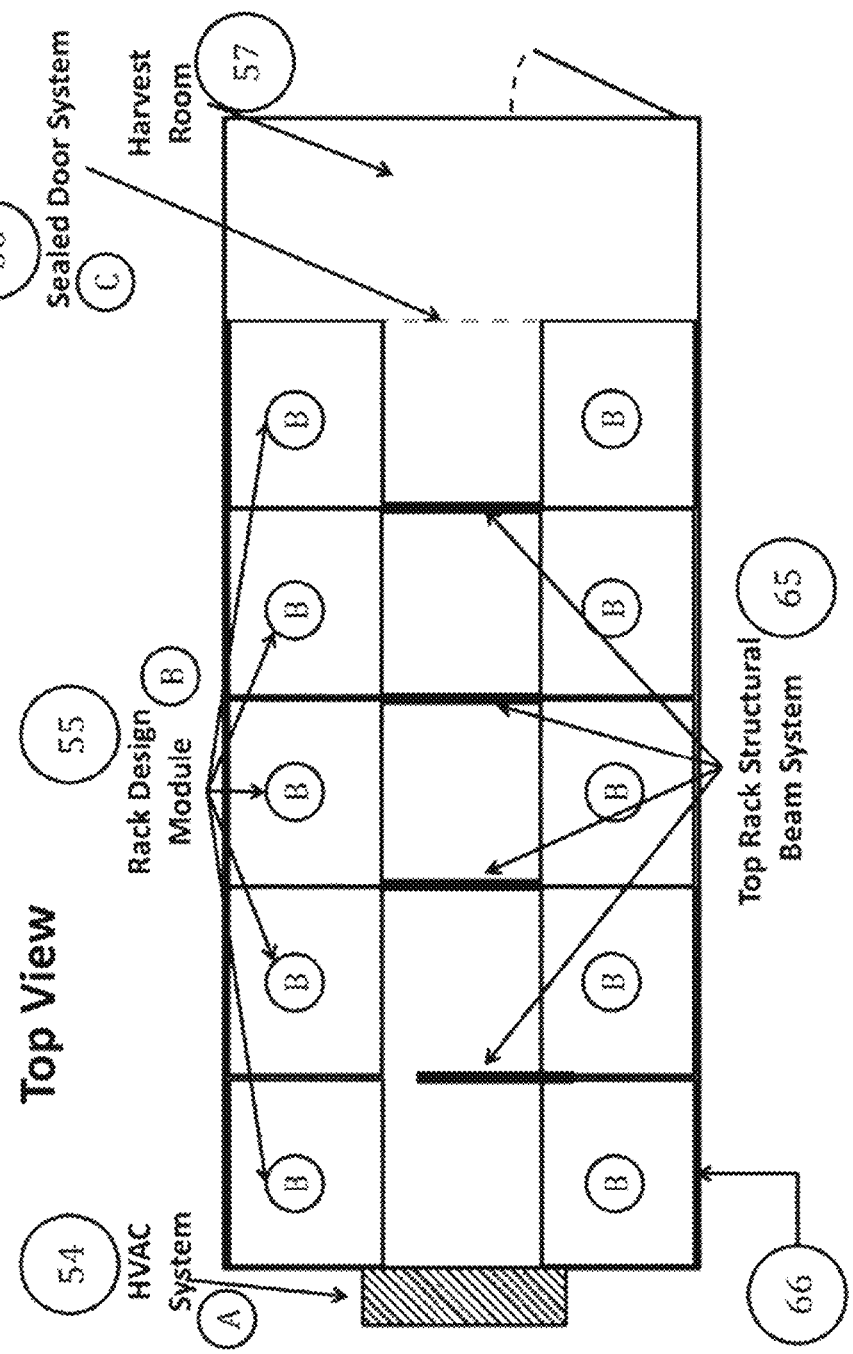
FIG. 11 is a top view of a rack apparatus with structural bracing plate connecting the racks together.

In an aspect the present disclosure provides a method that includes taking seedlings of a desired plant, placing the seedlings in a receptacle inside a growing system which provides conditions for the growth of the seedlings and growth of the mature plants, and then removing the mature plants from the receptacle. The system provides an apparatus that includes a series of racks each capable of receiving a receptacle containing plants, each divided into a number of shelves in which the plants may be exposed to the necessary environmental conditions for the particular stage of growth in that zone. The growing system may be a closed environment hydroponic system. Referring now to FIG. 11, a system for growing plants, either from seeds or seedlings, includes a float tray system that provides conditions for growth of seedlings/seeds placed within it, and growth of the eventually mature plants prior to their removal from the receptacle. The system includes a series of racks 55, each capable of receiving plants on a float that is located on a float tray 59. The system also includes an HVAC system 54.

According to the present disclosure there is also provided a receptacle for receiving plants including a tray having a drain hole, the drain hole being fitted with a drain control which includes a drain and tube that returns the nutrient solution from the hydroponic system to a reservoir tank. A pump in the reservoir tank pumps the nutrient solution up to the top of the rack where it is then piped downwards and out to the flood tray. Additionally, the racks that are bolted together may also be bolted to the floor with a designed floor plate and braced across with a structural bracing plate.

Figure 12:
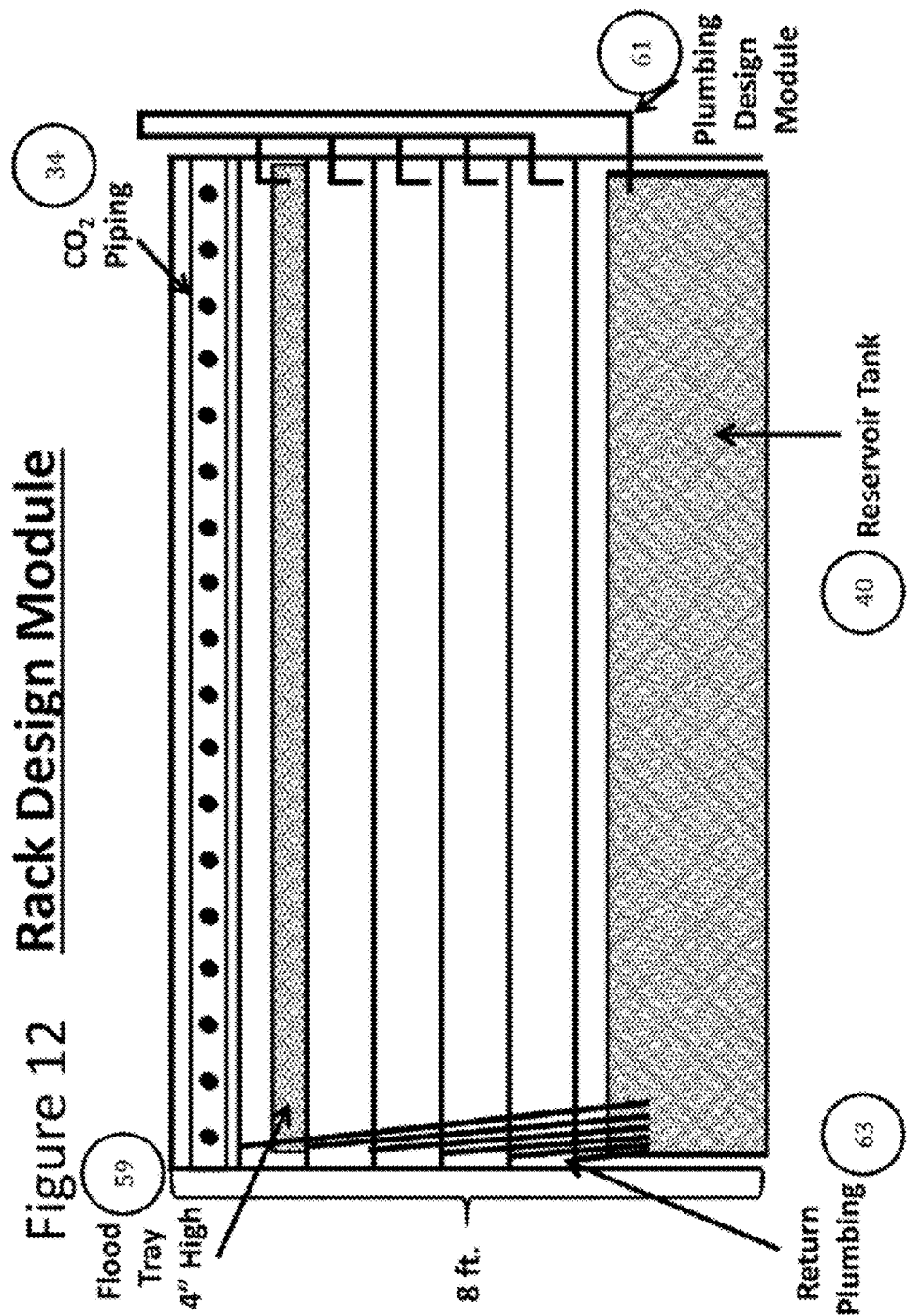
FIG. 12 is a diagrammatic indication of an individual rack that describes the nutrient supply and drainage system for the apparatus of FIG. 11.

Referring now to the drawings, and in particular FIG. 11 and FIG. 12, there is illustrated a rack system for receiving plant receptacles. The contained hydroponic system, of this example, contains racks on both sides of the container. The rack system includes a number of racks 55 installed from right to left and a number of other racks 55 sloping from left to right (as viewed in FIG. 11). The racks may traverse the length of the rack system which is divided lengthwise into a number of zones which are the individual racks described in FIG. 12 and FIG. 13. The apparatus illustrated in FIG. 11 is of a width to allow a rack on both sides of a container, but naturally the width of the apparatus is a matter of choice and it may be made narrower or wider as desired and according to the space available.

Preferred forms of plant receptacles may be a polystyrene float that float in the rack-mounted trays, but in general the plant receptacle may include any tray capable of receiving plants having some form of drain hole to allow spent or excess nutrient or seeds to be removed. Trays containing young plants are entered onto the rack of the apparatus onto the flood tray 59. The apparatus may be divided into four. Each zone is of such a length as to hold a certain number of trays of plants, and in many cases the zones may hold equal numbers of trays of plants. Spacing in the racks may be high density. In one embodiment, there may be 120 mm between growth spaces, but optimal spacing may vary on the species. For example, basil may be spaced at 92 mm.

Trays may pull out from the racks. Trays may be mounted in such a way as to enable easy removal from the rack, such as with sliders, wheels or the like. For mobile embodiments, the racks may include shock absorbers.

FIG. 11 shows a top view of the system whereby the racks are installed on both sides of the container 66 with a space that may or may not be used at one end as a harvest grow room 57. Each rack may be bolted across from each other with a structural beam 65 that prevents the racks from swaying and provides stability in the overall rack design. In embodiments, the rack system may include an HVAC system, a sealed door system 56, and a top rack structural beam system 65.

Figure 13:
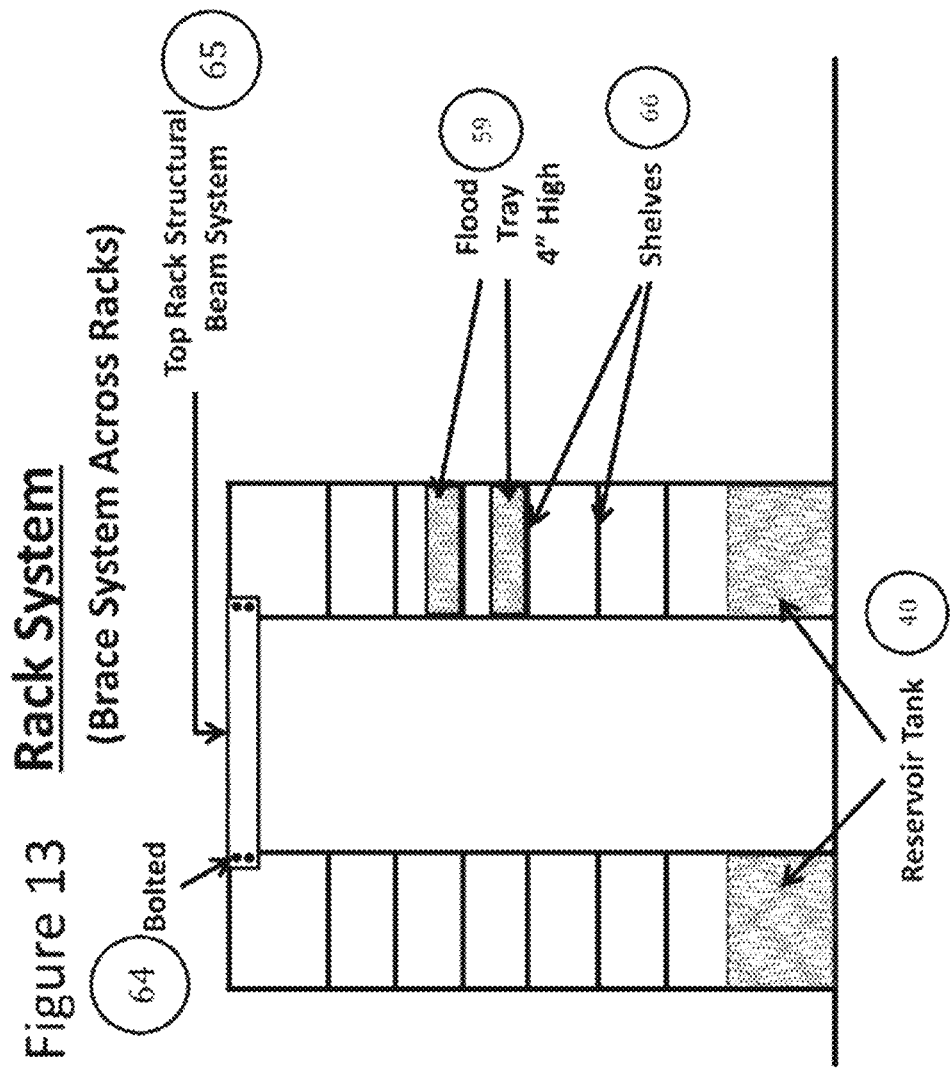
FIG. 13 is a plan view of a rack system from a vertical view detailing the brace system.

FIG. 12 and FIG. 13 depict a single rack that may contain six shelves where the flood trays 59 rest upon. The rack includes an attached plumbing design module 61 for pumping nutrient solution up to each of the six shelves into the flood trays from the nutrient fluid reservoir tank. Additionally, return plumbing 63 from the flood trays may be bolted, or in other manner connected, to the opposite side of the rack.

Referring now more particularly to FIG. 12 and FIG. 13, a receptacle for receiving plants may include a variety of different types of float mediums. There may be a central drain orifice at one end of each flood tray with tubing that extends down along the rack and into the nutrient reservoir tank 40.

In embodiments, as in FIG. 12, the flood trays 59 may be 4 inches high and the total height of the rack may be 8 ft, for example.

The amount, concentration, and type of nutrient solution may be different for each rack according to the growth cycle of the particular plant being grown. Therefore, each of the racks 55 may be supplied from a separate tank of nutrient fluid reservoir 40 which may be pure water or may have growth aiding nutrients or other chemicals within it. The conditions can be selected at each stage in the plant's growth to favor maximum yields.

Carbon dioxide tubing may be installed on the rack system. The carbon dioxide may be blown across the shelving units to provide an increased amount of saturation, as described herein. The amount and pressure of the carbon dioxide in the piping may be selected in accordance with the type of plant species, growth stage, and other parameters.

Figure 15:
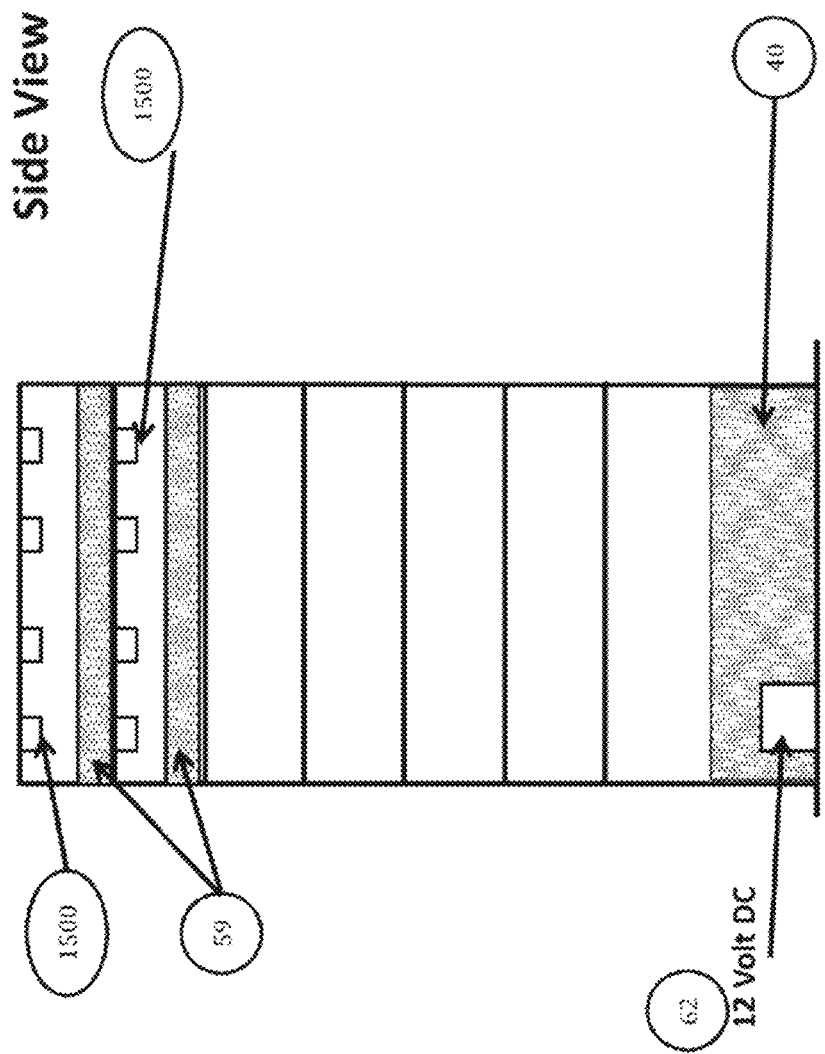
FIG. 15 depicts a side view of the lighting and pump elements of a hydroponic system using a low voltage d.c. system.

The light necessary to induce growth may be provided, for example, by means of fluorescent tubes or LED lights that are mounted to the underside of the shelving unit and/or mounted to a bracket, brace, some other component, as shown in FIG. 15. Alternatively or in addition, the apparatus may be situated so as to receive sunlight either externally or through glass, transparent plastics materials or the like. Further detailed are described herein.

Figure 14:
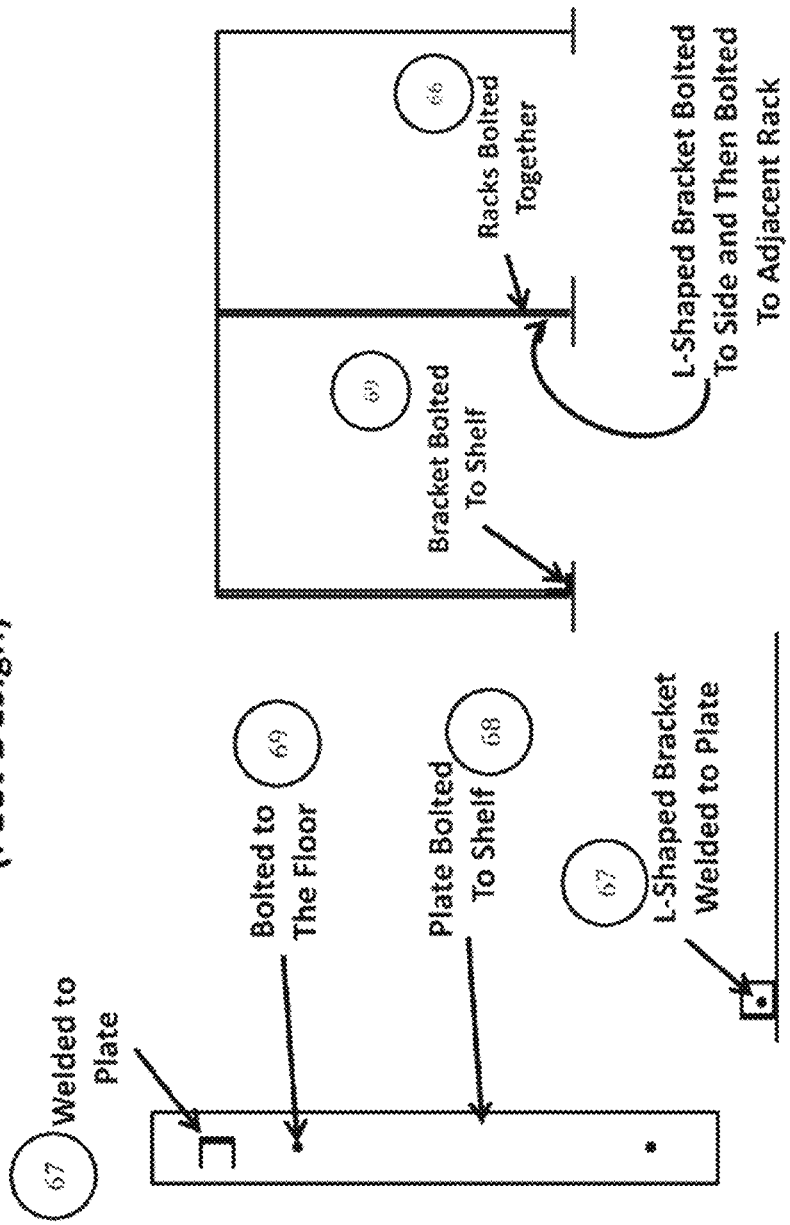
FIG. 14 is a descriptive view of the rack feet design and its installation to the floor or the hydroponic system.

Once the system of the disclosure has been set in operation and seedlings have been planted, an apparatus such as those depicted in FIG. 11, FIG. 12, FIG. 13 and/or FIG. 14 may be capable of producing large yields. FIG. 13 is a plan view of a rack system from a vertical view detailing the brace system 64. FIG. 14 is a descriptive view of the rack feet design and its installation to the floor or the hydroponic system, including an L-shaped bracket 67 welded to the floor plate.

FIG. 14 depicts the feet that are attached to the racks that stabilize the entire rack system. in an embodiment, a plate is measured to be at least three times the width of the shelving leg width and at least 1.3 times the length of the distance between the racking legs. The feet may use an L-shaped bracket that is attached to the bottom plate 67. Additionally, holes are drilled in the plate to allow bolting to the floor 69.

A low profile lighting system may provide more space for growth. In embodiments, the rack-based system in the high growth, high density, growing system may be height-adjustable with high-density spacing, such as to accommodate plant height (e.g. such as for taller romaine lettuce and French tarragon) and optimize lighting distance. Movable racks may allow enough height when approaching maturity while enabling enough power to be delivered at the beginning of growth. Movement may be automated based on height measurement, such as with a laser or video measurement. For example, as growth occurs in the seedlings and that growth is measured, the measurement sensors may provide feedback to a controller for the movable rack to cause it to be moved further away from the seedling to accommodate growth and/or to reduce the intensity of the light.

For static racks, an optimal light to seedling distance may be calculated. One distance may be eight inches, for example. Optimal lighting placement for LED lighting may optimize plant growth in a HG system.

In an aspect of the invention, a low voltage growing system may include lighting and mechanical systems connected to a step down transformer that converts high voltage a.c. power to d.c. low voltage power 62. Using a low voltage facilitates the use of solar panels or wind generators to provide electrical power for the unit and enables the use of cheaply and readily available 12v electrical systems and batteries. 12 volt d.c. low voltage lighting and mechanicals are typically specified for two primary purposes in hydroponic environments: 1. The fixtures and mechanicals are generally smaller; and 2. there is a wider variety of beam spreads in the bulbs available for grow lighting. The growing system may be a closed environment system, and in particular may be a soil system or a hydroponic system.

For the grow lighting, the reason smaller fixtures are possible is simple. Since the filament in the bulb only has to be able to carry 12 volts instead of 120 volts, it can be made much smaller, perhaps ¼" long instead of 1" long for a 120 volt bulb. Since the filament is smaller, the glass bulb around it or the LED can be made smaller, and therefore the fixture can also be designed to be smaller.

The reason more beam spreads are available in a low voltage light is because a small filament or an LED can be aimed much more accurately than a larger one. For applications where light is to be pointed at a specific spot, such as a specific plant or a particular portion of a plant, this may be important. The light created at the filament bounces off the reflector and goes in the direction it is pointed. If the glowing filament is very small, very precisely designed reflectors may be used to position the light beam. With a larger filament, it is easy to end up with light beams indiscriminately bouncing.

Certain HID (High Intensity Discharge) grow lights, for example, with tight beam spreads may be used in much larger scale applications, where great distances from the plant to the light are involved, or less precision is required.

Additionally, low voltage mechanical pumps, aerators, and fans for both a hydroponic system and a soil system are much more reliable and use much less energy than their traditional a.c. voltage counterparts. The average life of d.c. mechanical devices have a notable longer life also.

Most voltage used for hydroponic system and soil system components are typically 120 a.c. voltage, but can vary between 110 volts and 130 volts. (Standard grow lights are designed to operate at 120 volts. Since 120 volts is standard using a 12 d.c. volt lighting system, a transformer is needed to convert the voltage. This is often a significant part of the cost of a low voltage system.

There are many different "sizes" of transformers available. A small transformer may power a single light, or a giant transformer may power a plurality of lights. There are certain wattage ratings for transformers that have become somewhat standardized.

Transformers are typically run at 80% of their capacity. For example, for powering 100 watts of lights, a transformer rated for at least 120 watts should be used. However, most major manufacturers have already "de-rated" their transformers. This "de-rating" is partly due to the fact that the transformers are not 100% efficient. Some of the capacity of the transformer is used up in its "transforming" function, and some is wasted as heat.

In embodiments, there may be special wiring requirements for low voltage, which simply means, in accord with one aspect, that a thicker wire than is typically used in a regular line voltage system is used. One of the biggest advantages of using low voltage wiring in a growing environment is that certain national or local codes require electrical connections to be enclosed in some sort of metal box, and grounded. This is true for low voltage also; however, circuits under 60 watts do not have to meet this requirement. New transformers typically have plastic cases because they have overload and short-circuit breakers built in. Therefore, while still adhering to safety standards, it may not be necessary to ground the low voltage side of the transformer, only the 120 volt wires coming in to it. Any circuit over 60 watts should be in a metal box.

FIG. 15 describes a side view of the lighting and pump elements of a growing system using a low voltage d.c. system showing the placement of lights 1500 relative to flood trays 59, as well as the reservoir 40 and the step down transformer that converts high voltage a.c. power to d.c. low voltage power 62.

Figure 16:
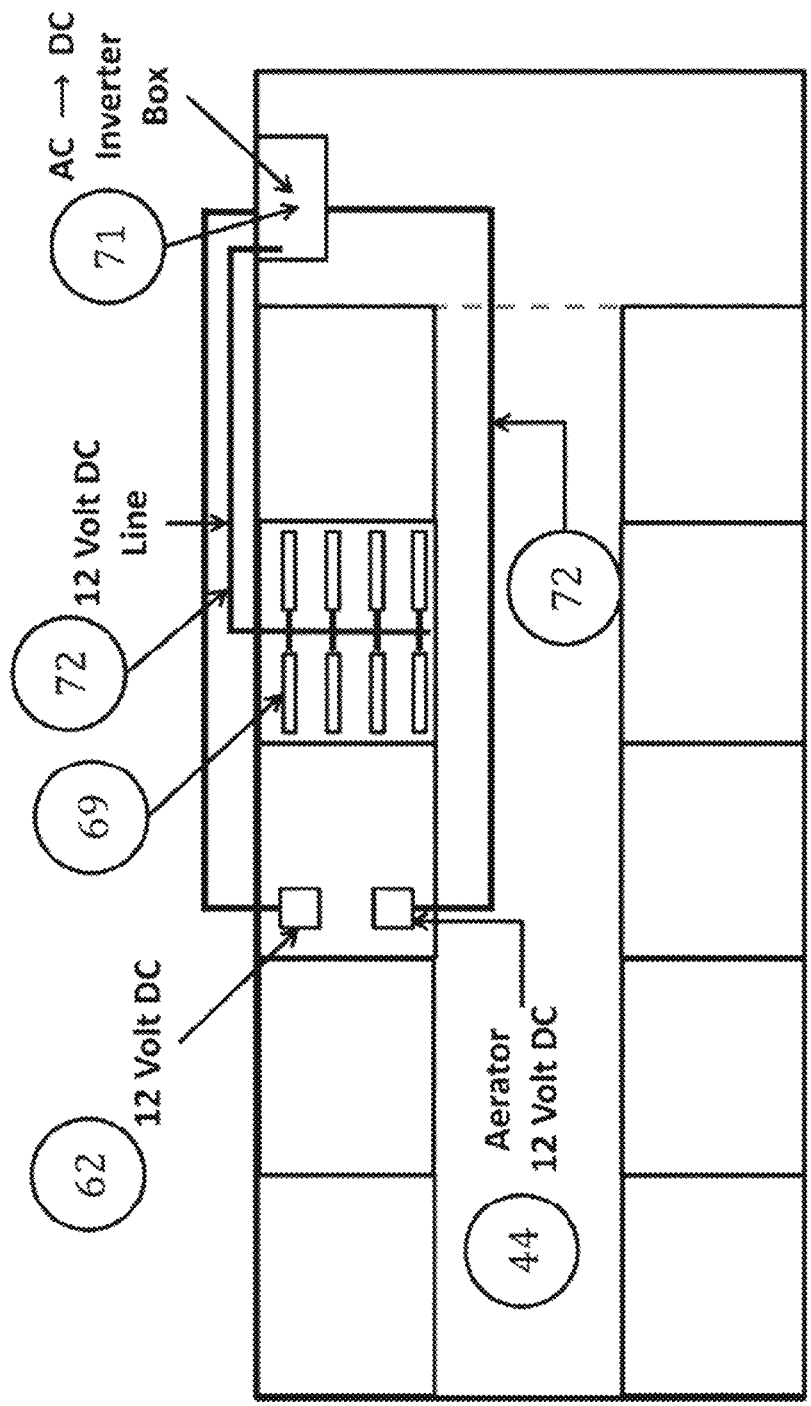
FIG. 16 depicts a top view of the wiring design of a 12 volt d.c. system and the placement of the inverter box.

FIG. 16 describes a top view of the wiring design of a 12 volt d.c. system and the placement of the inverter box. The 12 volt dc aerator 44 is connected to the AC to DC inverter box 71 by a 12 volt DC line 72. The d.c. low voltage power 62 is connected to the AC to DC inverter box 71.

Figure 17:
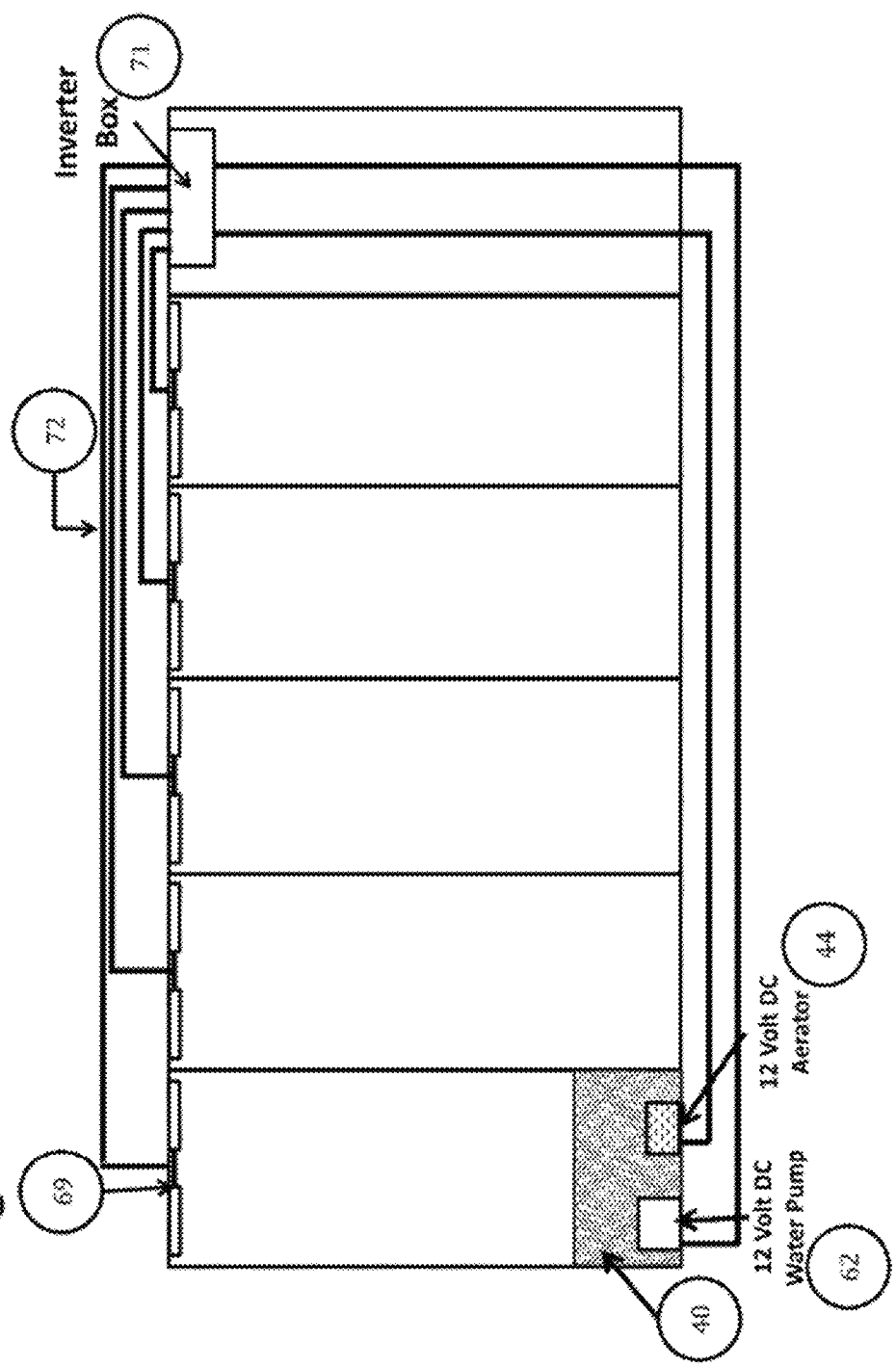
FIG. 17 depicts a side view of the wiring design of the hydroponic growing system.

FIG. 17 describes a side view of the wiring design of the hydroponic growing system.

In an aspect, this disclosure provides systems and methods for overcoming the adverse effects of root nutrition depletion during hydroponic cultivation when the nutrient solution enters at one end of a hydroponic system and is drained at a second end.

One of the major problems of hydroponic systems is that of uneven nutrient solution feeding to plants in a hydroponic flood tray environment. When plants in a water-based solution start to develop root systems, water tends to flow around the central portion of the flood tray and follow the path of least resistance on the outer parts of the flood tray. Because of this, metabolism of the plants in the nutrient solution immediately around the root system progressively inhibits the uptake of fresh nutrient salts, gases and water, and causes the plants closest to the drain area of the flood tray to receive less nutrients and minerals, thus "starving" a plant.

In static nutrient solutions, this problem is not as extreme. The absorption from the area immediately around the roots and the provision of fresh nutrients and dissolved oxygen to the roots are limited to that which can be achieved naturally and does not create a problem of some plants receiving fewer nutrients than others. This problem can be mitigated or overcome by a method of growing a plant hydroponically which includes supplying nutrient solution to the root of a plant by increasing the pressure and flow of the solution toward the center portion of the flood tray. This, in turn, would provide more solution through the center of the flood tray where the root system of the plant is the densest.

The flow of nutrient solution may be induced by capillarity and takes the form of increased flow of the nutrient solution moving along the surfaces of the interlinked root structure. To take advantage of this supply of nutrient solution the roots of the plants, which are themselves hydrophilic, may develop intimate contact with flow and draw nutrients and water from them at the same rate as the plants on the outer edges of the flood tray. As long as the amount of nutrient solution flowing is greater than that taken up by the root system, there will be a residual flow through and beyond the roots. The results may be obtained when the volume of nutrient solution conveyed to the denser root area in the center of the flood tray is increased approximately 100% in flow rate and pressure.

One important advantage of the system is that it greatly reduces the requirement for consistent balance of the nutrient solution. Since all plants in the flood tray exhibit the same amount of absorption, the nutrient solution is better balanced for control. One of the main attractions of the system is that it enables the plants to maintain vigorous growth over extended periods even in low oxygenated solutions.

Figure 18:
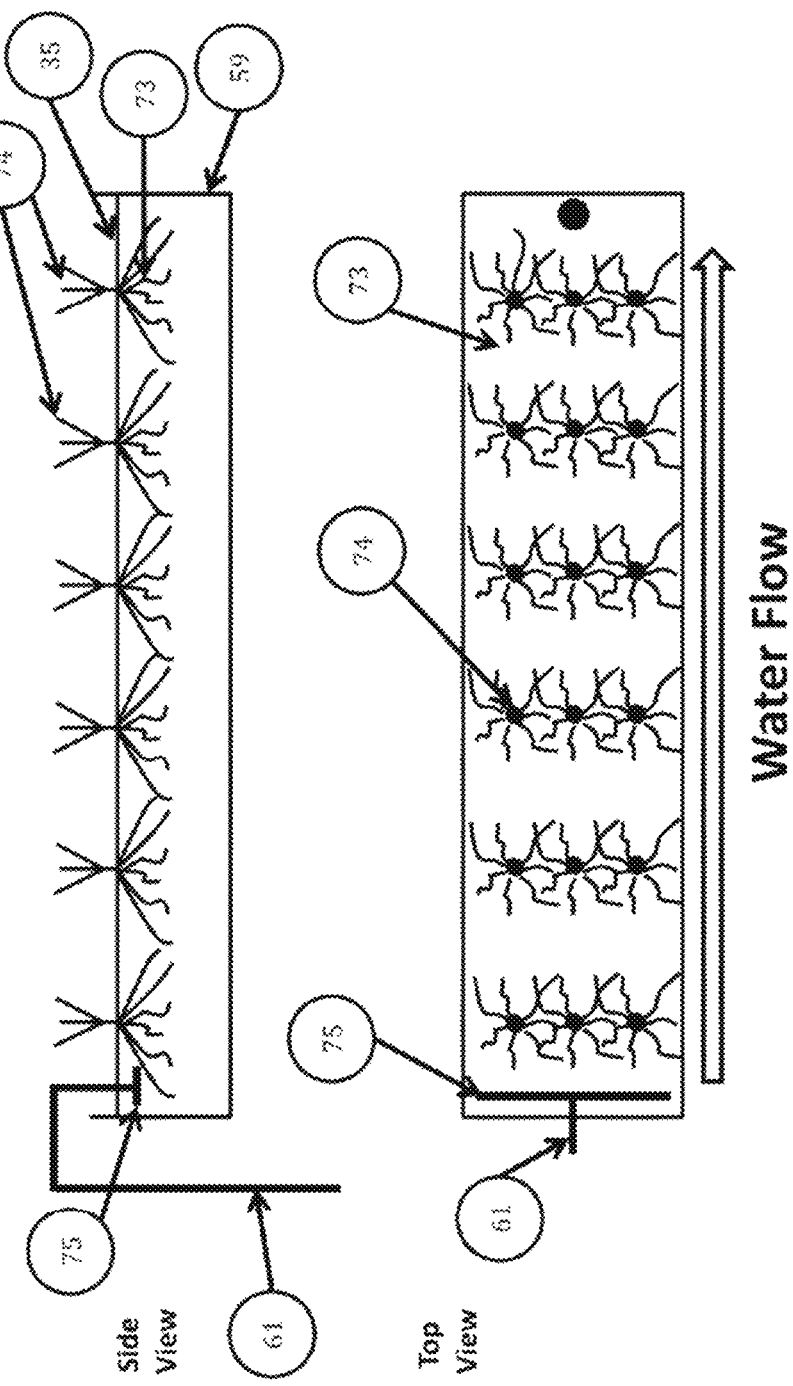
FIG. 18 depicts a top and side view of a flood tray and the nutrient flow from the entry point into the flood tray to its drain.
Figure 19:
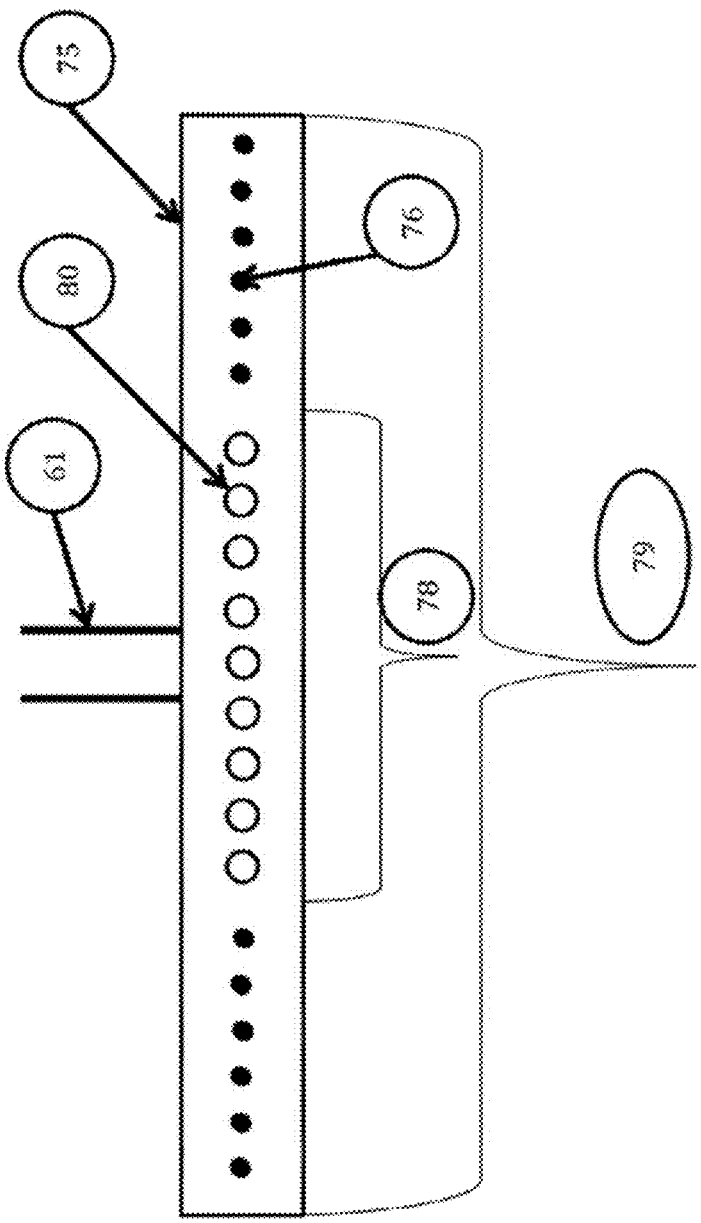
FIG. 19 depicts an apparatus to insert in the flood tray to produce an even distribution in a mature root environment.

Referring to FIG. 18, plants are stationary in a flood tray environment using a variety of grow media. The roots 73 of the plant 74 are denser in the center of the flood tray therefore receive fewer nutrients as the solution is introduced from the entry point 61. However, using the apparatus in FIG. 19, a tube 75 is inserted into the flood tray with small holes of differing sizes, such as hole 76 and hole 80. With the supply line of the solution 61 connected to the tube 75, it provides an evenly distributed environment from which greater solution is pumped over the center plant roots than down the sides.

For example, the number of holes in the apparatus might be determined by spacing the holes at ½ inches apart. Since different hydroponic systems have different flow rates, different sized holes may be utilized to find which will provide the best flow and pressure rates for that specific flood tray environment.

In an embodiment, the size and number of holes is determined by a formula, whereby L is the total length of the apparatus called the dispersion bar 79 and the larger center holes will be located along one portion 78 of the total length of the dispersion bar 79, such as a portion that is one half the length of the total bar 78. The diameter of the holes 80 in the center part of the dispersion tube 75 may be four times the diameter (S) 76 of the holes on the outer areas of the dispersion bar. In embodiments, the flow of nutrients across the root system may be from the root tip to the mature root. By providing fresh nutrient solution to the root tip, the hydroponic system is mimicking natural conditions wherein the root tip grows into fresh soil.

A tray pump may pump solution out from the reservoir and into the system. A circulating pump may pull water into the system on one side, but gravity may pull the solution out of the tray and into the tank. The solution circulation system may include a particulate filter (e.g. 0.5 micron filter). Alternatively, solution may be gravity fed from one end and drained at the other end. A back pressure may be created so that downstream plants receive enough nutrients. As the root system gets denser, valves pumping solution may be opened wider. A pipe or screen system may be included in the tray to provide nutrient solution along the length of the tray. Solution may be fed from both ends of the tray to produce turbulent flow. Sensors/flow meters may be deployed in the trays to measure solution flow. Other meters/sensors deployable in the trays include temperature sensor, alkalinity meter, particulate meter, pH sensor, light/UV sensor, moisture sensor on an exterior of the tray or on floors to check for spills/cloggage, nitrate sensor, mass spectrometers, and the like. These sensors/meters may be used to monitor and report on conditions in the hydroponic unit. The sensors may further enable external control and monitoring and aggregate reporting for a plurality of units. Sensors may be distributed for different water systems.

This disclosure also concerns the timing of optimal pH balance for each plant species during its growth cycle. pH is important because it affects availability and absorption of several of the 16 atomic elements needed for plant growth. Maximum absorption of these elements may be found at pH readings 5.5 to 6.5. When pH falls below this range, many of the macro elements (nitrogen (N), phosphorus (P), potassium (K), etc.) may have less availability and absorption of the micro nutrients may reach toxic levels.

Throughout the cycle of plant growth, it has been normally thought that the pH balance for the plant should be steady and constant. Optimal pH's of a nutrient solution for a given plant species is necessary since plants maximize the absorption of elements at different pH levels. Varying pH throughout the growth cycle, as opposed to the steady and constant paradigm, may encourage nutrient absorption of particular elements at different growth cycle stages in a high growth, high density, closed environment hydroponic system.

Figure 20:
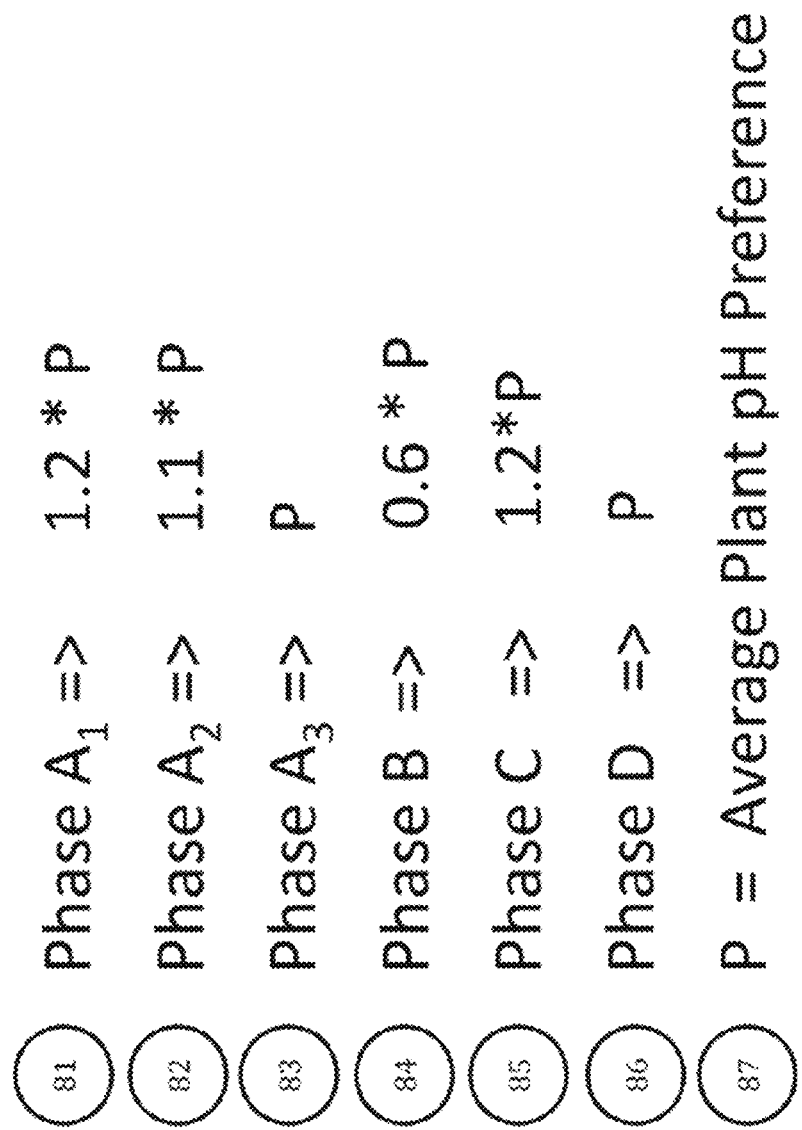
FIG. 20 describes the different phases of plant growth and the optimal pH level based upon the stage of growth.

FIG. 20 describes different phases of plant growth and the optimal pH level based upon the stage of growth. 'P' is designated as the average plant pH preference 87. This is commonly determined from previous literature and other research for the given plant species. Once that has been determined, the plant's pH may be adjusted in accordance with the current growth phase. The Phase A1 optimal pH 81 is actually higher and may be calculated by multiplying the plant's pH preference by 1. The Phase A2 optimal pH 82 is actually higher and may be calculated by multiplying the plant's pH preference by 1.1. The Phase A3 optimal pH 83 may be the preferred pH. The Phase B optimal pH 84 is actually higher and may be calculated by multiplying the plant's pH preference by 0.6. The Phase C optimal pH 85 is actually higher and may be calculated by multiplying the plant's pH preference by 1.2. The Phase D optimal pH 86 may be the preferred pH. A low pH early in the growth cycle may aid absorption of phosphorus and nitrogen in the seedling stage. Higher, or varied, pH's are optimal for the absorption of certain co-factors and trace elements, such as molybdenum at pH 9. A reticulating nutrient system may support multi-pH irrigations for multi-root plants.

In an aspect, this disclosure concerns an apparatus for controlling the condition of air in an enclosure, and more particularly for controlling the temperature and humidity of air in an enclosure, such as a sealed container for hydroponic plant growth or a sealed container for soil plant growth. In embodiments, humidity control may be related to at least one of temperature control and lighting control.

During grow light hours, growing agricultural products introduces water vapor into the air and extracts carbon dioxide from the air. The growth of such products is enhanced when excess carbon dioxide is introduced into the environment during daylight hours. When this water vapor is added to the water vapor products by the growing agricultural products, saturated, or nearly saturated conditions are created within the container. This condition of high humidity produces undesirable stress on all but tropical plants, and increases susceptibility of the plants to various diseases whose control requires periodic spraying or other treatment. As a consequence, considerable resistance has been encountered in applying this approach to plant management.

Figure 21:
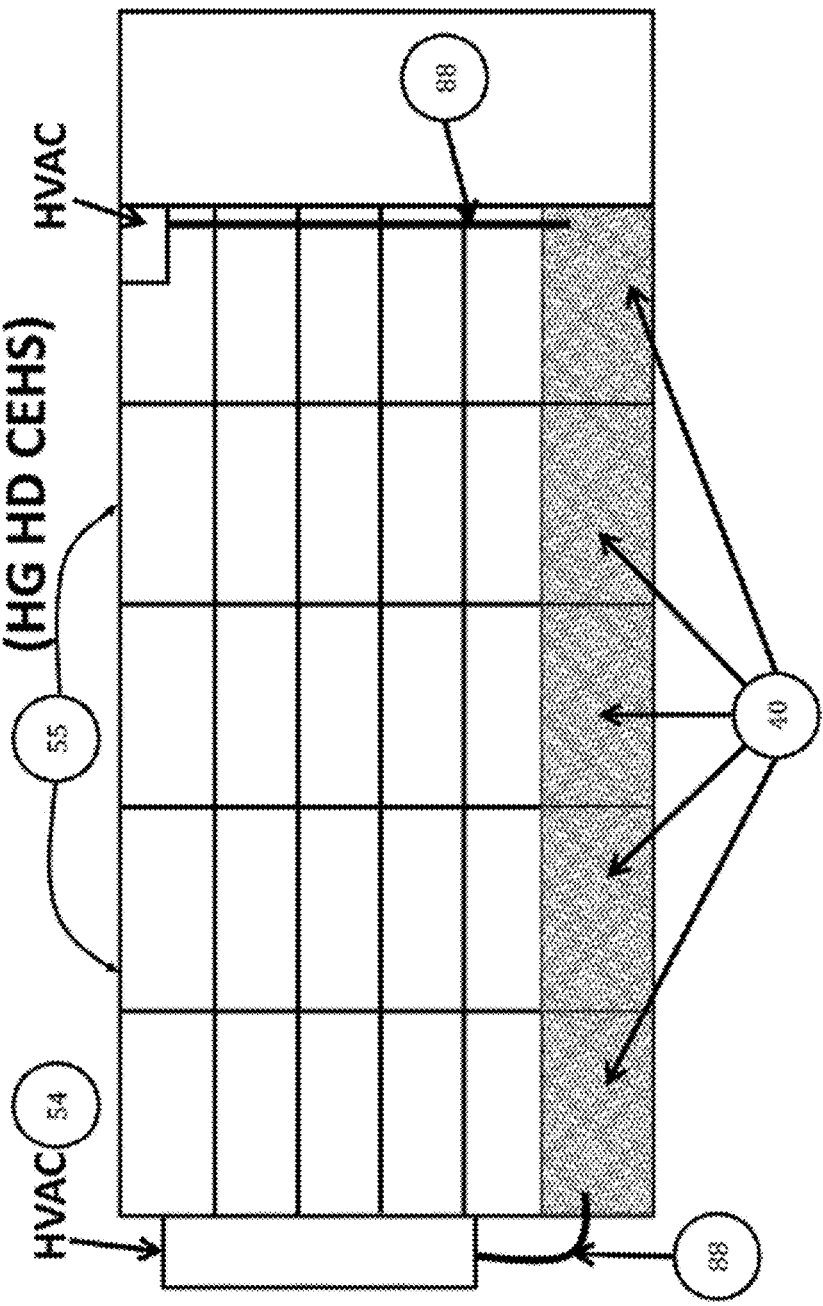
FIG. 21 depicts a dehumidification system.

Referring now to FIG. 21, throughout the cycle of plant growth, dehumidification of the air is desired. However, since this water is considered mineral and salt free, it can be reused as additional water in plant nutrient fluid reservoirs 40. This is accomplished by redirecting the hose assembly 88 from the HVAC system 54 that would normally be directed outside the hydroponic container to drain the excess water into one of the rack reservoirs 40. A climate controller may control the dehumidification process. Avoiding excess moisture that inhibits carbon dioxide from entering chloroplasts may impact plant growth positively. In one embodiment, humidity may be maintained at 65%.

This disclosure concerns slowing down the process of plant cell replication in a growing system by controlling certain environmental factors. The process is determined first by reviewing the amount of the plant cell replication reduction as a variable in terms of percentage and then using an equation to determine what variables are required to be controlled to achieve that desired reduction or acceleration in plant cell replication. The growing system may be a closed environment hydroponic system.

Referring now to FIG. 25, by controlling environmental variables, cell replication may be slowed or accelerated. There may be six or more different environmental control variables: two air temperature settings, two nutrient processes, two grow light settings, and the like. For example, regarding variable A1 118, the air temperature may be reduced to 64 degree F. In another example, regarding variable A2 119, the air temperature may be reduced to 58 degree F. In another example, regarding variable B1 120, the nutrient solution may be replaced with water with a 7 pH. In still another example, regarding variable B2 121, the nutrient temperature may be reduced to 64 degree F. In still another example, regarding variable C1 122, the recommended lighting cycle 124 for a given plant species in a given hours/day may be reduced to one third. In yet another example, regarding variable C2 123, the recommended lighting cycle for a given plant species in a given hours/day may be reduced to one fifth.

Referring to FIG. 24, plant cell replication may be slowed in an approximate range by referring to the percentage decrease in growth. For example, if it is desired to slow the plant cell replication by approximately 30-45% (115), or extend grow time of an 80 day crop another 24 to 36 days (115), using the FIG. 24 table provided, the air temperature of the hydroponic environment would be reduced to below 64 degrees (variable A1 118), the nutrient solution temperature would be reduced to below 64 degrees (variable B2 121), and the recommended lighting cycle for that given plant species would be reduced to one third of the total given hours/day (variable C1 122). In one example, cell replication may be slowed in advance of a harvest. For example, if it is desired to slow the plant cell replication by less than 10% (113), the air temperature of the hydroponic environment would be reduced to below 64 degrees (variable A1 118). For example, if it is desired to slow the plant cell replication by approximately 10-30% (114), the air temperature of the hydroponic environment would be reduced to below 64 degrees (variable A1 118) or below 58 degrees (variable A2 119), and the recommended lighting cycle for that given plant species would be reduced to one third of the total given hours/day (variable C1 122). For example, if it is desired to slow the plant cell replication by approximately 45-80% (116, 117), the air temperature of the hydroponic environment would be reduced to below 64 degrees (variable A1 118), the nutrient solution temperature would be reduced to below 64 degrees (variable B2 121) and/or the nutrient solution can be replaced with pH 7 water (variable B1 120), and the recommended lighting cycle for that given plant species would be reduced to one fifth of the total given hours/day (variable C2 123).

It should be noted that a range is given since different plant species react differently across a spectrum of variables but in general will provide the reduction in the given parameters.

Figure 23:
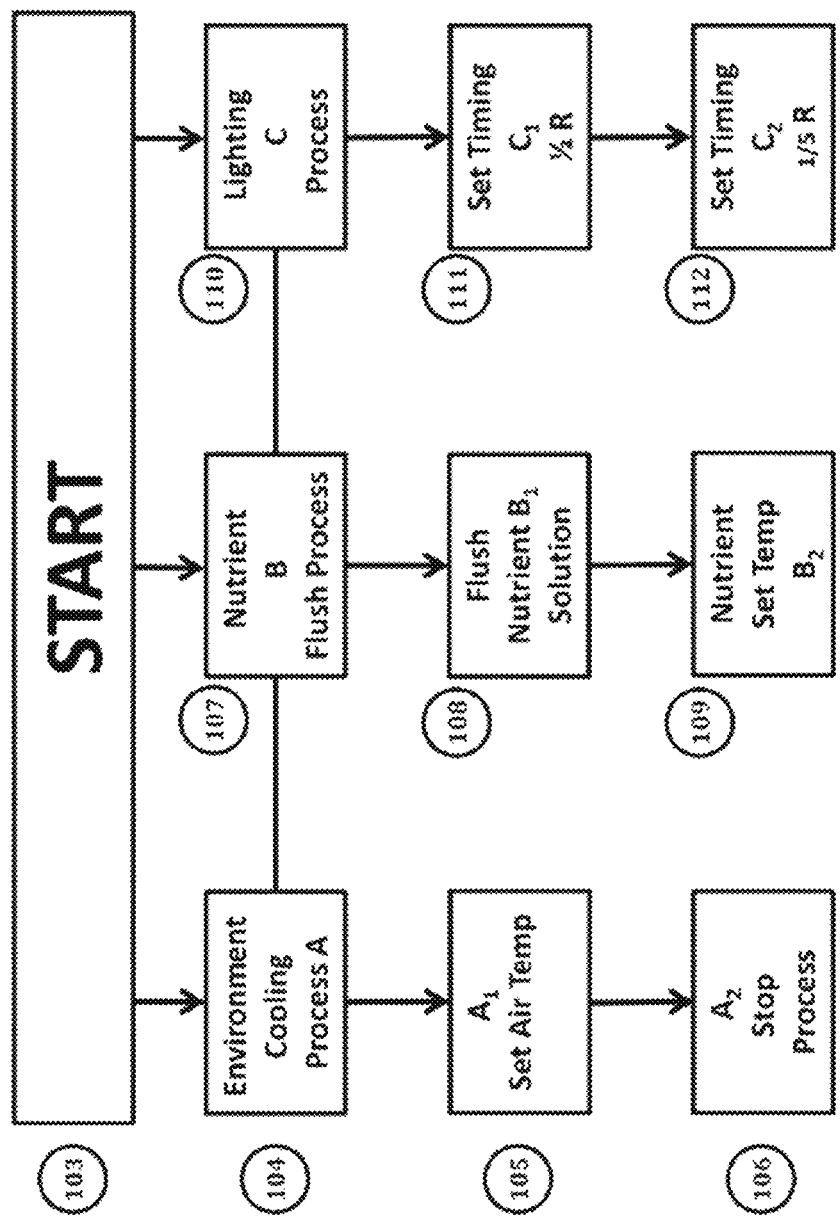
FIG. 23 describes a flow chart system to determine which variables to control in chronological order.

FIG. 23 provides a flow chart such that it gives a guideline from which order the variables are executed in the modulation of the plant cell replication process. Logical flow starts at step 103 and proceeds to an environmental cooling process A 104, a nutrient flush process B 107, and/or a Lighting Process C 110. The environmental cooling process A 104 proceeds to step 105 where the temperature is set. Logical flow may further proceed to step 106 where the temperature is further set to a new setting. The nutrient flush process B 107 proceeds to step 108 where the nutrient solution is flushed out for water. Logical flow may further proceed to step 109 where the temperature of the solution is set to a new setting. The Lighting Process C 110 may proceed to step 111 where the light timing is set to ⅓ of the recommended lighting cycle. Logical flow may continue to step 112 where the light timing is further set to ⅕ of the recommended lighting cycle.

In embodiments, modifying the aforementioned variables may be used in a method of accelerating plant cell growth in a growing system. A combination of one or more of optimizing nutrient solution in accordance with a growth curve, calibrating the pH of the solution to optimize nutrient absorption throughout the growth curve, controlling temperature throughout the growth cycle and at maturation, adjusting the lighting in accordance with a growth stage, and controlling the delivery of carbon dioxide, both in time and in a direction of application, may result in optimized or accelerated cell replication and plant growth. The growing system may be a closed environment hydroponic system and/or a soil system.

This disclosure details the type and method of mixing a nutrient solution inside a hydroponic reservoir to provide the correct mixture of nutrients delivered to the plants. Unless proper mixing of the solution in the reservoir is done, the resulting solution may have a stronger concentration in some parts of the reservoir and less in others robbing the plants of the vital nutrients required.

In an aspect of hydroponic growth described herein, when a hydroponic solution is dispersed over the roots of plants, either through hydroponics or aeroponics, the return nutrient solution usually has a lower concentration of elemental nutrients since the plant absorbs many of these elements. When this solution is returned to the reservoir, there is an imbalance of solution elements that could in turn starve plants if they were continuously recirculated in the system.

To prevent this, there are two methods to correct this problem. Referring to FIG. 26, two mixing pumps 127 are inserted at the end of the return nutrient drain 130 and direct 128 that nutrient solution mixture to be pushed into the other end of the reservoir tank 129 towards the feeding pump 125, which has a supply line 131 to a plant tray. While the nutrient solution is being directed 128 to the other end of the reservoir tank 129, the solution passes over aerators 126 that provide oxygenation to the solution before it is then received by the feeding pump 125.

This method ensures a complete even mixture with the existing nutrient solution in the reservoir tank 129 and provides necessary oxygenation before the nutrient solution is transported to the plants.

One advantage of having multiple mixing pumps 127 and aerators 126 is that it provides a failsafe design in case one of the components fails.

In an embodiment, the nutrient solution includes a hydroponic mix (26/5/5/15), a calcium Nitrate (15/5/0/0), or the like. A lower concentration of nutrient solution may be used for seedlings, then a full concentration may be used later in the growth cycle. Calcium may be added in the middle of the growth curve while nitrate is removed. Boronic copper and zinc may be added as additive to support cell replication. Magnesium and molybdenum may also be added at various points in the growth curve. The nutrient solution may also be ionized in the system.

A nutrient profile may be based on plant growth profile or growth status in a high growth, high density, closed environment hydroponic system In one aspect, this disclosure concerns a system (either a hydroponic system or a soil system) whereby hydroponic shelving racks are separated and individual systems are set up in a container to isolate and reduce the potential of pathogenic and bacteria risk that may occur in the hydroponic plant production process.

By building a continuous yet individual and separate hydroponic system for each rack in a container environment, the risk of bacteria or pathogen infection in the nutrient solution, shelving units, or air is reduced thereby preventing an entire production plant crop from being subjected to destruction. A distributed solution delivery system provides isolation from contamination in a high growth, high density, closed environment hydroponic system.

FIG. 27 is a side view of a hydroponic container that includes a number of hydroponic shelving racks. Each rack is labeled and is considered an independent grow system from each of the other racks 133 to 137. Each unit may have a plurality of racks, such as ten racks, and each rack may hold a plurality of trays, such as six trays. Rack 133 is used in an exemplary fashion to illustrate the isolation process between each of the racks.

Each rack contains a number of flood trays 141 on the rack. The nutrient solution resides in the reservoir 143 and is pumped only to the flood trays above the reservoir tank via a feeding pump 139 and pumped through the hydroponic piping 138 and then the nutrient solution is distributed downward to each flood tray 141. The nutrient solution is then received into a drain hole at the opposite end of the flood tray and a hose 140 from each rack is directed downward back into the reservoir tank 143. Once the nutrient solution reaches the reservoir tank, a series of mixing pumps 142 mix the return nutrient solution with the existing solution in the tank.

Each rack may use one dedicated reservoir to minimize the impact of accidents with pathogens or contaminants, but also enables selectivity as to what each rack receives.

Other ways of reducing contamination in the hydroponic system include placing a UV light into reservoir, using HEPA filters for air scrubbing, using anti-microbial coating on surfaces, using anti-microbial paint on floors, using an electronic scrubber to ionize the air and remove electrostatic particles that do not support photosynthesis, using an alcohol to decontaminate the system, using a filter on the circulation pump, and the like.

Filling the reservoir may be done in the presence of a Charcoal filter. For example, the water may be run through the Charcoal filter.

A growing system may utilize LED lighting. The growing system may comprise a container, a shelving rack, and flood trays whereby the LED lights provide all the lighting necessary for the growth of a specific plant species. The growing system may be a closed environment hydroponic system. The container may be a hydroponic container.

FIG. 28 depicts a rack 144 with LED lights 145, either in a row or box design whereby the light emission 146 is downward upon the flood tray 147.

In an aspect of the invention, FIG. 29 outlines the suggested wattage per square foot ($R_w$) and the placement of LED lights with a total coverage factor of red LED versus the blue LED and the wavelengths suggested for a given plant species. In an embodiment, $R_w$ may be 25 watts for Red/Blue LED. In one embodiment, the Red LED may be 640 Nm to 720 Nm and may account for 81% of the LED lights. In one embodiment, the Blue LED lights may be 400 Nm to 480 Nm and may account for 19% of the LED lights. In an embodiment, the red LEDs may account for a greater proportion of the LEDs than the blue LEDs.

LED lights in the HG system may have a damp-proof housing. The housing may include sealing materials. The housing may include polyfilm plexiglass that allows LED light to be transmitted. An anti-reflective coating may reduce the reflection off the plexiglass.

The LEDs may be dimmable. LEDs may be dimmed in accordance with a growth curve and other factors.

LEDs may include a lens that changes the optical profile of the LED based on a growth stage. For example, as the plant matures and grows, the optics may be changed to spread the light.

The HG system of the invention, be it a hydroponic system or a soil system, may be housed in a mobile facility, such as a shipping container or truck trailer. Such units may be scalable. Such units may be useful for emergency and disaster response. The hydroponic unit may be housed in a dedicated building or may be housed in buried concrete blocks. The movable, scalability of the units makes it attractive for a variety of deployment scenarios, such as a mobile unit, an on-site growth environment such as integrated into a retail store or farmer's market, or the like. In one embodiment, while the unit is being transported, plants may be growing within. The system may be able to displace transportation elements in supply chain by growing on-site or at strategic sites based on market needs. The flexibility of the unit may enable the unit to meet spot market needs. The unit may be integrated with food production systems for value-added foods (e.g., mixes; prepared food systems).

The exterior of the unit may have reflective (or PV absorptive) technology, such as when deployed in high UV areas. Ingress and egress may be tightly controlled, such as with a sealing door, optionally including a slider system. The unit may include controls to track the status of sealing over time. The unit may include a dual door system, such as found in a clean room/holding area/air lock. Facial recognition may be used as a security method for ingress. Bar code or UPC labeling may be used for tracking plants throughout the lifecycle. The bar codes may be used on a per-rack, per shelf, per unit, per tray or per plant basis.

The hydroponic system may be used to produce retail or commercial produce.

A shelf elevator may be used in the unit to elevate items onto the racks. A shelf footing system may be used to stabilize the racks.

In an embodiment, a renewable/clean power source, or dedicated power, such as mini- or micro-cogen units, may be integrated with the high growth, high density, closed environment system, including both a hydroponic system and a soil system. Power systems useful by the hydroponic system include grid, solar (off-grid), wind, hybrid systems, biodiesel generator, mini- or micro-cogeneration units, and the like. In one example, 8.5 kW of power is needed to run the lighting and heating.

A retooling method after harvest for a system for a high growth, high density, closed environment hydroponic system may include a chlorine dioxide cleanup system followed by HEPA filtration to remove the chlorine dioxide, decontamination of the system, such as with alcohol, vodka, or other decontaminate, draining water, refilling with refreshed de-ionized water, and replanting.

Figure 22:
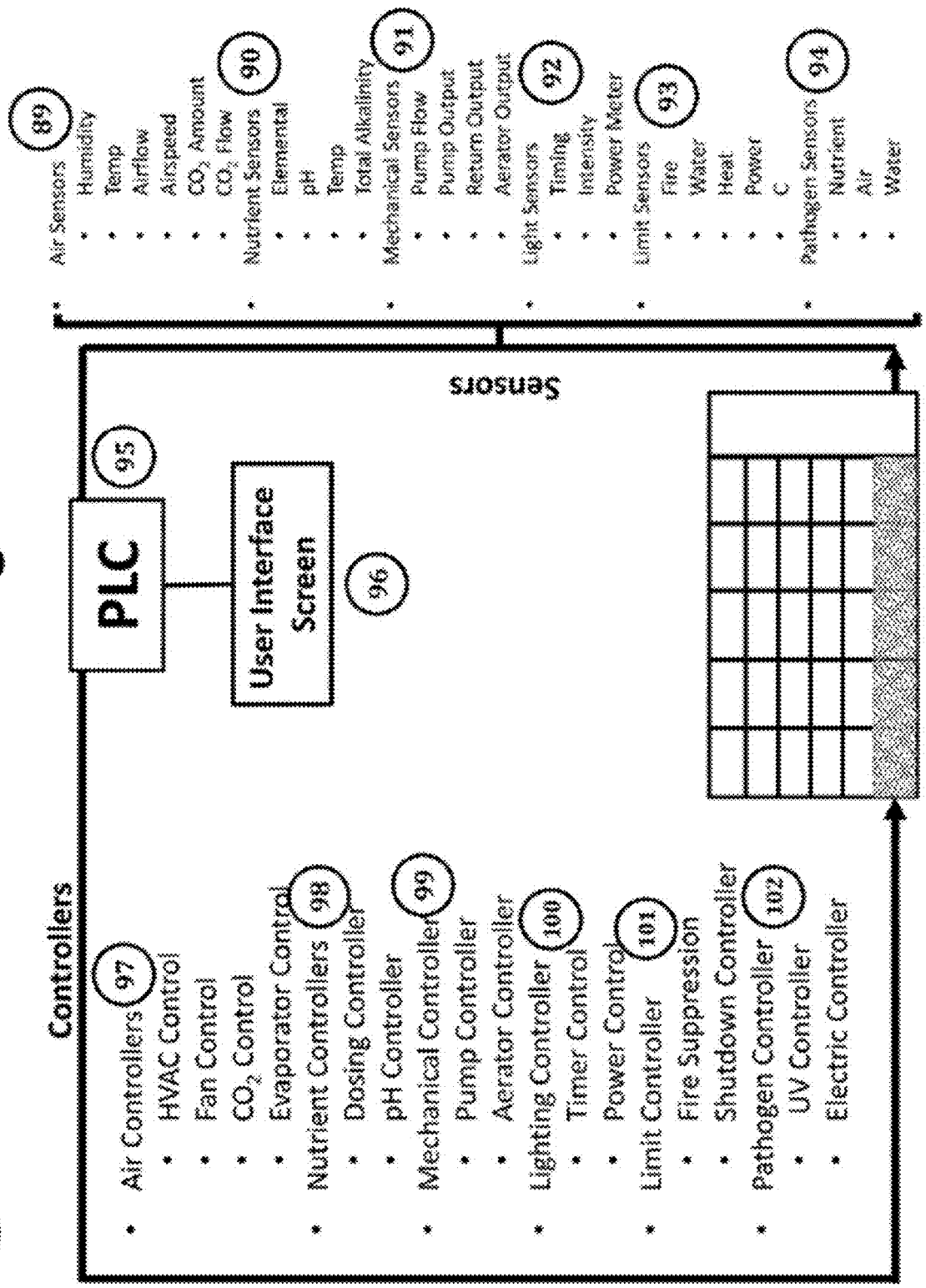
FIG. 22 depicts a PLC controlling the hydroponic unit.

Referring now to FIG. 22, a PLC 95 may enable automatic control of all functions of the growing system, which may be a hydroponic growing system or soil growing system, using controllers, such as Air Controllers 97 (HVAC Control, Fan Control, carbon dioxide Control, Evaporator Control), Nutrient Controllers 98 (Dosing Controller, pH Controller), Mechanical Controllers 99 (Pump Controller, Aerator Controller), Lighting Controllers 100 (Timer Control, Power Control), Limit Controllers 101 (Fire Suppression, Shutdown Controller), Pathogen Controllers 102 (UV Controller, Electric Controller), water flow controller, and the like. The controllers may obtain data from one or more sensors that assist in determining a control needed. The sensors may include Air Sensors 89 (Humidity, Temp, Airflow, Airspeed, carbon dioxide Amount, carbon dioxide Flow), Nutrient Sensors 90 (Elemental, pH, Temp, Total Alkalinity), Mechanical Sensors 91 (Pump Flow, Pump Output, Return Output, Aerator Output), Light Sensors 92 (Timing, Intensity, Power Meter), Limit Sensors 93 (Fire, Water, Heat, Power, C), Pathogen Sensors 94 (Nutrient, Air, Water), and the like. A user interface 96 may be used to input preferences, rules, review reports, review monitoring data, adjust controls, and the like. For example, users may be able to monitor multiple systems, do external/remote monitoring, do unit reporting, do aggregate unit reporting, and the like. Container and rack-based reporting may include information on the contents, growth status, timing, alerts (e.g. contamination, problems with growth, safety), location, status of entry/egress, entry/egress log, pathogen reporting, sealing status, and the like. The system may include a contamination controller and sensor, an air lock control, a pathogen controller and sensor, and the like. The controls/sensors may be in-line with an HVAC system and may set off an alarm when there is contamination present.

In embodiments, the HG system enables produce to be produced in a high growth, high density, closed environment system and delivered without human hands ever touching it and without herbicide and/or pesticide treatment during growth, harvest or transportation phase. The resultant product may have a long shelf life.

Exemplary plants that can be grown in the hydroponic unit include carrot greens, lettuces, butterscrunch lettuce, red line lettuce, romaine, black seeded simpson, bistro blend, salad bowl, oak leaf, red leaf, kale, red Russian kale, collard greens, escarole, bok Choy, cannabis, dill, French tarragon, mint, parsley, cilantro, rosemary, lavender, mustard, watercress, microgreens, basil, arugula, spinach, chives, sunflowers, wheatgrass, stevia, anti-oxidant rich plants, oil plants, soybean, algae, flax, camelina, crambe, thyme, oregano, herbs, flowers, and the like.

Algorithms may be executed by a system-associated processor to optimize growth/energy consumption, track Oxygen content and movement, deliver/reclaim water and other fluids, handle all aspects of nutrition, utilize sensor data to control a system function, iteratively determine a control sequence such as with a machine learning system, provide simulation-based control, perform a market optimization (prices, inputs, outputs), determine and execute a nutrient schedule, such as one based on a condition such as calcium deficiency or one based on a profile.

Data from the system may be used in making a price prediction for the products. Data may feed into a spot produce market to instantly locate available buyers and negotiate prices.

Data from the system may be used in predictive analytics (e.g. Growth prediction), Growth cycle analysis, Event analysis (failure modes, Pathogen monitoring), performing a historical analysis of all controlled variables at rack level for entire growth cycle, perform growth modeling and statistics, generate computer simulation models (tool kit), and the like.

The disclosed subject matter of various embodiments and features of the present invention are set forth above. In one aspect of embodiments described above, the HG system is in the form of one or more units that are transportable. As described herein, such ability to transport units may well be desirable in a variety of implementations. The movable, scalability of such units is attractive for a variety of deployment scenarios, such as a mobile unit, an on-site growth environment such as integrated into a retail store or farmer's market, or the like. In one embodiment, while the unit is being transported, plants may be growing within. The system may be able to displace transportation elements in supply chain by growing on-site or at strategic sites based on market needs. The flexibility of the unit may enable it to meet spot market needs.

As described above, such mobile units provide a wide variety of advantages. Further, as more capacity is required more mobile units may be employed. However, in some implementations of the disclosed subject matter, it may be advantageous to provide methods and systems of the invention in a non-mobile environment. Accordingly, further aspects of the invention are described below in the context of such non-mobile environment. However, any of the various features described in the context of a mobile growing system of the invention may be utilized in a non-mobile system, as desired. Further, any of the various features described in the context of a non-mobile growing system of the invention may be utilized in a mobile system, as desired.

Figure 30:
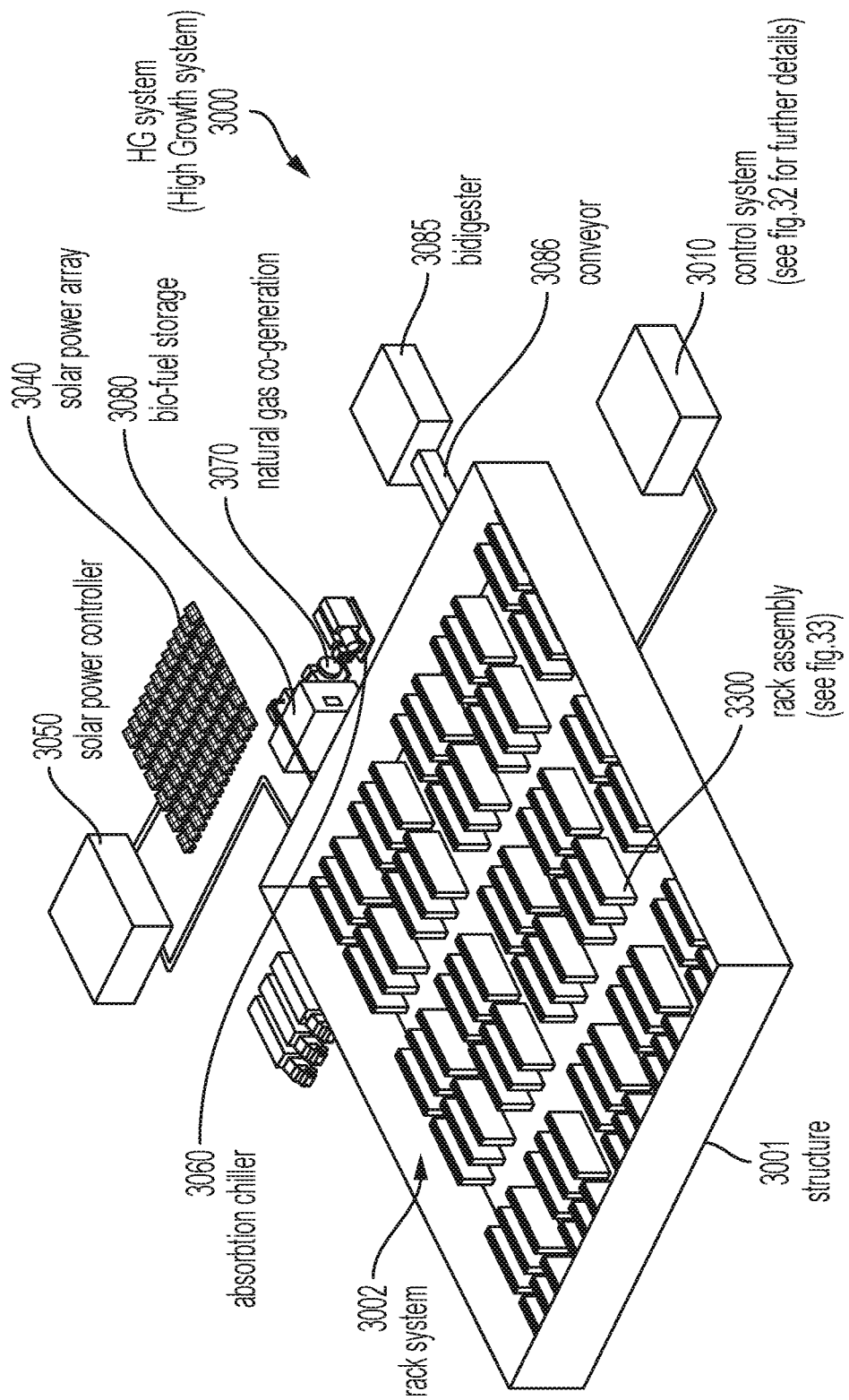
FIG. 30 is a diagram showing an HG (High Growth) system in accordance with the disclosed subject matter.

FIG. 30 is a diagram showing an HG (High Growth) system 3000 in accordance with at least one embodiment of the disclosed subject matter. As described in further detail below, the invention provides a low energy use vertical farm environment. Various features are described including novel aspects of a transparent roof that allows sunlight into the growing environment. The system 3000 may be provided as a sealed environment so as to both conserve energy and strictly control growing conditions. Various other features are described below.

As shown in FIG. 30, the system 3000 includes a structure 3001. Illustratively, the structure 3001 provides a transparent roof, sealed, low energy use vertical farm. Contained within the structure 3001 is a rack system 3002. The rack system 3002 includes a plurality of rack assemblies 3300. It is appreciated that the particular number of rack assemblies 3300 disposed within the structure 3001 may vary as desired. The rack assemblies may be disposed in rows and/or columns as may be desired. The particular position and organizational structure of the rack system 3002, including the rack assemblies 3300, may well be dependent on the size of the structure 3001 as well as particular features of the structure 3001. For example, the positioning of the rack assemblies 3300 may be dependent on the positioning of windows, for example, on the roof of the glass structure (e.g. skylights) and/or windows on the walls of the structure 3001. Light impinging onto the rack assemblies 3300 may also be dependent on reflective materials, including mirrors, highly reflective paint or fiber optic arrays to maximize light transmission into or onto shelves containing plants.

As shown in FIG. 30, the rack assemblies 3300 are arranged in a plurality of rows and in a plurality of columns. In use of each rack assembly 3300 for growing plants, the particular plant grown in a particular rack assembly may indeed be selected based on the particular physical conditions of the rack assembly 3300. For example, a rack assembly that is disposed directly beneath a skylight, and thus exposed to substantial sunlight, may be particularly suitable for a first type of plant that requires substantial sunlight. On the other hand, the rack assembly that is not directly disposed beneath a skylight, such as disposed in a corner of the building, may well be conducive to growth of a plant that requires less sunlight.

Further details of a rack assembly 3300, in accordance with at least one embodiment of the invention, are described below with reference to FIG. 33.

As shown in FIG. 30, the system 3000 includes a variety of features. In an aspect of the described system, the various features are provided to offer an energy efficient infrastructure that provides a highly efficient sealed, low energy use vertical farm.

The system 3000 includes a control system 3010, in accordance with one embodiment of the invention. As described further below, the control system 3010 controls a variety of operations and/or apparatuses within the system 3000. Further details of the control system 3010 are described below with reference to FIG. 32.

As shown in FIG. 30, the system 3000 includes a solar power array 3040, in accordance with at least one embodiment of the invention. The solar power array 3040 may be controlled by a solar power controller 3050. A problem experienced in operation of a vertical farm is that some types of plants require substantial amounts of light that exceeds the number of daylight hours. As a result, a system is required to power suitable lights, which support desired plant growth, during the non-daylight hours. The solar power array 3040, in conjunction with the solar power controller 3050, addresses this problem in that energy may be generated during daylight hours, so as to power lights in the system 3000 during non-daylight hours.

In an aspect of the invention, the solar power controller 3050 works in conjunction with the control system 3010. For example, the solar power controller 3050 may be provided to control the lower-level functions and/or operations of the solar power array 3040. On the other hand, the control system 3010 maybe provided to control the higher level functions and/or operations of the system 3000. Illustratively, the control system 3010 may, based on sensor input and other operational parameters, dictate a particular power output from the solar power array 3040. Hand-in-hand, the solar power controller 3050 may perform lower-level operations to output the desired power output.

An aspect of the invention is that solar power can reduce electrical consumption from the utilities grid or grid by directly feeding into a light driver system, or other light power arrangement, to power the LED lights. Another aspect of the invention is controlled adjustment of light required by the plants to additionally offset electrical consumption. In this case, sensors that monitor plant growth and/or photosynthetic efficiency, can respond appropriately and reduce the amount of light required by the plant and thereby reduce the proportion of electricity derived from the utilities grid. For example, during early stages of plant development, when plantlets exhibit only relatively small leaves, the full output intensity of the lighting system could lead to suboptimum growth. Once plantlets have been established and total leaf areas increased, the more mature plants can effectively absorb increased light intensity and so systems that monitor relative plant leaf size can control light output intensity. Another example uses measurements of direct photosynthetic efficiency to optimize light output. These systems monitor photosynthetic efficiency by chlorophyll fluorescence feedback from leaves using a fluorometer. In this way, light output is automatically adjusted to obtain maximal photosynthetic efficiency on one or more test plants in a planting bed or shelf, for example. Such processing may be characterized as energy consumption/energy generation balancing—in which a preferred level of energy consumption is balanced vis-à-vis a preferred level of energy generation.

For some types of high-value plants, low irradiances may be required or highly desired throughout their development. In systems in which such plants are grown, low-level LED lighting, for example, may be utilized to maintain irradiance throughout growth. Combined with direct solar input, into an enclosure, growth of long-lived plants may be made possible due to the energy savings of the invention.

As shown in FIG. 30, the system 3000 may also include an absorption chiller 3060, in accordance with at least one embodiment of the invention. An absorption chiller is a known machine that typically uses a heat source to generate chilled fluid, such as chilled water. This is in contrast to a common approach of utilizing an electrical source that performs a vapor compression cycle—so as to provide a chilled fluid, such as chilled water. Accordingly, an absorption chiller provides desired functionality to produce chilled water or other fluid with heat. In an aspect of the disclosed subject matter, there may well be excess/undesirable heat energy in operation of the system 3000. For example, such excess/undesirable heat energy may be experienced within the structure 3001. With utilization of an absorption chiller, this excess/undesirable heat energy may be effectively utilized to provide a desirable result of cooling water and/or nutrient solution.

In particular, a problem with vertical farming is that water temperatures observed exiting a flood tray (containing growing plants) and/or observed within the flood tray itself may tend to increase over time absent a control mechanism. For example, an increase in temperature may result from a nutrient solution being exposed to sunlight over a period of time. Accordingly, with the system 3000, undesirable heat energy (within the structure 3001) may be utilized to perform cooling of the heated nutrient solution and/or water. Once the nutrient solution and/or water is cooled to a suitable temperature, such fluid may then be reintroduced into a flood tray, for example.

As shown in FIG. 30, the system 3000 may also include a bio-fuel storage 3080, in accordance with at least one embodiment of the invention. For example, the biofuel storage 3080 may be constituted by organic material that is utilized to feed an energy producing process such as a biodigester process. On the other hand, the biofuel storage 3080 may be constituted by matter that is indeed produced by an energy producing process such as a biodigester process. A biodigester process or biodigester may include a mechanical stomach structure into which is fed various organic material, which is broken down by bacteria or other micro-organisms, for example. A biodigester may provide an oxygen free environment and may produce methane and carbon dioxide, for example, In a vertical farm environment, a problem with some types of plants is the handling of such plants after the plant has produced the desired crop. For example, a plant grown in the system 3000 may be a sunflower. Further, the desired product from such plant growth may be sunflower seeds. In such a situation, there is substantial organic material resulting from growth of the sunflower plant that is not the desired crop. It is this organic material, for example, that may be utilized in a biodigester, in the system 3000.

To maximize utilization of an enclosed controlled growth environment, certain plants are amenable to multiple harvests over their growth cycle. The practice of multiply harvesting plants generates increasing amounts of "non-harvested" base material, which serves to generate new growth that leads to the subsequent harvest. As such, the unused, unharvested base material accumulates, and, at the end of the entire plant growth cycle, the material can be removed and used as biomass in a biodigester. Thus, in a large HG farm system, a continual supply of leftover biomass is available to supply one or more biodigesters.

An additional source of biomass available for use in a biodigester from the HG system is the root material that continually grows over the life of the plant. A healthy root mass is associated with vigorous plant growth—in particular in indoor HG systems using hydroponic growth. Roots represent a major biomass output in hydroponic growth systems that are not typically harvested for crop use. Establishing root mass as an easily accessible component for use in a biodigester, such as biodigester 3085 of FIG. 30.

The nature of plant biomass generated by a vertical HG farm of the invention is generally of a particularly clean and pure quality. Nutrients used in the production of hyper growth systems are refined and used in highly controlled ways to ensure that little nutrient components are left over after a growth cycle. Water used in the hydroponic growth of the plants is also highly purified and disinfected. One premise of controlled HG systems of this disclosure is the production of food crops grown in the complete absence of chemical pesticides, herbicides and other contaminants, including pollutants typically found in soils, such as heavy metals. Therefore, plant material from HG growth systems introduced as consumable biomass in biodigesters would result in minimal pollution release after biodigestion. Unused plant materials from vertical farms of this disclosure may also be free of physical soil particles and debris, making introduction, of such unused plant materials, into a biodigester straightforward without any need of pre-treatment.

Thus, the pure nature of the plant biomass produced in vertical farms as well as the complete absence of chemical pesticides and soil pollutants are ideal for energy generation in a biodigester 3085.

An additional advantage of HG vertical farms for supplying continuous organic material to a biodigester 3085 is in the enhancement of farm-wide processing aspects. The regular removal of remnant plant material from crops which have completed their growth cycle is an ongoing process that, without the application of a biodigester system, would result in the constant removal and/or discard of such accumulated organic material, requiring the need for costly waste management and disposal fees on an ongoing basis. As shown in FIG. 30, an on-site biodigester system 3085 would lend itself well to strategically placed conveyors 3086 and similar transport systems to efficiently remove expended plant material from the growth structure 3001, and then transfer to, and introduction into the biodigester. In general, strategically placed conveyors and similar transport systems may be utilized to efficiently transport material, such as plant material, between the components of the HG system 3000 as may be desired, such as between the structure 3001, the biodigester system 3085 and/or the bio-fuel storage 3080, for example. Such a system integrated into the process flow of the farm leads to increases in process efficiency, elimination of both waste transportation costs and associated transportation fuel combustion, and generates a return in the form of usable energy.

As shown in FIG. 30, the system 3000 of the invention may also include a natural gas co-generation apparatus 3070, in accordance with at least one embodiment of the invention. Co-generation techniques and apparatuses are known to generate electricity and useful heat at the same time. That is, when electricity is produced alone, such production of electricity often results in heat being generated at one point or another in the process. When electricity is generated alone, this heat is rejected as a waste byproduct. However, in a co-generation process, this heat is captured and put to beneficial use.

In the system 3000, a co-generation process may address a need associated with keeping a growing environment at a desired temperature. This is particularly true if the system 3000 is disposed in a cool or even a wintry environment. Necessarily the system 3000 requires electricity to power the various components of the system. In particular, electrical power is required by the lights used to illuminate growing plants. Further, electrical power is required by pumping mechanisms that circulate water, nutrient solution, and or other fluids as desired. The use of co-generation in such an environment is highly beneficial in that heat, i.e. thermal energy, generated in the production of such electricity may be utilized by the system 3000 beneficially. For example, such beneficial use may include piping such thermal energy so as to cool the environment in which the plants are grown, such as within the structure 3001.

One embodiment of the invention utilizing the co-generation apparatus is the ability to control water temperature of the hydroponic system as well as the air temperature in the 3001 structure. The primary requirement for temperature in these two main areas will be cooling since irradiation from sunlight and LED lights introduce heat into the system—however, heat input will be important during dark periods, as well as when heat introduced by light and/or the external environment is not sufficient to attain optimal or desired temperatures.

Figure 31:
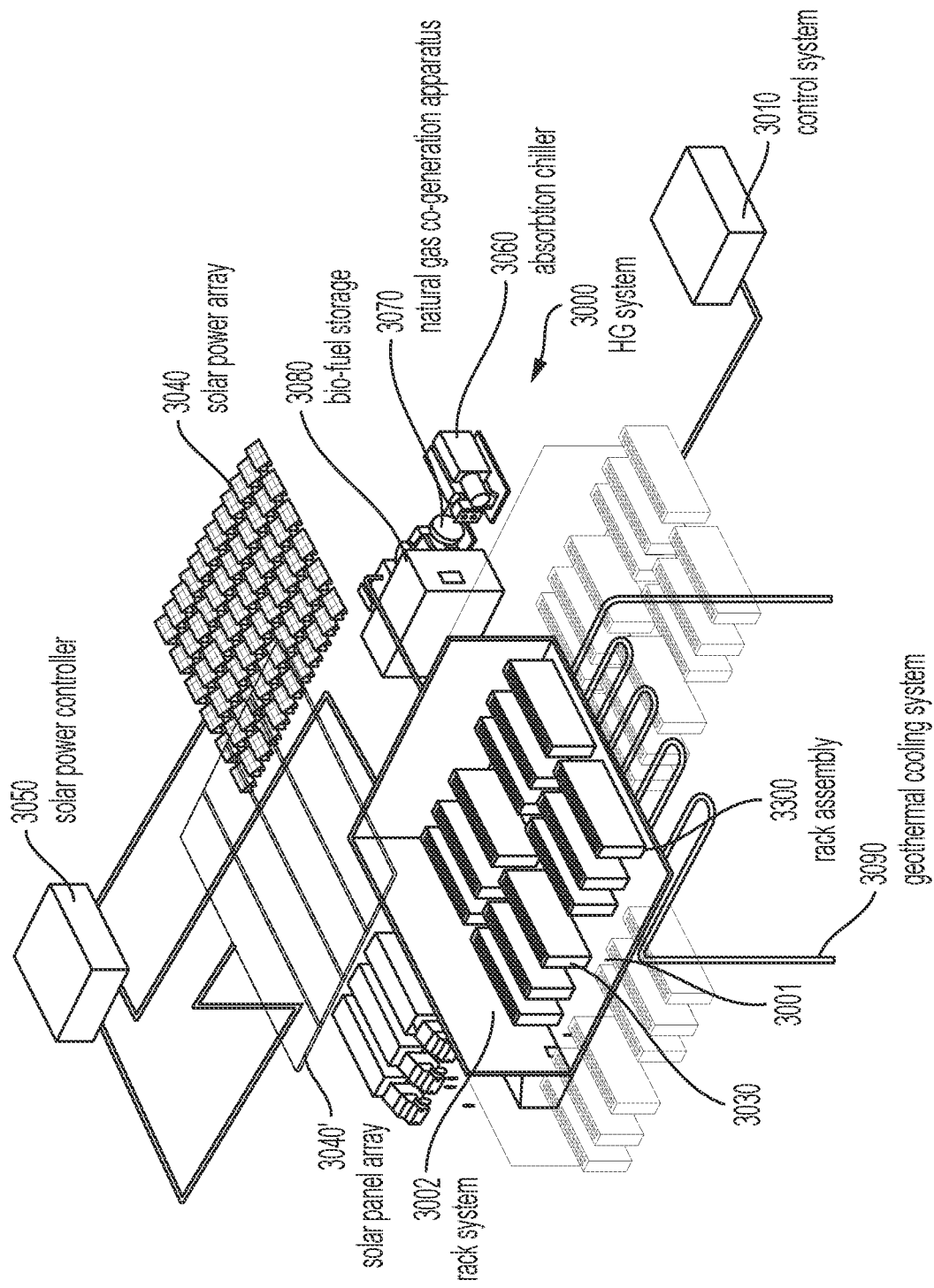
FIG. 31 is a diagram showing further features of an HG system in accordance with the disclosed subject matter.

FIG. 31 is a diagram showing further features of an HG system 3000 in accordance with an embodiment of the disclosed subject matter. As shown in FIG. 31, the system 3000 may further include a geothermal cooling system 3090, in accordance with at least one embodiment of the invention. The geothermal cooling system 3090 may be controlled by the controller system 3010 and/or controlled by a dedicated controller.

Geothermal systems are known. Geothermal systems are typically utilized to heat and cool the interior of structures, such as homes, by "tapping" into the temperature of matter beneath the Earth's surface. In other words, such systems leverage the Earth's temperature in the vicinity of the system. A geothermal system typically circulates a fluid through an area of terrain beneath the Earth's surface so as to adjust the temperature of the circulating fluid. The adjustment of the temperature of the circulating fluid is based on the differential between the observed temperature of the circulating fluid and the temperature of the earth through which the circulation is being performed.

A problem faced with interior farms is that in such an environment there is a substantial volume of air that is often exposed to excessive sunlight. This situation may well result in the temperature of the air exceeding a desired air temperature. One approach to address this dilemma is to utilize a cooling mechanism in the environment, such as an air-conditioning system. However, air-conditioning in particular is relatively expensive to operate. This is particularly true in the large spaces typically associated with interior, vertical farms. Accordingly, the systems and methods in an aspect of the invention address this dilemma by utilizing a geothermal cooling system 3090. The geothermal cooling system utilizes, in accord with one illustrative application, the relatively colder temperature of the earth below and around an HG system 3000. The relatively colder temperature of such earth is utilized to assist in cooling the interior environment of the system 3000.

Considering that a major energy expenditure for the operation of an indoor farm is for cooling both the ambient air and the water used in the hydroponic systems, the geothermal system 3090 represents an additional mechanism or arrangement to reduce such costs. Other advantages in a large-scale production farm is increased reliability for cooling. The capacity of large farms is such that, should a cooling system component fail, the impact on the output of high quality crops could be significant, particularly if the failure were prolonged. Thus, the known reliability of geothermal systems would additionally serve to ensure that product output and product quality is maintained.

An additional issue of growing plants at high density in a vertical farm such as within the 3001 structure, is the production and/or presence of a high level of humidity. To maintain rapid growth of healthy plants, the relative humidity must be controlled to specific levels and the typical arrangement used to achieve these lower humidity levels are dehumidifiers. Such dehumidifiers employ energy intensive compressors to condense water vapor onto coils, thereby removing water vapor from the air. The additional application of the geothermal cooling system takes advantage of the cooling effect being associated with a dehumidification effect. Thus, dehumidification also occurs with geothermal-based cooling.

A further advantage of the geothermal cooling system, which is tied to the reduced amount of electricity systems of the invention require, is a reduction in carbon output, particularly if the local electrical utility utilizes fossil fuels, i.e., the disclosed system can serve to reduce the farm's overall "carbon footprint".

As also shown in FIG. 31, the system 3000 may utilize any of a wide variety of solar panel arrangements in addition to those described above. In particular, FIG. 31 shows an additional solar panel array 3040'. In one embodiment of the invention, the solar panel array 3040' may be disposed upon a roof of the structure 3001. However, it should be appreciated to one of ordinary skill in the art that such a solar panel array or other solar panel arrangement may be disposed in a wide variety of spaces and/or environments as may be desired.

Figure 32:
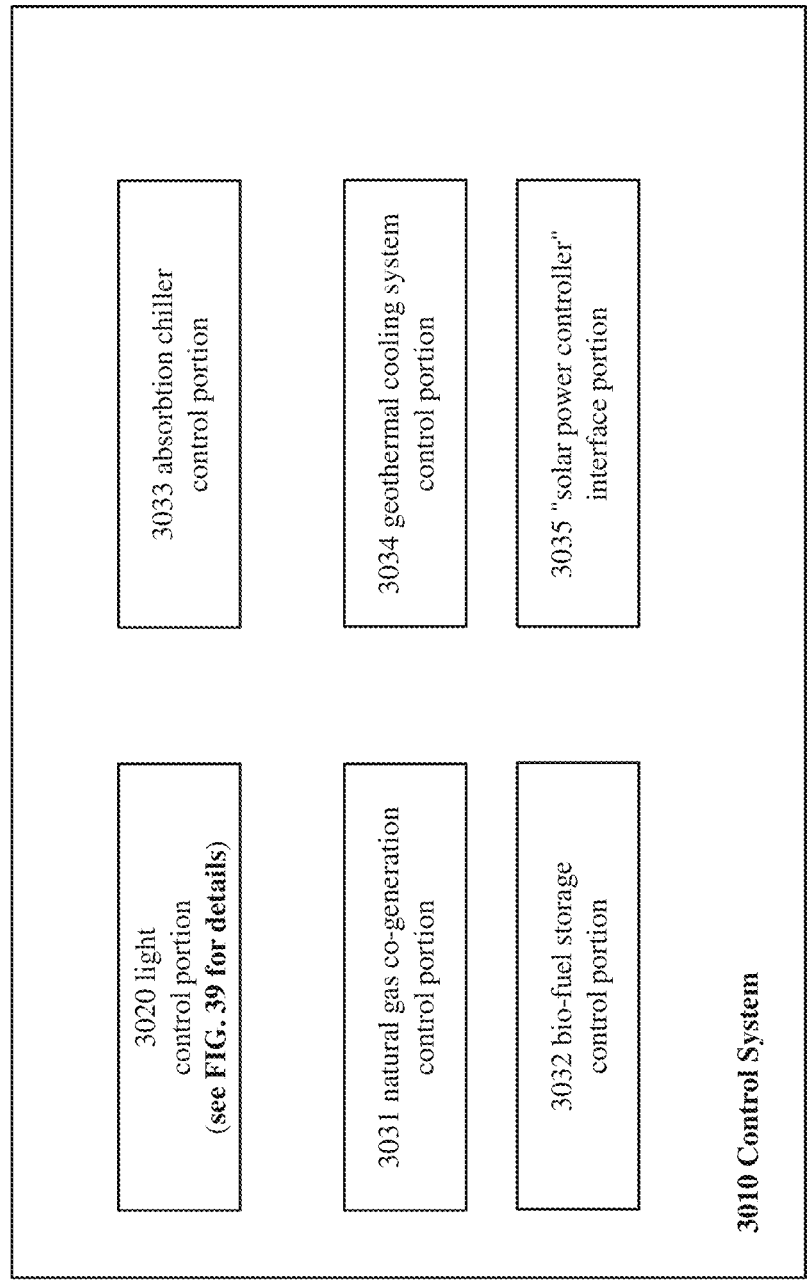
FIG. 32 is a block diagram showing features of the control system of FIG. 30, in accordance with the disclosed subject matter.

FIG. 32 is a block diagram showing features of the control system 3010 of FIG. 30, in accordance with at least one embodiment of the invention. The control system 3010 may be deployed in part or in whole through a machine or apparatus that executes computer software, program codes, and/or instructions on a computer processor to perform the various processing described herein.

The control system 3010 includes a light control portion 3020. The light control portion 3020 performs processing to control various aspects of the exposure of light to growing plants. Such control of the exposure of light includes both artificial light and natural light. Further details are described below.

The control system 3010 also includes a natural gas co-generation control portion 3031, in accordance with at least one embodiment of the invention. The natural gas co-generation control portion performs processing to control various aspects of the apparatus 3070 described above with reference to FIG. 30. For example, the natural gas co-generation control portion 3031 may control the amount of electricity produced by the natural gas co-generation apparatus 3070 and may control the amount of heat, i.e. thermal energy, produced by the natural gas co-generation apparatus 3070. Further, the natural gas co-generation control portion 3031 may coordinate the production of electrical energy and/or heat energy with other sources of energy within the system 3000. For example, the control portion 3031 may coordinate production of electrical energy and/or heat energy with the production and utilization of bio-fuel energy. Further, the natural gas co-generation control portion 3031 may coordinate the production of energy with anticipated energy needs of the system 3000. For example, such anticipated energy might be based on historical data regarding anticipated environmental temperatures or a change in requisite interior temperatures (and the growing environment) to effectively grow a desire crop plants. Natural gas co-generation systems additionally increase efficiency and reduce costs by the ability to add carbon dioxide capture capabilities. The carbon dioxide gas, released as a direct combustion product of natural gas, is captured, concentrated and purified, and then provided to the plants as pure carbon dioxide to promote growth. Current levels of carbon dioxide gas to enhance growth of plants in closed systems may range from 1100 ppm to 1500 ppm, for example, necessitating the purchase of significant quantities of carbon dioxide on a regular basis.

The control system 3010 also includes a bio-fuel storage control portion 3032, in accordance with at least one embodiment of the invention. The bio-fuel storage control portion 3032 may control various operations of the bio-fuel storage 3080.

The control system 3010 also includes an absorption chiller control portion 3033, in accordance with at least one embodiment of the invention. The absorption chiller control portion 3032 may control various operations of the absorption chiller 3060.

Figure 34:
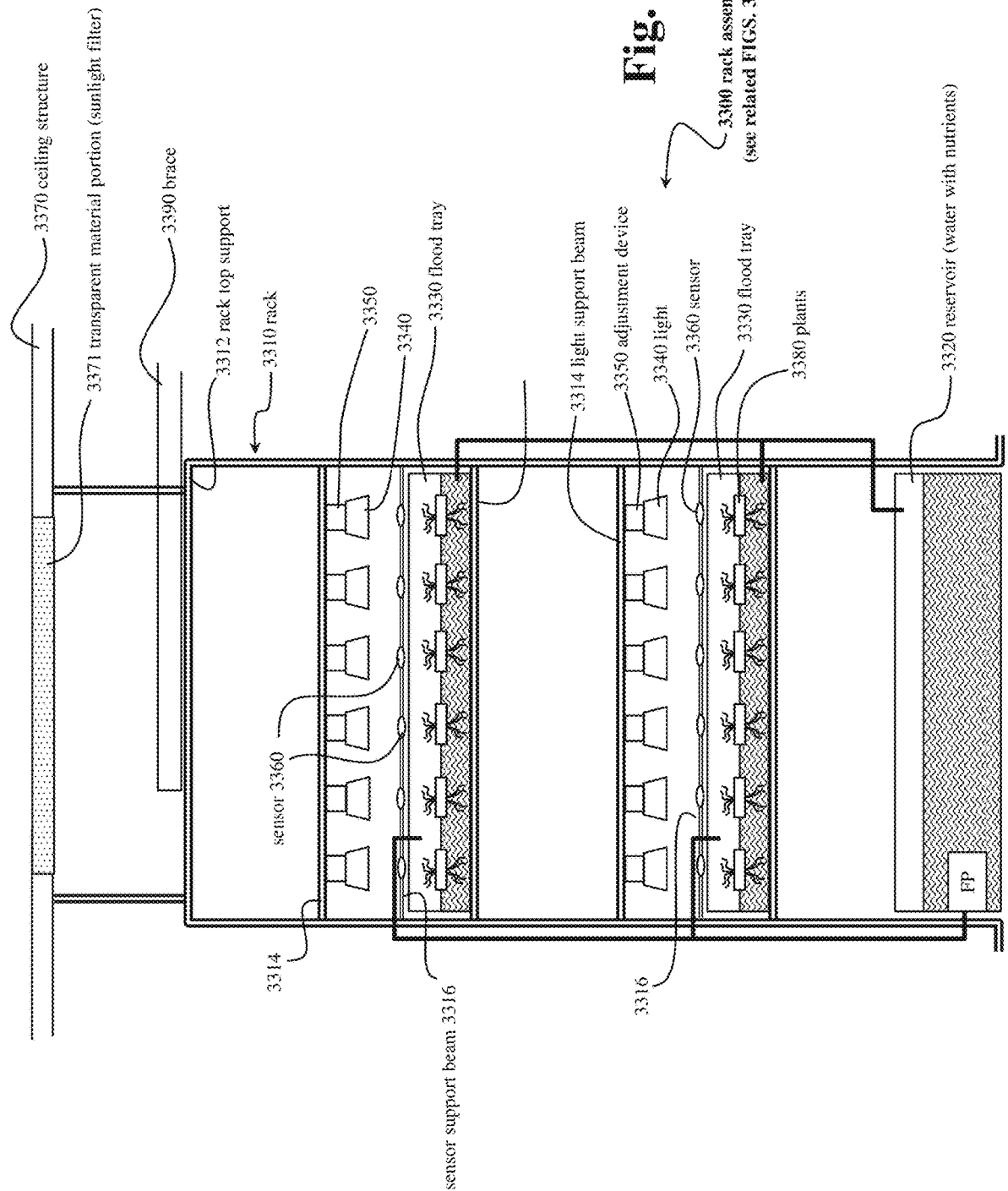
FIG. 34 is a further diagram showing an end view of a rack assembly in accordance with the disclosed subject matter.

The control system 3010 also includes a geothermal cooling system control portion 3034, in accordance with at least one embodiment of the invention. The geothermal cooling system control portion 3033 may control various operations of the geothermal cooling system 3090, which is shown in FIG. 34.

The control system 3010 also includes a "solar power controller" interface portion 3035, in accordance with at least one embodiment of the invention. As described above, the controller system 3010 (and specifically the interface portion 3035) may perform various processing to coordinate operations of the overall system 3000 with the operations of the solar power controller and any of the various solar power arrays utilized by the system.

The control system 3010, may be a digital, programmable, control unit, which may be capable of integrating cooling, dehumidification and heating demand with proportional energy generation, in accordance with the disclosed subject matter. For example, generation of electrical energy (by solar array or other generation device or arrangement) will vary, particularly with regard to the solar array. The control system or controller 3010, in response to such variable availability of energy, may alter the relative proportion of energy derived from the solar array when full daytime sunlight is available, and proportionally decrease use of energy derived from the co-generation system, as well as any other energy source. The continual monitoring and rapid adjustment of available energy sources will maximize overall energy efficiency. The programmable aspect of the control system 3010 as well takes advantage of the system's total energy monitoring capability, which reports actual energy consumption and thus provides immediate feedback to enable precise adjustment of individual energy sources. In this way, energy production capacity is matched to demand in the structure 3001, to achieve maximum efficiency. Further details, in accordance with the disclosed subject matter, are described below with reference to FIG. 40-FIG. 42, for example.

The programmable aspect of the control system 3010 permits the manual adjustment of sensor parameters such as response sensitivity to environmental conditions, as a way to tune environmental setpoints to achieve maximum efficiency. The system's total energy monitoring capability would then report actual energy consumption and thus provide immediate feedback to enable precise adjustment of individual parameters in the system. Likewise, such data input into the system can be used in a machine learning environment to automate fine adjustment of the system to maximize energy use efficiency.

In an aspect of the invention as described above with reference to FIG. 31, the system 3000 may include a rack system 3002. The rack system 3002 may include a plurality of rack assemblies 3300. FIG. 33 is a diagram showing an end view of a rack assembly 3300 in accordance with at least one embodiment of the invention.

As shown, the rack assembly 3300 includes a rack 3310 upon which growing plants are disposed. The rack 3310 includes opposing rack side supports 3311. The two opposing rack side supports 3311 are connected, at a top portion thereof, by a rack top support 3312. Accordingly, the rack top support 3312 spans the width of the rack 3310. At a lower extent of each rack side support 3311 is an attachment flange 3315. The attachment flange 3315 may be fixedly attached to a supporting floor. That is, each attachment flange 3315 may be attached to a floor structure within the system 3000. Attachment of the attachment flange 3315 may be performed through any desired mechanism, such as utilizing bolts, screws and/or welding, for example.

Figure 33:
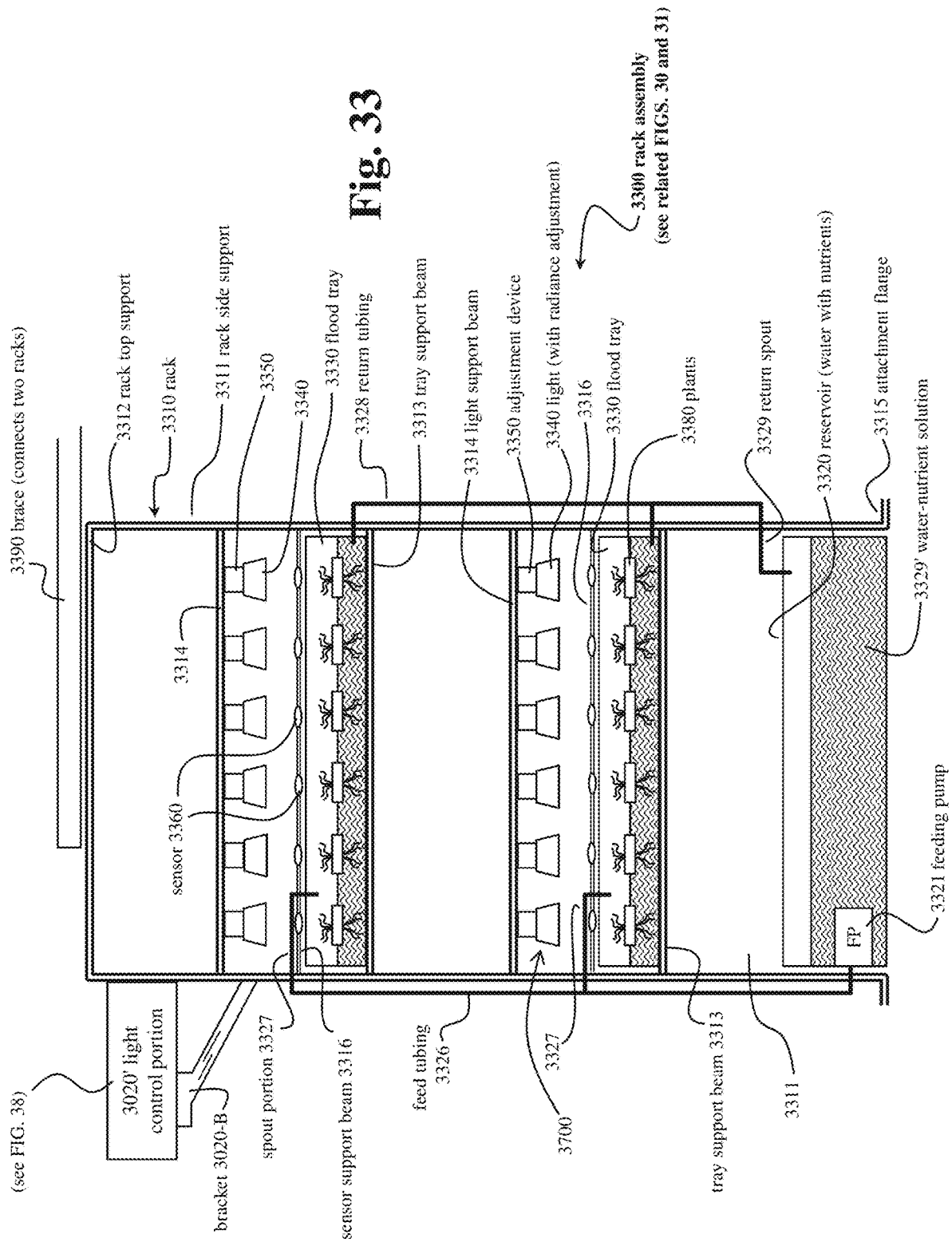
FIG. 33 is a diagram showing an end view of a rack assembly in accordance with the disclosed subject matter.

The rack 3310, as shown in FIG. 33, also includes a plurality of tray support beams 3313. Each tray support beam 3313 spans between the opposing rack side supports 3311. Each tray support beam 3313 may be connected to the rack side supports 3311 utilizing a suitable mechanism, such as by welding and/or bolts. The tray support beams 3313 serve to support a corresponding flood tray 3330, as well as plants 3380 that are disposed in each flood tray 3330.

In general, it is appreciated that the support structure shown in FIG. 33 may be utilized along the length of the rack assembly 3300 as desired. For example, the structural arrangement shown in FIG. 33 might be utilized every 3 or 4 feet, with such structure being fixedly attached to each other as desired—so as to provide a stable arrangement.

Another rack assembly system design may include features that enable increased access to the water tray to improve plant-growth processing steps. For example, the efficiency by which young plantlets are introduced into the system, as well as crop harvesting, would be increased. A cantilever style pallet rack system provides no front access obstructions and is adjustable to accommodate a variety of different plant heights. Along with enhanced access to plants, lack of front-side vertical obstructions permits single, elongated plant water trays that span the entire length of a shelf, decreasing complexity in rack assembly with a resulting decrease in construction costs. The simplicity of the cantilever-style rack design also increases ease of maintenance of associated components such as plumbing, electrical and lighting systems. Additional features stemming from the cantilever design include increased efficiency of system upgrades, such as LED lighting systems, since these are anticipated to be replaced with next-generation models every few years.

The rack 3310 further includes a plurality of light support beams 3314. Each light support beam 3314 also spans between opposing rack side supports 3311. As shown, the light support beams 3314 serve to support a plurality of lights disposed above the corresponding flood tray 3330. It is appreciated that the number of lights disposed on the light support beam 3314 may be varied as desired. Further, the vertical position of the light support beam(s) 3314, as well as the tray support beam(s) 3313, may be adjustable up or down, in accordance with at least some embodiments of the invention. The adjustability may be provided utilizing removable bolts that connect the light support beam and/or tray support beam(s), for example, to the opposing rack side supports 3311. Other mechanisms, such as ridges, shoulders, flanges, motorized rack-and-pinion arrangements, and/or motorized gear arrangements might be utilized to provide adjustability of the light support beam(s) 3314 and/or tray support beam(s) 3313 up or down along the rack side support 3311. Other components of the rack assembly, such as the sensor support beam 3316 for example, may also be adjustable in similar manner. In accordance with the disclosed subject matter, LED lights may be employed that feature output adjustability so that light intensity can be dimmed or increased remotely (including by a controller) in response to requirements or preferred treatment of a species during plant development. For example, lower intensity light could be supplied at earlier stages of plant growth and higher intensity at later stages. Likewise, different plant species typically require different light intensities for optimal growth and these requirements could be met with the adjustable light system.

Further details of light structures supported by the light support beams 3314 are described below with reference to FIG. 37. As shown in FIG. 33, the light support beam 3314 may directly support an adjustment device 3350 that in turn supports a light 3340. In an aspect of the disclosure, the adjustment device 3350 provides the ability to physically adjust the position of the light 3340. For example, such physical adjustment might be performed utilizing a telescoping arrangement of the adjustment device 3350. Further details are described below.

The rack 3310 further includes a plurality of sensor support beams 3316. Each sensor support beam 3316 also spans between opposing rack side supports 3311. As shown, the sensor support beams 3316 serve to support a plurality of sensors disposed above the corresponding flood tray 3330. It is appreciated that the number of sensors disposed on the sensor support beams 3316 may be varied as desired. Further, the vertical position of the sensor support beams 3316 may be adjustable up or down, in accordance with at least some embodiments of the invention. The adjustability may be provided utilizing removable bolts that connect the sensor support beam 3316 to the opposing rack side supports 3311. Other mechanisms, such as ridges, shoulders, flanges, might be utilized to provide adjustability of the sensor support beams 3316 up or down along the rack side support 3311. In accordance with the disclosed subject matter, the sensor support beam 3316 may be lowered and raised in relation to growing height of the plants. This would serve to increase the accuracy of the light sensor in giving the actual spectra and/or intensity readings at the level of light inception by the plant leaves. Such is an additional advantage of a sensor support beam that tracks plant height during growth.

In accordance with the disclosed subject matter, each sensor is provided to output a reading of observed light level or levels. The number of sensors utilized may vary as desired. For example, with less sensitive plants, a fewer number of sensors might be utilized since the particular plant is not as sensitive to variations in light. As shown in FIG. 33, an arrangement is provided such that one sensor corresponds with one growing plant. In another embodiment, there may be indeed multiple sensors associated with a particular growing plant. This may be desired in the situation where multiple lights are used (in growing the plant) with corresponding different wavelengths. Each sensor is provided to monitor a different wavelength of light. In particular, this might be the situation where both natural light and artificial light is utilized in growing a plant. As otherwise described herein, exposure of the plant to one or more lights may be controlled utilizing a suitable algorithm and/or automated processing. Any of a wide variety of sensors may be utilized to monitor and control light exposure of plants.

In addition to measurement of light intensity and spectra, the sensor support beam can accommodate a variety of sensors to indicate aspects of plant growth, performance and health. For example, digital image spectral analysis instruments may be employed to provide data-rich analyses in the areas of crop health and plant phenomics. Such systems can be used to assess plant health by acquiring accurate data on pigment content which can be directly correlated to a plant's physiological status. Continuous measurement of leaf chlorophyll content, for example, can provide an arrangement to accurately assess plant growth, as well as health, and thus provide information on determining when harvesting can take place. For example, assessment of total leaf chlorophyll accumulation has been shown to correlate to overall plant biomass. Thus, an arrangement is provided to acquire growth-data in a remote, non-invasive manner, through such imaging systems. Other sensor systems include chlorophyll fluorescence detection, which indicates precise levels of photosynthetic activity. Leaf chlorophyll fluorescence, which is widely used to evaluate plant photosynthetic performance, and therefore, the physiological status of the plant, is also able to indicate plants that are experiencing stress, including nutrient-limitation stress, or environmental stress. The functional gauging of active photosynthesis occurring in the plant in real time, also enables precise adjustment of light fluence rates, and can be used in conjunction with the light control portion 3020. Another sensor type is thermal imaging, which provides complementary, as well as overlapping, information about plant health, water content, etc. Thermal imaging is known and typically uses near-infrared light in the region of 0.7-1.1 μm, for example. Use of thermal imaging sensors can also provide temperature profiling directly on plant leaves to assist in optimizing water-air temperature programs for a given species. All of the various sensors may provide input into a light adjustment device, such as the light adjustment device 3350. Finally, all of the sensors and imaging systems are non-invasive and generally provide distinct forms of data on overall plant performance and health well before any visual phenotypes are manifested.

As shown in FIG. 33, the rack assembly 3300 is provided in conjunction with a brace 3390. As otherwise described herein, such a brace 3390 may be utilized to connect a first rack assembly 3300 with a second rack assembly. Such arrangement provides enhanced stability and resistance to tipping. Each brace 3390 may be connected to the top support 3312 utilizing suitable mechanical attachment mechanisms, such as bolts, screws and/or welding.

In an aspect of the invention is shown in FIG. 33, the rack assembly 3300 may include a light control portion 3320'. Such light control portion 3320' might be a subcomponent of the light control portion 3320 of FIG. 32. In an aspect of the invention, the light control portion 3020' may control specific operation of an individual rack assembly 3300, as shown in FIG. 33, with overall light operations (throughout the system 3000) being controlled by the light control portion 3020 of FIG. 32. The light control portion 3020' may be suitably supported, such as utilizing a bracket 3020-B.

The rack assembly 3300 also includes a system for circulating a water-nutrient solution and/or other fluid. The rack assembly 3300 includes a reservoir 3320. The reservoir 3320 is filled to a predetermined level with a water-nutrient solution, in accordance with at least one embodiment of the invention. The solution is pumped from the reservoir 3320 utilizing a feeding pump 3321. More specifically, the feeding pump 3321 pumps the solution from the reservoir 3320 into a feed tubing 3326. In turn, the feed tubing 3326 connects to corresponding spout portions 3327. Each spout portion 3327 provides the solution to a corresponding flood tray 3330. For example, the feed tubing 3326 and corresponding spout portions 3327 might be constructed of any suitable material, such as PVC, plastic or rubber, for example. Relatedly, the rack assembly 3300 also includes return tubing 3328. The return tubing 3328 may be provided to drain solution from a corresponding flood tray 3330. A portion of the return tubing 3328 may be connected to each flood tray 3330 at a lower extent of a sidewall or may be connected through the bottom of a flood tray 3330. In other words, the return tubing 3328 may drain a corresponding flood tray 3330 from either a sidewall or from a bottom panel of the flood tray 3330. As shown in FIG. 33, an end of the return tubing 3328 may be provided with a return spout 3329. The return spout 3329 returns the water-nutrient solution 3329', for example, to the reservoir 3320.

It is appreciated that the number and spatial arrangement of the various components of the rack assembly 3300 may be varied as desired. Accordingly, instead of the two flood trays 3330 shown in FIG. 33, there may be three, four, or more flood trays. Further, as noted above the number of lights may be varied as desired as well as the position of the lights. Further, the number of sensors 3360 may be varied as desired.

FIG. 34 is a further diagram showing an end view of a rack assembly 3300 in accordance with at least one embodiment of the invention. FIG. 34 illustrates that the rack 3310 may be structurally attached to a ceiling structure. More specifically, in accord with one embodiment of the invention, the rack top support 3312 (of the rack 3310) may be structurally attached to a ceiling structure 3370. Such arrangement may provide substantial support to the rack assembly 3300. Also illustrated in FIG. 34 is that the ceiling structure 3370 may be provided with a transparent material portion 3371. Attributes of the transparent material portion 3371 may vary as desired. Variable attributes may include the size of the transparent material portion, the material that the transparent portion is constructed of, and the thickness of the transparent material portion, for example. For example, the transparent material portion might be constructed of glass or a transparent plastic. In some embodiments of the invention, the transparent material portion 3371 might be interchangeable with a portion of different attributes. Such may be beneficial in that a transparent material portion having first attributes might be conducive to growing a first plant, whereas a transparent material portion of different attributes might be more conducive to growing a second type of plant.

Figure 39:
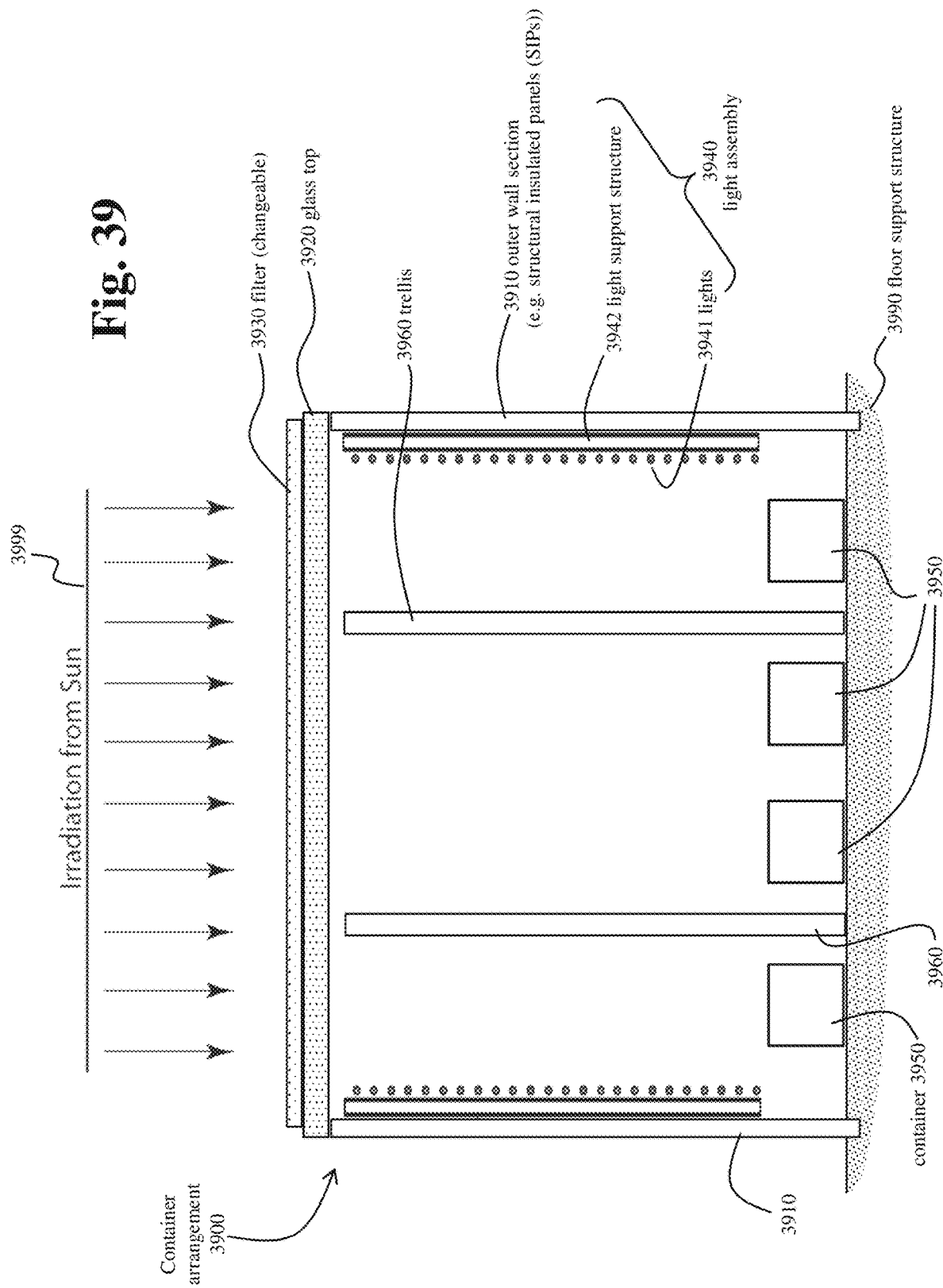
FIG. 39 is a diagram showing a further container arrangement, in accordance with the disclosed subject matter.

The light-transparent material 3371, most simply, glass, could be filtered by any range of spectral filter material, that could be interchanged as needed, including the ability to fully block solar irradiation. In a related aspect, a system of reflectors, to reflect light down onto lower shelves, such lights provided particularly on, the upper most shelves within the rack, would supply some light to those lower shelves. Plants on shelves below may be irradiated by light from LEDs. In another application, long-term, vine-like growing plants, such as orchids, could be grown with a tiered rack system by which the majority of light is provided by the sun, and a small amount of supplemental light provided by LED banks vertically along the sides as shown in FIG. 39. This additional module would be in addition to the design of the structure 3001 and is a system designed to the growth of plants that necessitate or require long-term growth but require relatively lesser light intensities.

Figure 35:
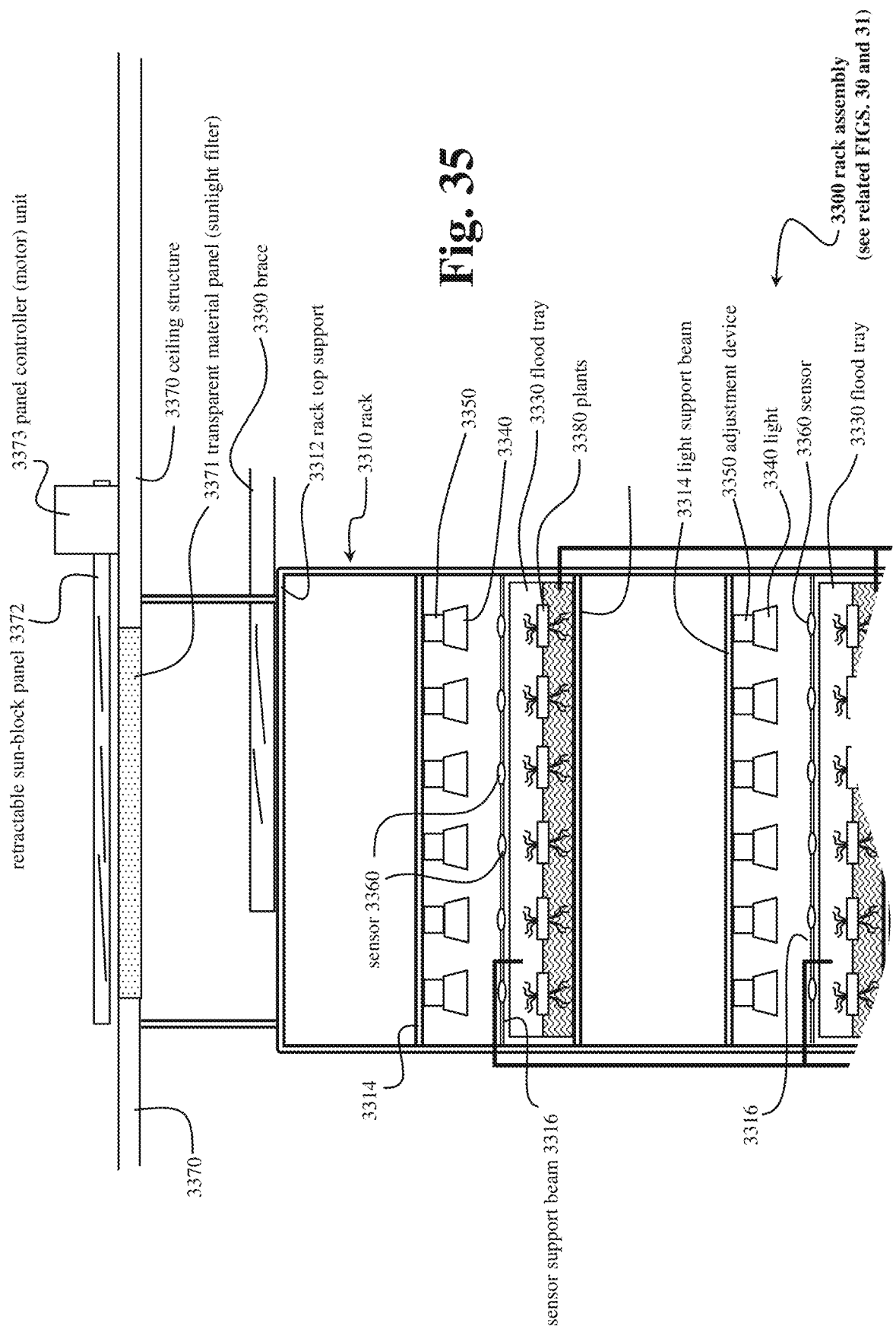
FIG. 35 is a further diagram showing an end view of a rack assembly in accordance with the disclosed subject matter.

FIG. 35 is a further diagram showing an end view of a rack assembly 3300 in accordance with at least one embodiment of the invention. In particular, the arrangement of FIG. 35 includes a transparent material panel 3371, in similar manner to the arrangement of FIG. 34.

In particular, FIG. 35 illustrates a retractable sun-block panel 3372. The retractable sun-block panel 3372 may be removably disposed over the transparent material panel 3371 so as to effectively block light from passing into and through the transparent material panel 3371. As illustrated in FIG. 35, the retractable sun-block panel 3372 may be manipulated utilizing the panel controller unit 3373. The panel controller unit 3373 may be provided to move the retractable sun-block panel 3372 from a first position in which the panel 3372 blocks light from passing into the panel 3371—to a second position in which the panel 3372 is fully removed from over the panel 3371, i.e. so as to allow light to pass through the panel 3371. Mechanical arrangements may be utilized to allow or preclude ambient sunlight from passing into and through a transparent panel. As shown in FIG. 35, the panel 3372 might indeed be in the form of a filter that selectively blocks light. Different panels 3372 might be positioned, selectively, over the transparent panel 3371 in some automated manner. For example, perhaps a first panel 3372 is a filter, whereas a second panel (not shown) is light non-transmittable.

Figure 36:
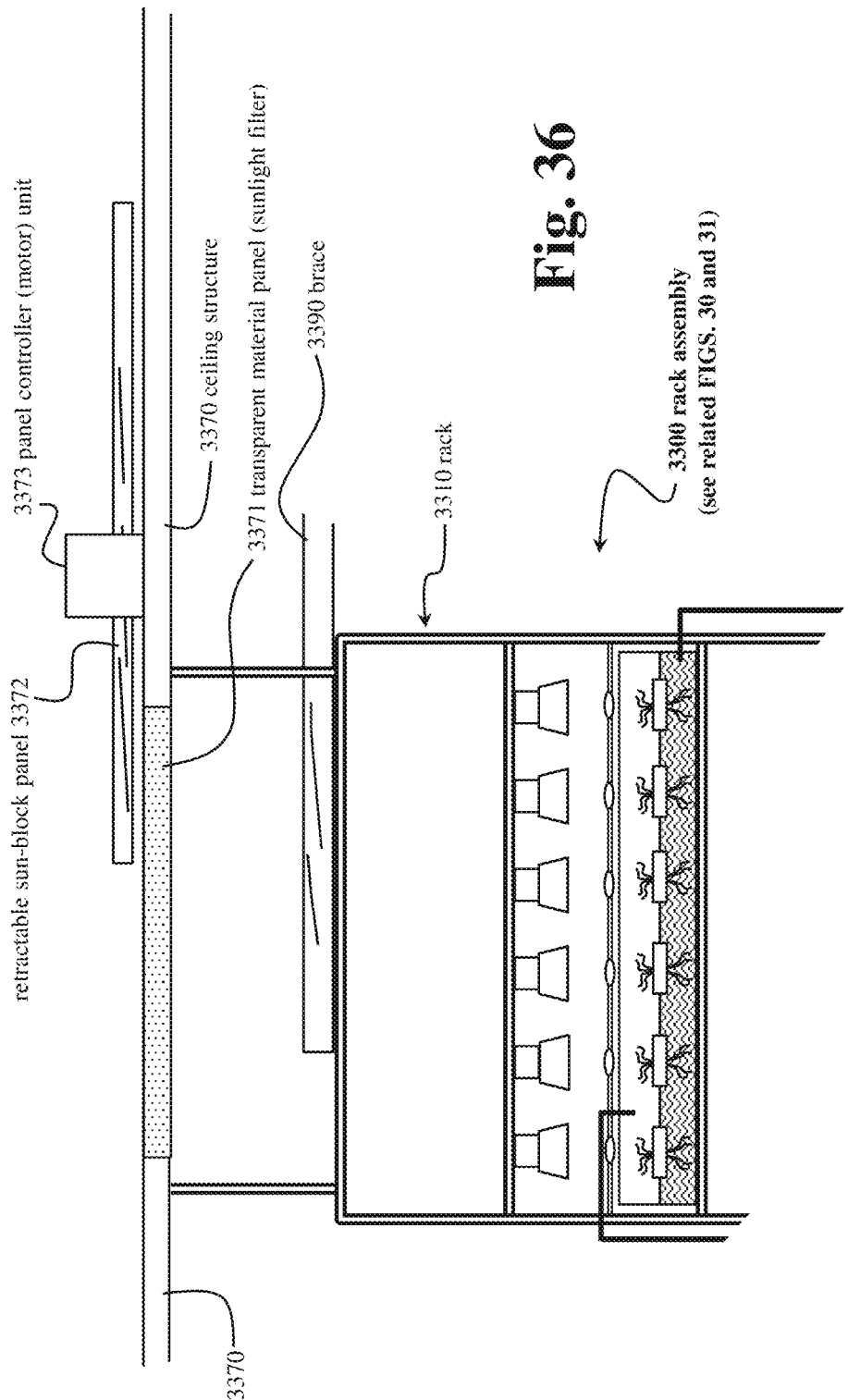
FIG. 36 is a further diagram showing an end view of a rack assembly in accordance with the disclosed subject matter.

FIG. 36 is a further diagram showing an end view of a rack assembly 3300 in accordance with at least one embodiment of the invention. The arrangement of FIG. 36 corresponds with the structure shown in FIG. 35. However, in the arrangement of FIG. 36, the retractable sun-block panel 3372 is partially withdrawn from over the transparent material panel 3371. Accordingly, such adjustable arrangement provides for the amount of sunlight impacting upon a plant or group of plants to be varied as desired. As the retractable sun-block panel 3372 is further retracted from over the transparent material panel 3371—such will of course result in more sunlight passing into and through the transparent material panel 3371.

Figure 37:
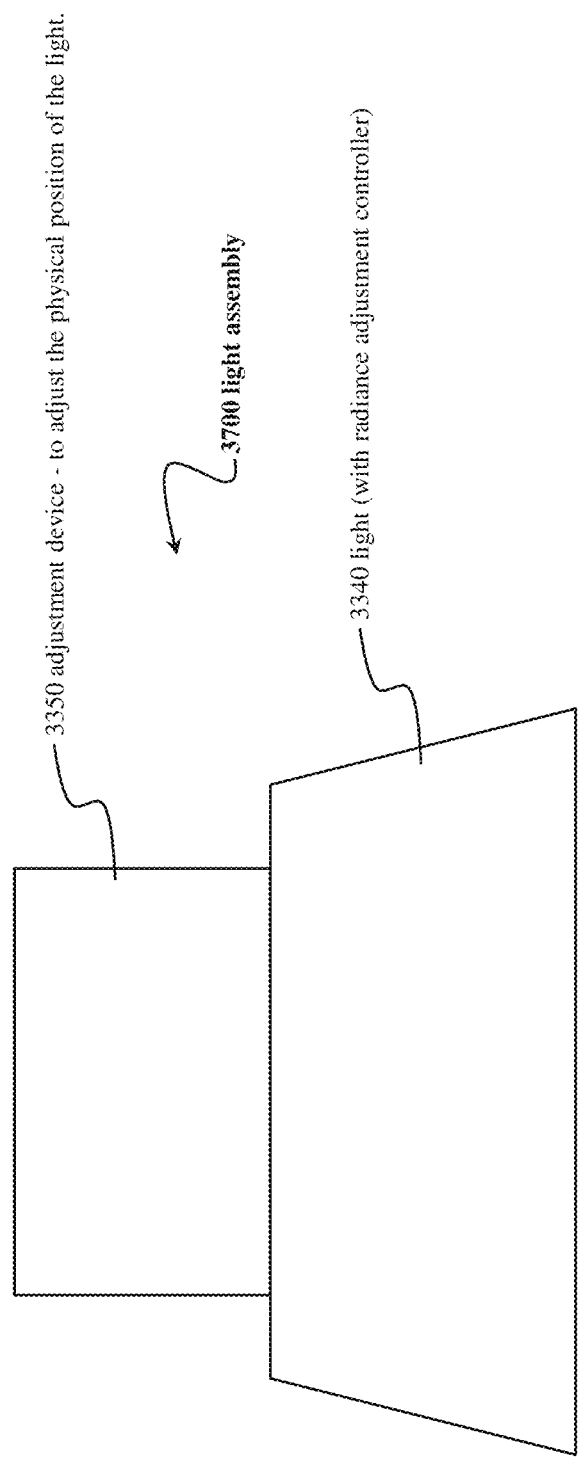
FIG. 37 is a diagram showing a light assembly, in accordance with the disclosed subject matter.

FIG. 37 is a diagram showing further details of a light assembly 3700 of FIG. 33, in accordance with at least one embodiment of the invention. As shown in FIG. 37, each light assembly includes a light 3340 and an adjustment device 3350.

In aspects of the invention, the light 3340 may be provided with functionality so as to adjust various attributes of the light. Such attributes might include the focus of the light, the direction of the light, the overall radiance of the light, the wavelength of light emitted, and other attributes. Various attributes of light may be adjusted to provide the optimum growing environment for a plant. For example, a lens type structure may be provided in the light 3340. For example, small panels or variable sized apertures may be provided in the light 3340—so as to control the emission of light. Control of different light spectra and intensity may be done electronically using remote switching. One additional aspect regarding different spectra is the introduction of short-duration light treatments in one or more specific stages of plant growth. For example, the use of "long-wave" UV, wavelengths and wavelengths into the blue range (315 to 430 nm) are known to upregulate specific plant metabolic pathways. Some of these pathways produce plant pigments and many of these possess useful properties, such as having antioxidant activities. Thus, short treatments of specific wavelength light in the 315 to 430 nm range can be used to induce the accumulation of such desirable compounds. Because these wavelengths are generally detrimental to the plant when irradiation is conducted continuously, the use of short exposures times and at specific stages of plant growth, such as 5-to-10 days before harvest, enables this light control over metabolism.

With further reference to FIG. 37, in aspects of the invention, the adjustment device 3350 may be provided with functionality so as to adjust the physical position of the light 3340. Various mechanisms might be utilized to adjust the physical position of the light such as a telescopic arrangement, rack and pinion arrangement, hinge arrangement, or any other type of arrangement/mechanism that might be utilized to selectively or adjustably position the light 3340 in a beneficial manner. In accordance with the disclosed subject matter, light may also be adjusted by dimming light intensity electronically using a controller.

Figure 38:
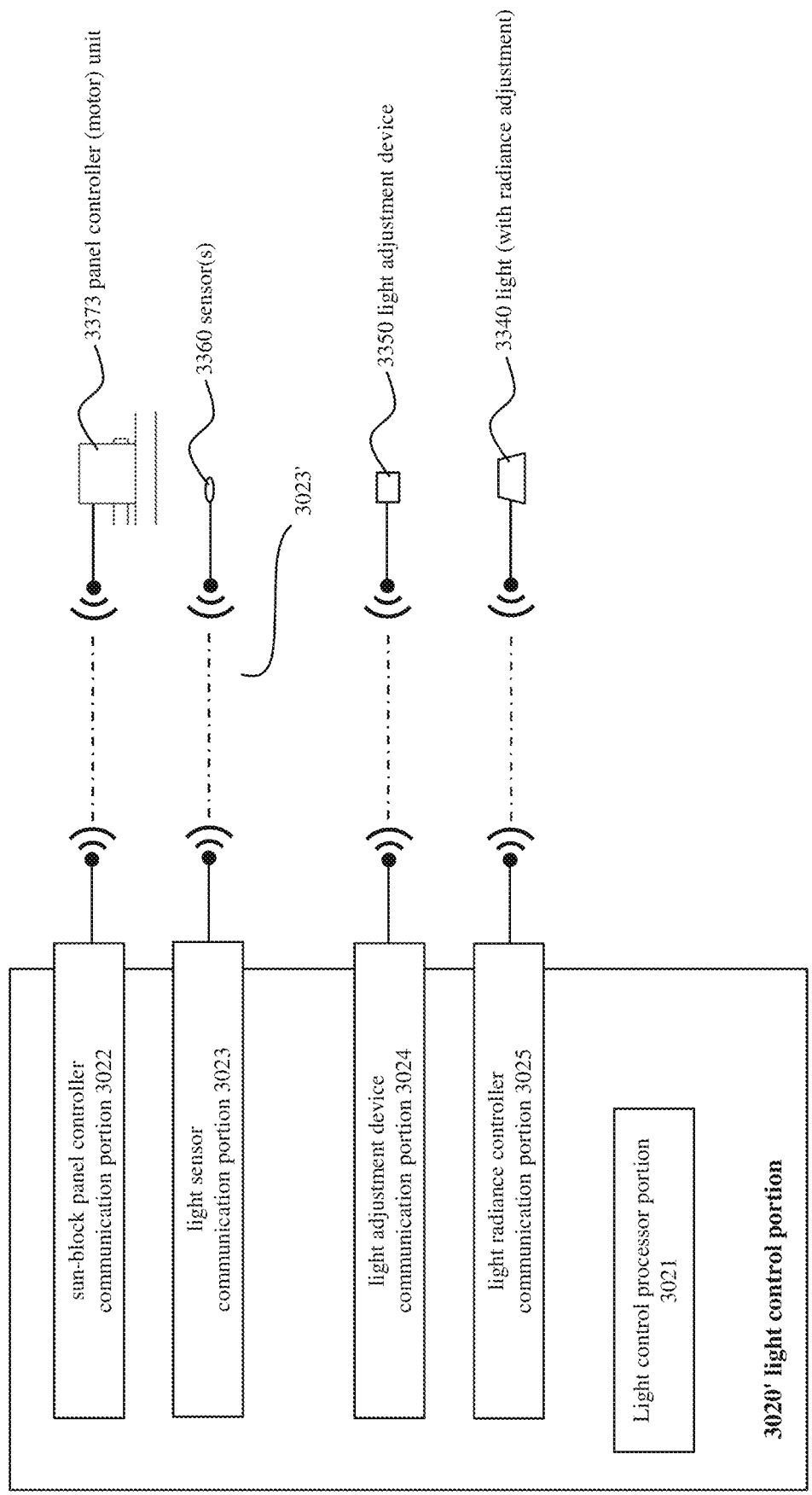
FIG. 38 is a diagram showing further details of the light control portion of FIG. 33, in accordance with the disclosed subject matter.

FIG. 38 is a diagram showing further details of the light control portion 3020' of FIG. 33, in accordance with at least one embodiment of the invention. As shown in FIG. 38, the light control portion 3020' may include a light control processor portion 3021. The light control processor portion 3021 may be in the form of a machine or apparatus that executes computer software, program codes, and/or instructions to input various data associated with operation of light related mechanisms, process that data, and control light related mechanisms.

As shown in FIG. 38, the light control portion 3020' includes a sun-block panel controller communication portion 3022, a light sensor communication portion 3023, a light adjustment device communication portion 3024, and a light radiance controller communication portion 3025.

The light sensor communication portion 3023 may be connected respectively to one or more light sensors 3360 as shown in FIG. 33, for example. As illustrated by FIG. 38, such "connected" state might be provided wirelessly through a suitable communication channel 3023'. Alternatively, such "connected" state might indeed be provided through physical wires.

The particular manner in which the light sensor communication portion 3023 inputs light sensor data and communicates that light sensor data to the light control processor portion 3021 may vary as desired. For example, individual lights might be associated and controlled by the input from individual sensors. On the other hand, the processing performed by the light control processor portion 3021 might be based on some aggregate input from light sensors 3360. For example, such aggregate input might utilize an average value of observed light sensor values. Adjustment of optimal light conditions and qualities can be made via input from sensors, as described herein.

The light control portion 3020' further includes the sun-block panel controller communication portion 3022. As illustrated, such communication portion 3022 communicates with the panel controller 3373 so as to control operation of the panel controller 3373. For example, in a given day as the sun rises in the sky, the intensity of light passing through a skylight and impacting a plant may increase. Accordingly, the light control portion 3020' may control the panel controller 3373 (see FIG. 36, for example) so as to control the position of the retractable sun-block panel 3372. In this manner, the light control portion 3020' may provide an optimal "mix" of natural light and artificial light. Also, as otherwise described herein, the panel controller 3373 may be controlled so as to position panels of different attributes over the transparent material panel 3371. For example, a first panel may be provided to completely block all sunlight. On the other hand, the second panel may be provided, in an automated manner, to filter sunlight to a desired wavelength.

The light control portion 3020' further includes a light adjustment device communication portion 3024. The light adjustment device communication portion 3024 provides communication between the processor portion 3021 and one or more light adjustment devices 3350. For example, such communication may provide the ability for the light control processor portion 3021 to control, in some predetermined manner, a physical position of a light to be closer or farther away from a given plant. The light control portion 3020' further includes a light radiance controller communication portion 3025. The communication portion 3025 provides communication between the processor portion 3021 and one or more lights 3340. For example, such communication may provide the ability for the light control processor portion 3021 to control, in some predetermined manner, the intensity of the light, the direction of the light, an aperture through which the light is output, the manner in which the light is filtered, and/or other attribute(s) of light.

FIG. 39 is a diagram showing a further container arrangement 3900, in accordance with at least one embodiment of the invention. The container arrangement 3900 may be disposed upon a floor support structure 3990. The floor support structure 3990 might be a cement structure or pad, for example. The container arrangement 3900 includes a plurality of the outer wall sections 3910 arranged so as to provide an enclosed volume. For example, four (4) of the outer wall sections 3910 might be utilized, in conjunction with a suitable entrance (e.g. door), to provide an enclosed volume. For example, the outer wall sections might be SIPs (structural insulated panels). The container arrangement 3900 includes a suitable structure that encloses the top of the structure. For example, as shown in FIG. 39, a glass top 3920 may be provided. A filter 3930 may be provided on top of the glass top 3920. The filter may be any of a wide variety of materials and/or compositions as otherwise described herein. The filter 3930 may be changeable, and may be secured utilizing suitable fasteners and/or may be adjustable, such as by using a retractable mechanism 3372, 3373 as shown in FIG. 35 or otherwise described herein. Irradiation 3999 from the sun is thus allowed to pass through the glass top 3920 into an interior of the container arrangement 3900. Accordingly, the arrangement provides a solar-transparent opening, constructed of glass, with changeable filters.

The container arrangement 3900 includes a plurality of containers 3950 that contain nutrient solution, seedlings, and/or other materials as otherwise described herein. In this example, the container 3950 is in the form of a bucket assembly 3950. In particular, the containers 3950 may be constituted by a "dutch bucket" used in conjunction with drip irrigation. Seedlings and/or plants disposed in the containers 3950 may be anchored in place and fed as described herein. The container arrangement 3900 also includes a plurality of trellis structures or trellises 3960 that serve to provide a structure upon which plants may grow and be supported. In particular, each trellis 3960 may provide for vine support and growth in the indoor environment provided by the container arrangement 3900.

The container arrangement 3900 may further include a light assembly 3940. The light assembly 3940 may include a light support structure 3942 upon which are mounted a plurality of lights 3941. The lights 3941 may be LED lights, for example—so that the structure provides an LED light bar. Position of the lights may be adjusted automatically or manually. For example, the position of the lights might be adjusted so as to be closer to a particular trellis or farther away from a particular trellis. Adjustment of the light assembly 3940 may be mechanized and controlled by a controller based on plant growth, for example.

As described throughout this the disclosure, the systems and methods of the invention include various arrangements and devices to promote plant growth. Some of the arrangements and devices consume electrical energy or other energy. Some of the arrangements and devices generate electrical energy or other energy. In an aspect of the invention, apparatuses and methods are described to balance this consumption and generation of energy.

Figure 40:
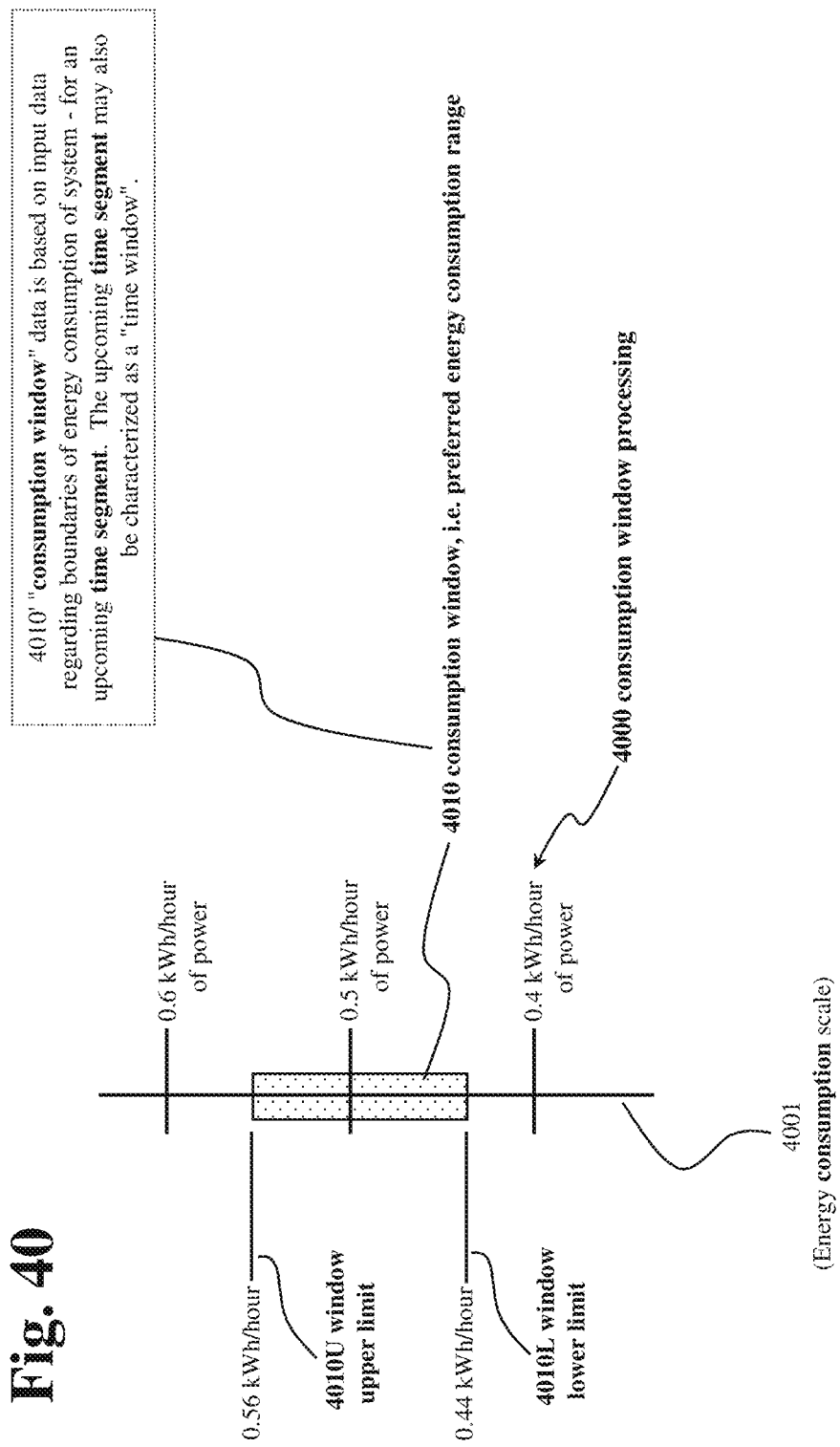
FIG. 40 is a diagram showing aspects of "consumption window" processing, in accordance with the disclosed subject matter.

Accordingly, FIG. 40 is a diagram showing aspects of consumption window processing 4000, in accordance with at least one embodiment of the invention. In particular, FIG. 40 illustratively shows a "consumption window" 4010 that represents a preferred energy consumption range for what may be characterized as one or more growth assist devices (GADs). Various GADs are described throughout this disclosure. For example, a GAD might be a light. For example a GAD might be an irrigation pump or some other device. In this aspect of the invention as reflected at 4010' of FIG. 40, "consumption window" data is based on input data regarding what might be characterized as "boundaries" of energy consumption of the system, for an upcoming time segment. The "consumption window" is thus a range of energy consumption at which the GADs will preferably operate at over a segment of time. In embodiments of the invention, the consumption window may be based on aggregated GADs, associated with the system, as may be desired. In the example of FIG. 40, the consumption window 4010 (with reference to energy consumption scale 4001) includes a window upper limit 4010U of 0.56 kWh/hour and a window lower limit of 4010L of 0.44 kWh/hour. Such reflects a range in which a given system can operate in a preferred manner. Such range can be established in a variety of manners, such as aggregating energy consumption associated with preferred use of devices at a given time. The "time window" referenced at 4110' may be any duration of time as desired, such as 1 minute, 5 minutes, 10 minutes, 1 hour, or some other time duration.

Figure 41:
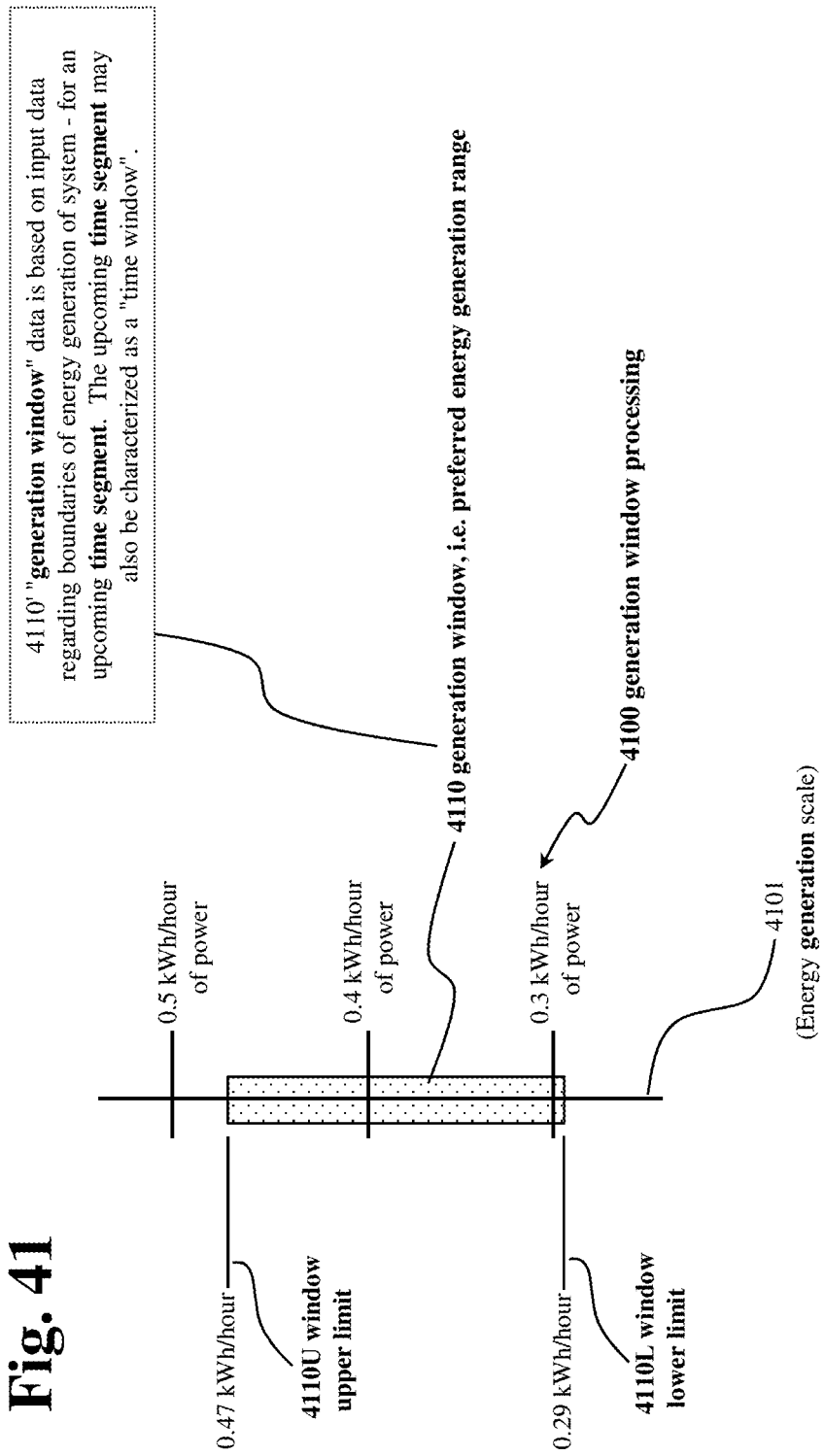
FIG. 41 is a diagram showing aspects of "generation window" processing, in accordance with the disclosed subject matter

On the other hand, FIG. 41 is a diagram showing aspects of generation window processing 4100, in accordance with at least one embodiment of the invention. In particular, FIG. 40 illustratively shows a "generation window" 4110 that represents a preferred energy generation range for what may be characterized as one or more energy output devices. Various energy output devices are described throughout this disclosure, such as solar panel arrays, for example. In this aspect of the invention as reflected at 4110' of FIG. 41, "generation window" data is based on input data regarding what might be characterized as "boundaries" of energy generation of the system, for an upcoming time segment. The "generation window" is thus a range of energy generation at which the energy output devices will preferably operate at over a segment of time. In embodiments of the invention, the generation window may be based on aggregated energy output devices, associated with the system, as may be desired. In the example of FIG. 41, the generation window 4110 (with reference to energy generation scale 4101) includes a window upper limit 4110U of 0.47 kWh/hour and a window lower limit of 4110L of 0.29 kWh/hour. Such reflects a range in which a given system can operate, and output energy, in a preferred manner. Such range can be established in a variety of manners, such as aggregating energy generation associated with preferred use of "energy output" devices at a given time. The "time window" referenced at 4110' may be any duration of time as desired, such as 1 minute, 5 minutes, 10 minutes, 1 hour, or some other time duration.

Figure 42:
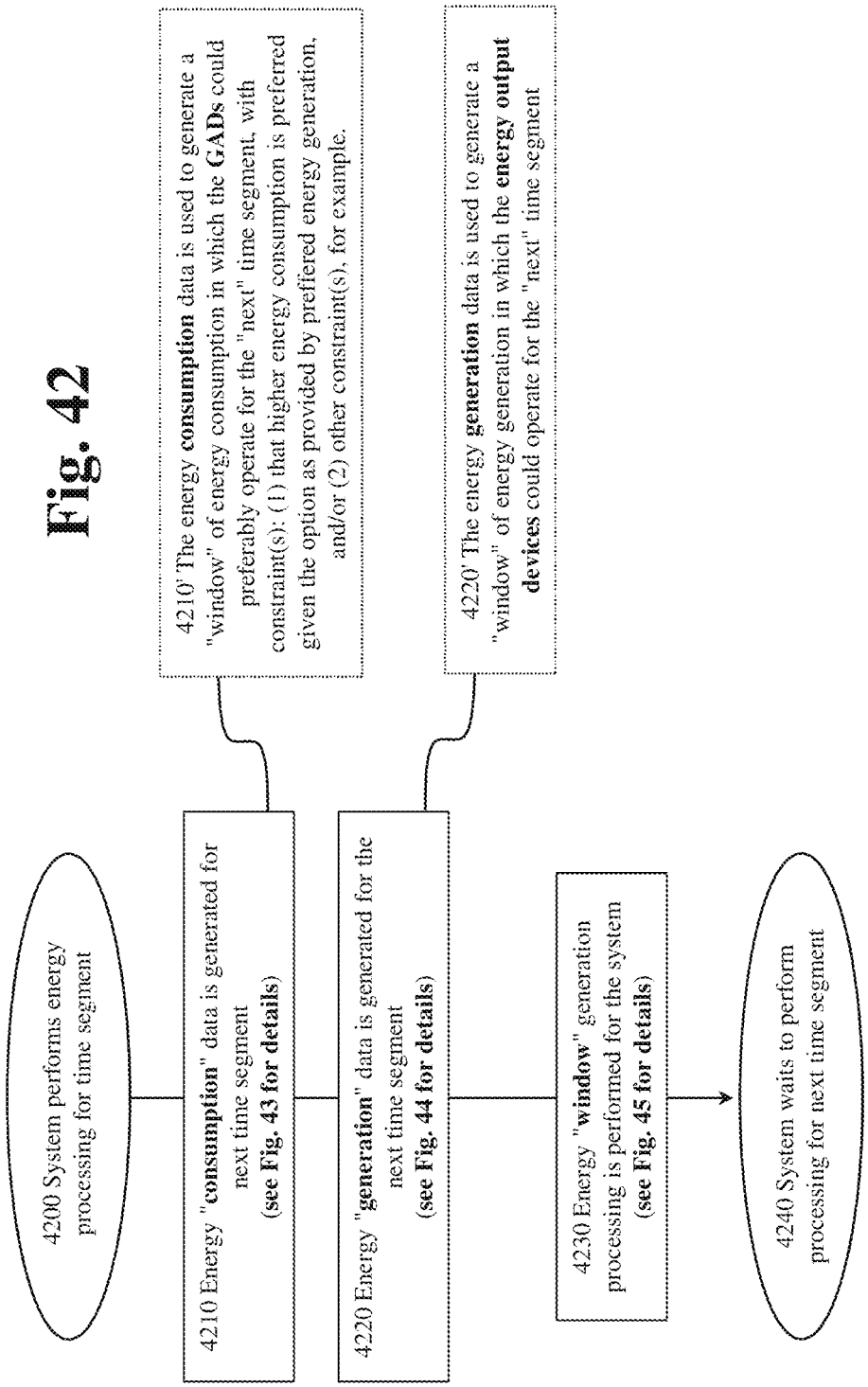
FIG. 42 is a flowchart showing system performing energy processing for a particular time segment, in accordance with the disclosed subject matter.

Related to the diagrams of FIG. 40 and FIG. 41, FIG. 42 is a flowchart showing processing associated with a system performing energy processing for a particular time segment, in accordance with the disclosed subject matter. Accordingly, the processing of FIG. 42 relates to preferred consumption of energy over an upcoming time segment, preferred generation of energy over an upcoming time segment, and related processing. As shown, the process starts in step 4200 and passes to step 4210.

In step 4210, energy consumption data is generated, input and/or aggregated for a next time segment. Further details are described with reference to FIG. 43. As described at 4210', the energy consumption data is used to generate a "window" of energy consumption in which the GADs of the particular system could operate for the next time segment. In such processing, one or more constraints are implemented. That is, once a particular consumption window is generated and a particular generation window is generated—one or more constraints dictate, in part, the energy that is ultimately used, by the system, for the particular time segment under consideration. In the example of 4210', the illustrative constraint is that higher energy consumption is preferred given the option as provided by energy generation. In other words, once a desired range is established for the various GADs of the system to operate—the constraint dictates energy consumption at the highest rate provided for by the "generation" window. As should be appreciated, a wide variety constraints may be utilized as desired.

Then, the processing passes to step 4220. In step 4220, energy "generation" data is generated for the next time segment. Further details are described below with reference to FIG. 44. As reflected at 4220', the energy generation data is used to generate a "window" of energy generation in which the energy output devices could preferably operate for the next time segment. With regard to "preferable operation" or desired operation of the GADs, energy generation devices, and/or other devices—such may mean a value or range at which the particular device operates most efficiently, most effectively, with output of the most power, with use of the least power, and/or with desired strain on the device, and/or some combination of factors, for example. Other factors may also contribute to such "preferable operation"-such other factors including run time, age of device, number of devices available, power curve assessment of the device, and/or other attributes or factors, for example.

Then, in step 4230, energy "window" generation processing is performed for the system. Further details are described below with reference to FIG. 45. In the processing of step 4230, the energy consumption data of step 4210 and the energy generation data of step 4220 are utilized—to generate a corresponding consumption window and generation window.

Then, the process passes to step 4240. In step 4240, system (for example the control system 3010) waits to perform processing for the next time segment.

Figure 43:
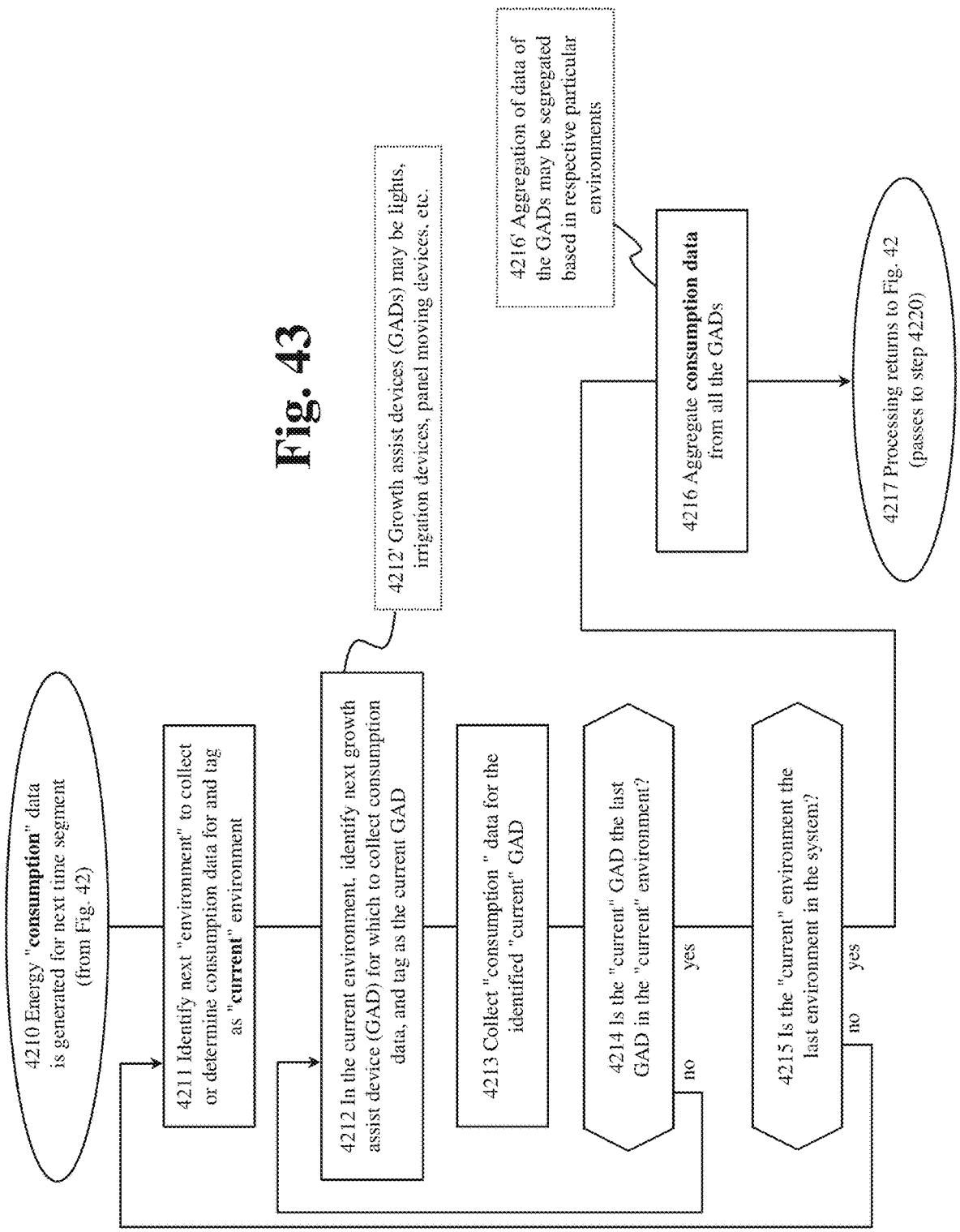
FIG. 43 is a flowchart showing in further detail energy consumption data is generated for the next time segment of FIG. 42, in accordance with the disclosed subject matter.

FIG. 43 is a flowchart showing in further detail energy consumption data is generated for the next time segment step 4210 of FIG. 42, in accordance with the disclosed subject matter. As shown, the processing, as performed by the control system 3010 for example, starts in step 4210 passes to step 4211. In step 4211, the process identifies the next environment to collect consumption data for and tags that next environment as the current environment. Then, in step 4212, in the current environment, the process identifies the next growth assist device "GAD" for which to collect consumption data. The process tags that GAD as the current GAD. As reflected at 4212', GADs may be lights, irrigation devices, panel moving devices, or any other GAD as described herein. Then, the process passes to step 4213. In step 4213, consumption data is collected for the identified current GAD.

Then, in step 4214, a determination is made as to whether the current GAD is the last GAD in the current environment. If no, processing returns to step 4212 with identification of the next GAD. On the other hand, if yes in step 4214, processing passes to step 4215. In step 4215, a determination is made as to whether the current environment is the last environment in the system. For example, it might be the situation that multiple containers and/or environments are in the system. If no in step 4215, the processing returns to step 4211 for processing of the next environment. On the other hand, if yes in step 4215, the processing passes to step 4216.

In step 4216, consumption data is aggregated for all of the GADs. As reflected at 4216' in FIG. 43, aggregation of data of the GADs, as well as other components may be segregated and/or isolated from each other as desired.

Then, processing passes to step 4217 and returns to FIG. 42.

Figure 44:
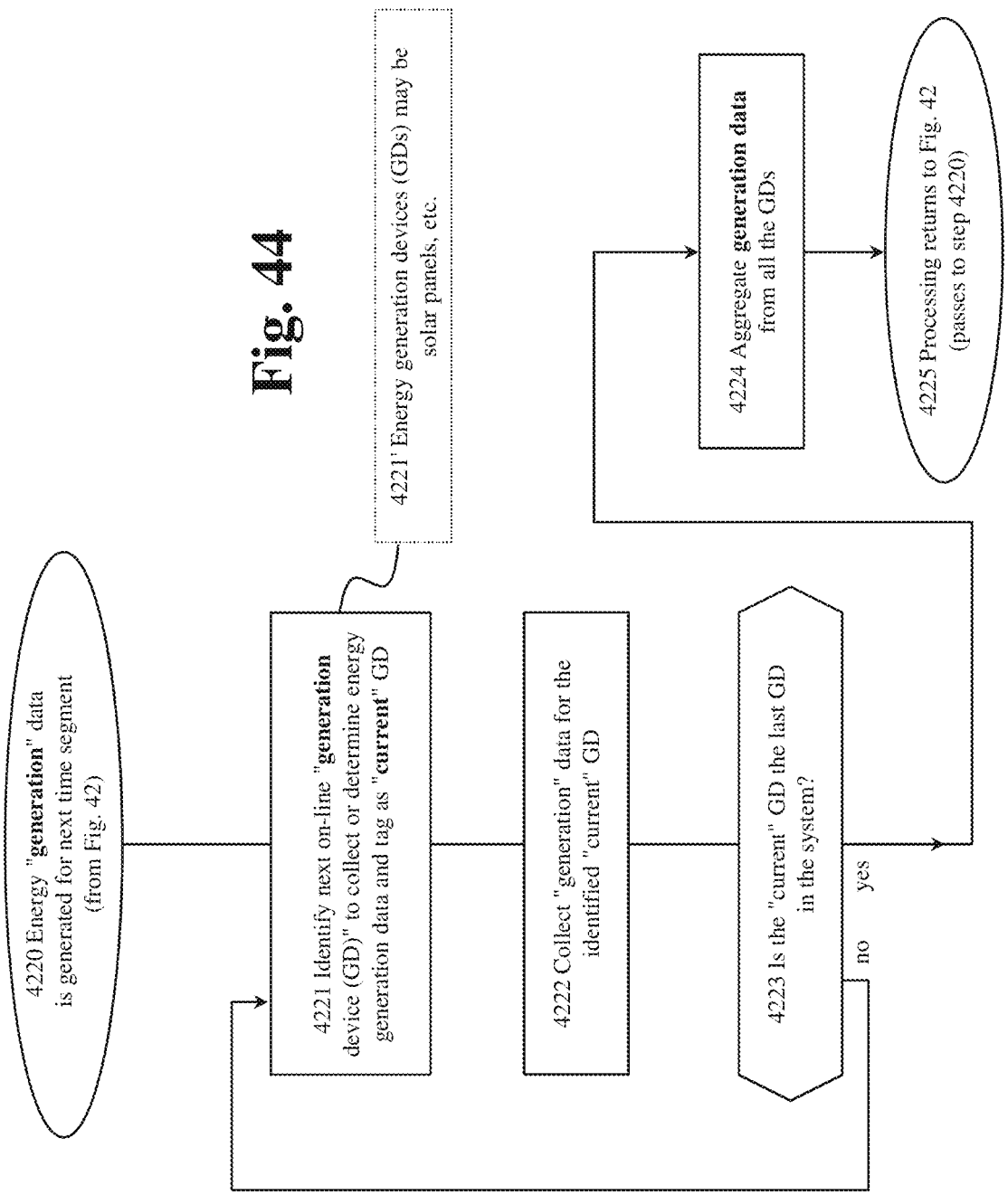
FIG. 44 is a flowchart showing energy generation data is generated for next time segment of FIG. 42, in accordance with the disclosed subject matter.

FIG. 44 is a flowchart showing energy generation data is generated for next time segment step 4220 of FIG. 42, in accordance with the disclosed subject matter. As shown, the process starts in step 4220 and passes to step 4221. In step 4221, the process identifies the next on-line or other available generation device (GD) to collect energy generation data for and tags as the current GD. Then, in step 4222, the process collects the generation data for the identified current GD. Then, in step 4223, the process determines whether the current GD is the last GD in the system. If no, then the process passes back to step 4221. On the other hand, if yes in step 4223, the process passes to step 4224. In step 4224, the process aggregates generation data from all of the GDs that were processed. Then, in step 4225, process returns to FIG. 42.

Figure 45:
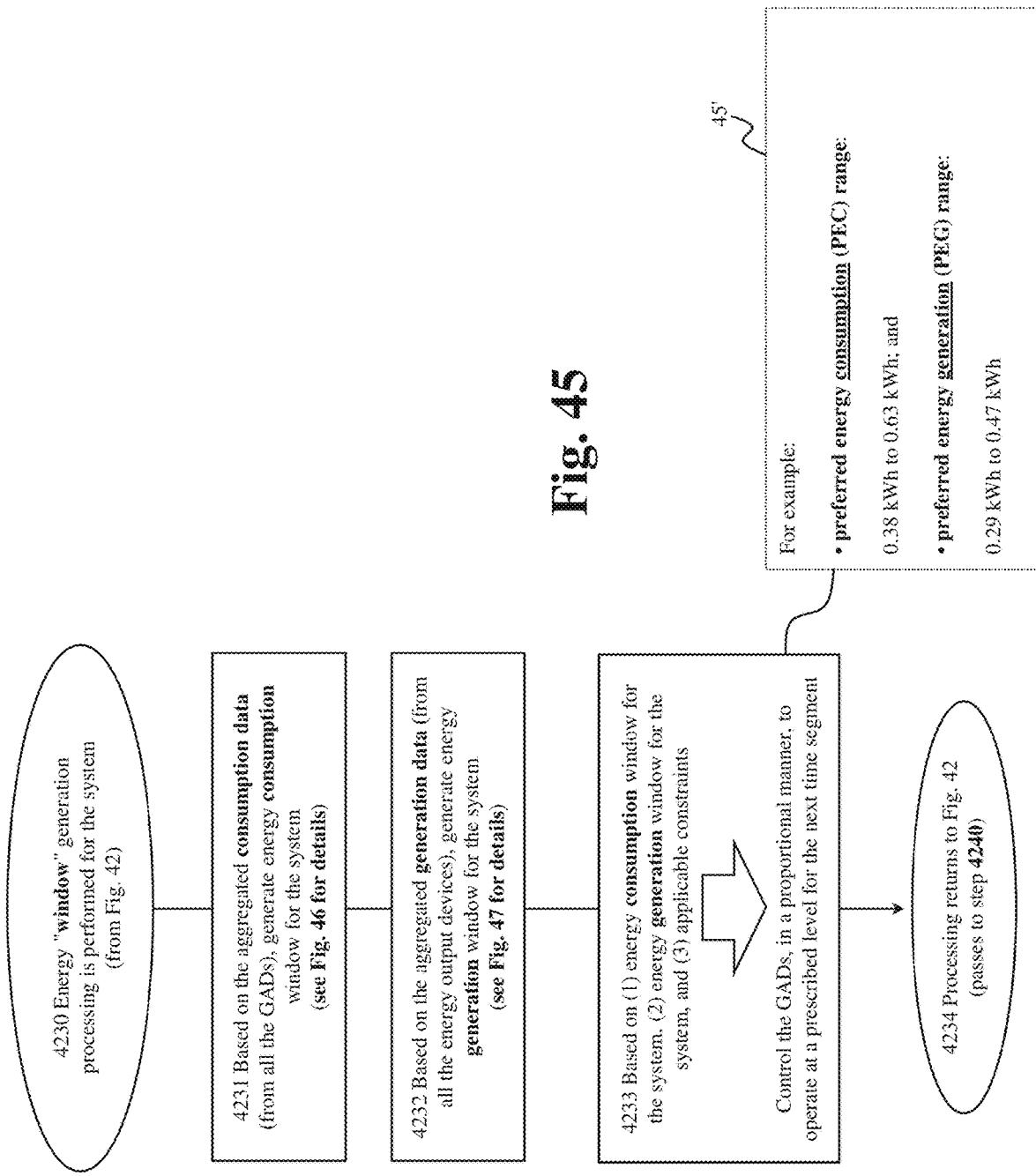
FIG. 45 is a flowchart showing energy window generation processing is performed for the system from FIG. 42, in accordance with the disclosed subject matter.

FIG. 45 is a flowchart showing energy window generation processing is performed for the system step 4230 of FIG. 42, in accordance with the disclosed subject matter. As shown, the process starts in step 4230 and passes to step 4231.

In step 4231, based on the aggregated consumption data (from all the GADs), the process generates an energy consumption window for the system. Further details are described below with reference to FIG. 46. Then, in step 4232, based on the aggregated generation data (from all of the energy output devices) the processing generates an energy generation window for the system. Further details are described below with reference to FIG. 47. Then, in step 4233, based on (1) the energy consumption window for the system, (2) energy generation window for the system, and (3) applicable constraints, the system controls the GADs and/or energy generation devices, in a proportional manner or other manner as desired, to operate at a prescribed level for the next time segment. Example values are shown at 45'. The processing of step 4232 may be performed prior to, or in parallel manner to, the processing of step 4231, in accord with this disclosure.

After step 4233, the process passes to step 4234. In step 4234, the process returns to FIG. 42.

FIG. 46 is a flowchart showing further details of "consumption window" generation step 4231 of FIG. 45, in accordance with the disclosed subject matter. The process starts in step 4231-2 in which the processing determines and/or retrieves a respective preferred energy consumption (PEC) value for each GAD to operate at a preferred level. Various example data is shown in FIG. 46 at 46'. In step 4231-3, the system aggregates the PEC values for the GADs to all operate at a preferred level. In this manner, a system PEC value is determined. Then, in step 4231-4, in this illustrative example, the processing applies acceptable variance values about the system PEC value so as to generate the preferred energy consumption (PEC) range. In this example, acceptable variance values about the PEC value may include an added threshold value that is added to the PEC value to generate a top end of the PEC range, and (2) a subtracted threshold value that is subtracted from the PEC value to generate a bottom end of the PEC range. The threshold values may be determined, adjusted, weighted, or otherwise altered, as may be desired. Various example data is shown in FIG. 46 at 46". Then, in step 4031-5, the process returns to step 42.

FIG. 47 is a flowchart showing further details of "generation window" generation step 4232 of FIG. 45, in accordance with the disclosed subject matter. The process starts in step 4232-2 in which the processing determines and/or retrieves a respective preferred energy generation (PEG) value for each solar panel or other energy output device to operate at a preferred level. Various example data is shown in FIG. 47 at 47'. In step 4232-3, the system aggregates the PEG values for energy output devices to all operate at a preferred level. In this manner, a system PEG value is determined. Then, in step 4232-4, in this illustrative example, the processing applies acceptable variance values about the system PEG value so as to generate the preferred energy generation (PEG) range. In this example, acceptable variance values about the PEG value may include an added threshold value that is added to the PEG value to generate a top end of the PEG range, and (2) a subtracted threshold value that is subtracted from the PEG value to generate a bottom end of the PEG range. Various example data is shown in FIG. 47 at 47". The threshold values may be determined, adjusted, weighted, or otherwise altered, as may be desired. Then, in step 4232-5, the process returns to step 42. For example, the threshold values might be based on a desired "workload" range of a solar array and battery arrangement and/or any of a wide variety of other criteria.

Particular features, structures or characteristics associated with any embodiments described herein can be combined in any suitable manner with other embodiments.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, cloud servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, cloud servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the figures. For example, if a device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to diagrams and/or cross-section illustrations, for example, that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect and/or use such feature, structure, or characteristic in connection with other ones of the embodiments.

Various systems and methods have been described in the context of a hydroponic system. It is to be understood that these systems and methods apply equally to methods and systems which employ soil to grow plants. Many of these systems and methods may incorporate soil into the racks holding the plants and also result in the benefits described for the hydroponic systems and methods.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference in their entirety.

What is claimed is:

1. A growing system for promoting growth of seedlings, the growing system comprising:
    at least one energy output device;
    at least one growing environment that includes a first growing environment, wherein
    the first growing environment includes a filter that is associated with an opening in the first growing environment, the filter configured to control at least one of an amount and attributes of light passing into the first growing environment, and a retractable sun-block panel associated with the opening and removably disposed over the filter;
    a nutrient solution container within the first growing environment, the nutrient solution container for supporting seedlings during growth;
    at least one growth assist device (GAD) associated with the first growing environment, wherein
    the at least one GAD device includes a motor to control the retractable sun-block panel, such control to selectively dispose, to varying degrees over the opening and the filter, the retractable sun-block panel over the nutrient solution container;
and
    a controller that performs processing associated with the growing system, the controller configured to output a signal to the at least one energy output device, the controller:
        generating consumption data regarding operation of the at least one GAD;
        generating generation data regarding operation of the at least one energy output device;
        determining, based on at least one predetermined constraint, along with the consumption data and the generation data, a consumption-generation plan;
        controlling energy output to the at least one GAD based on the determined consumption-generation plan; and
        outputting a signal to the at least one energy output device based on the determined consumption-generation plan, wherein the signal is configured to control energy generation of the at least one energy output device to a particular power output, wherein
    the controller is further configured to control operation of the retractable sun-block panel based on a predetermined mix of natural light and artificial light within the first growing environment.

2. The growing system of claim 1, the at least one GAD includes a grow light disposed in the first growing environment.

3. The growing system of claim 2, wherein the grow light is at least one of a red LED light and a blue LED light.

4. The growing system of claim 1, the at least one energy output device includes a solar panel assembly.

5. The growing system of claim 4, the at least one energy output device includes a battery and the solar panel assembly, the battery being charged by the solar panel assembly.

6. The growing system of claim 1, wherein the first growing environment includes a sensor to monitor growth of a plant, and the sensor is one or more of a video observation, a laser sensor, and a location/proximity sensor.

7. The growing system of claim 1, the at least one GAD includes at least one irrigation pump to control circulation of fluid in the first growing environment.

8. The growing system of claim 7, the at least one GAD includes at least one temperature sensor associated with a temperature controller that controls temperature of the fluid.

9. The growing system of claim 1, the system further including a geothermal cooling system that provides temperature adjustment to the first growing environment.

10. The growing system of claim 1, the at least one energy output device including a co-generation apparatus.

11. The growing system of claim 1, the at least one energy output device including a bio-fuel energy generation apparatus.

12. The growing system of claim 1,
    the generating consumption data includes generating consumption window data, for an upcoming time segment, including generating a preferred energy consumption range having boundaries of positive energy consumption in which the at least one GAD is configured to operate in the upcoming time segment;

the generating generation data includes generating generation window data, for the upcoming time segment, including generating a preferred energy generation range in which the at least one energy output device is configured to produce energy in the upcoming time segment; and the determining the consumption-generation plan includes, based on the least one predetermined constraint, determining the consumption-generation plan so as to satisfy both the preferred energy consumption range and the preferred energy generation range.

13. The growing system of claim 12, the consumption-generation plan is constituted by a consumption-generation production level at which to power the at least one GAD.

14. The growing system of claim 12, the determining the consumption-generation plan includes the controller determining a greatest value of energy consumption, which constitutes one of the at least one predetermined constraint, that falls within both the energy consumption range and the energy generation range; and the first growing environment is constituted by a closed environment in the form of a closed container.

15. The growing system of claim 12, the system further including a second growing environment, the second growing environment associated with further growth assist devices (GADs) that are controlled by the determined consumption-generation plan, and the further GADs assisting with growth of further seedlings in the second growing environment; and the energy consumption range being a range in which both (1) the at least one GAD, and (2) the further GADs is configured to operate in the upcoming time segment.

16. The growing system of claim 12, the generating the preferred energy consumption range in which the at least one GAD is configured to operate in the upcoming time segment including:

determining, by the controller, a preferred energy consumption (PEC) value for the system; and applying, by the controller, predetermined variance values about the PEC value so as to generate the preferred energy consumption range; and the predetermined variance values about the PEC value includes: (1) an added threshold value that is added to the PEC value to generate a top end of the preferred energy consumption range, and (2) a subtracted threshold value that is subtracted from the PEC value to generate a bottom end of the preferred energy consumption range.

17. The growing system of claim 12, the generating the preferred energy generation range including:

determining, by the controller, a preferred energy generation (PEG) value for the system; and applying, by the controller, acceptable variance values about the PEG value so as to generate the preferred energy generation range, and the acceptable variance values, about the PEG value, include: (1) an added threshold value that is added to the PEG value to generate a top end of the preferred energy generation range, and (2) a subtracted threshold value that is subtracted from the PEG value to generate a bottom end of the preferred energy generation range.

18. The growing system of claim 12, the determining the consumption-generation plan includes the controller determining a greatest value of energy consumption, which constitutes one of the at least one predetermined constraint, that falls within both the energy consumption range and the energy generation range, and the determined greatest value of energy consumption is constituted by an uppermost value of the energy generation range; and the determining the consumption-generation plan includes the controller determining a greatest value of energy consumption, which constitutes one of the at least one predetermined constraint, that falls within both the energy consumption range and the energy generation range, and the determined greatest value of energy consumption is constituted by an uppermost value of the energy consumption range.

19. The growing system of claim 1, wherein the first growing environment is constituted by a closed environment in the form of a closed container and the filter is provided in a ceiling structure of the closed container.

20. The growing system of claim 1, wherein the retractable sun-block panel further comprises a plurality of different panels configured to be positioned selectively over the filter.

* * * * *